(12) United States Patent
Saita et al.

(10) Patent No.: US 7,839,571 B2
(45) Date of Patent: Nov. 23, 2010

(54) COLOR-SEPARATION OPTICAL SYSTEM AND IMAGING APPARATUS

(75) Inventors: Arihiro Saita, Saitama (JP); Shuji Akiya, Saitama (JP); Etsuo Terayama, Saitama (JP)

(73) Assignee: Fujinon Corporation, Saitama-shi (JP)

(*) Notice: Subject to any disclaimer, the term of this patent is extended or adjusted under 35 U.S.C. 154(b) by 298 days.

(21) Appl. No.: 12/049,902

(22) Filed: Mar. 17, 2008

(65) Prior Publication Data
US 2008/0239501 A1 Oct. 2, 2008

(30) Foreign Application Priority Data

Mar. 30, 2007 (JP) ............................. P2007-093178
Mar. 30, 2007 (JP) ............................. P2007-093193
Aug. 30, 2007 (JP) ............................. P2007-224437

(51) Int. Cl.
*G02B 27/10* (2006.01)
*G02B 27/14* (2006.01)
*G03B 21/00* (2006.01)
*H04N 9/07* (2006.01)

(52) U.S. Cl. ................. 359/618; 359/629; 359/634; 359/640; 359/487; 359/589; 353/31; 353/33; 348/338; 348/339; 345/32

(58) Field of Classification Search ............ 359/618, 359/629–634, 640, 487, 581, 586, 589; 353/20, 353/31, 33, 34, 37, 81, 84, 119, 122; 349/5, 349/8, 9, 62, 106; 348/57, 58, 62, 258, 338, 348/339, 744, 752, 757, 758
See application file for complete search history.

(56) References Cited

U.S. PATENT DOCUMENTS

| 4,084,179 | A | * | 4/1978 | Sekiguchi | 348/339 |
| 6,078,429 | A | * | 6/2000 | Lyon | 359/634 |
| 6,327,093 | B1 | | 12/2001 | Nakanishi et al. | |
| 6,404,552 | B1 | * | 6/2002 | Manabe | 359/487 |
| 6,507,326 | B2 | * | 1/2003 | Manabe et al. | 345/32 |
| 6,698,893 | B2 | * | 3/2004 | Takimoto et al. | 353/31 |
| 7,165,846 | B2 | * | 1/2007 | Sannohe | 353/31 |
| 7,411,734 | B2 | * | 8/2008 | Magarill et al. | 359/640 |
| 7,518,803 | B2 | * | 4/2009 | Sawai et al. | 359/638 |
| 7,575,325 | B2 | * | 8/2009 | Suzuki et al. | 353/20 |

(Continued)

FOREIGN PATENT DOCUMENTS

EP 0 933 929 A1 8/1999

(Continued)

*Primary Examiner*—Loha Ben
(74) *Attorney, Agent, or Firm*—Birch, Stewart, Kolasch & Birch, LLP

(57) ABSTRACT

A curve representing a characteristic of a blue-light reflecting dichroic film DB and a curve representing a characteristic of a red-light reflecting dichroic film DR are configured to have shapes that track an ideal spectral characteristic of green. Accordingly, it is possible to obtain a characteristic approximated to the ideal spectral characteristic without using a trimming filter having a dichroic film in an exiting surface of a prism. Since it is not necessary to use the trimming filter having the dichroic film, it is possible to prevent ghost and flare from occurring due to the dichroic film of the trimming filter. Accordingly, it is possible to embody an imaging apparatus having the ideal spectral characteristic with ghost and flare being reduced.

30 Claims, 60 Drawing Sheets

U.S. PATENT DOCUMENTS

2003/0020129 A1 1/2003 Saita
2009/0086324 A1* 4/2009 Saita et al. .................. 359/589

FOREIGN PATENT DOCUMENTS

JP 2005-208256 A 8/2005
WO WO-98/14012 A1 4/1998

* cited by examiner

FIG. 10

| DB·FILM DESIGN EXAMPLE | | | |
|---|---|---|---|
| LAYER | FILM MATERIAL | REFRACTIVE INDEX | FILM THICKNESS (nm) |
| 1 | $SiO_2$ | 1.46 | 18 |
| 2 | $TiO_2$ | 2.33 | 24 |
| 3 | $SiO_2$ | 1.46 | 51 |
| 4 | $TiO_2$ | 2.33 | 69 |
| 5 | $SiO_2$ | 1.46 | 31 |
| 6 | $TiO_2$ | 2.33 | 60 |
| 7 | $SiO_2$ | 1.46 | 39 |
| 8 | $TiO_2$ | 2.33 | 61 |
| 9 | $SiO_2$ | 1.46 | 32 |
| 10 | $TiO_2$ | 2.33 | 61 |
| 11 | $SiO_2$ | 1.46 | 41 |
| 12 | $TiO_2$ | 2.33 | 67 |
| 13 | $SiO_2$ | 1.46 | 38 |
| 14 | $TiO_2$ | 2.33 | 69 |
| 15 | $SiO_2$ | 1.46 | 43 |
| 16 | $TiO_2$ | 2.33 | 72 |
| 17 | $SiO_2$ | 1.46 | 38 |
| 18 | $TiO_2$ | 2.33 | 70 |
| 19 | $SiO_2$ | 1.46 | 39 |
| 20 | $TiO_2$ | 2.33 | 67 |
| 21 | $SiO_2$ | 1.46 | 28 |
| 22 | $TiO_2$ | 2.33 | 171 |
| 23 | $SiO_2$ | 1.46 | 115 |

FIG. 11

| DR·FILM DESIGN EXAMPLE | | | |
|---|---|---|---|
| LAYER | FILM MATERIAL | REFRACTIVE INDEX | FILM THICKNESS (nm) |
| 1 | $TiO_2$ | 2.33 | 89 |
| 2 | $SiO_2$ | 1.46 | 127 |
| 3 | $TiO_2$ | 2.33 | 78 |
| 4 | $SiO_2$ | 1.46 | 114 |
| 5 | $TiO_2$ | 2.33 | 75 |
| 6 | $SiO_2$ | 1.46 | 116 |
| 7 | $TiO_2$ | 2.33 | 73 |
| 8 | $SiO_2$ | 1.46 | 122 |
| 9 | $TiO_2$ | 2.33 | 75 |
| 10 | $SiO_2$ | 1.46 | 137 |
| 11 | $TiO_2$ | 2.33 | 84 |
| 12 | $SiO_2$ | 1.46 | 149 |
| 13 | $TiO_2$ | 2.33 | 91 |
| 14 | $SiO_2$ | 1.46 | 166 |

FIG. 24

| \multicolumn{4}{c}{DG·FILM DESIGN EXAMPLE} |
|---|---|---|---|
| LAYER | FILM MATERIAL | REFRACTIVE INDEX | FILM THICKNESS (nm) |
| 1 | $Nb_2O_5$ | 2.35 | 7 |
| 2 | $SiO_2$ | 1.48 | 22 |
| 3 | $Nb_2O_5$ | 2.35 | 185 |
| 4 | $SiO_2$ | 1.48 | 33 |
| 5 | $Nb_2O_5$ | 2.35 | 103 |
| 6 | $SiO_2$ | 1.48 | 24 |
| 7 | $Nb_2O_5$ | 2.35 | 91 |
| 8 | $SiO_2$ | 1.48 | 26 |
| 9 | $Nb_2O_5$ | 2.35 | 99 |
| 10 | $SiO_2$ | 1.48 | 35 |
| 11 | $Nb_2O_5$ | 2.35 | 104 |
| 12 | $SiO_2$ | 1.48 | 19 |
| 13 | $Nb_2O_5$ | 2.35 | 101 |
| 14 | $SiO_2$ | 1.48 | 23 |
| 15 | $Nb_2O_5$ | 2.35 | 109 |
| 16 | $SiO_2$ | 1.48 | 27 |
| 17 | $Nb_2O_5$ | 2.35 | 106 |
| 18 | $SiO_2$ | 1.48 | 24 |
| 19 | $Nb_2O_5$ | 2.35 | 106 |
| 20 | $SiO_2$ | 1.48 | 20 |
| 21 | $Nb_2O_5$ | 2.35 | 107 |
| 22 | $SiO_2$ | 1.48 | 32 |
| 23 | $Nb_2O_5$ | 2.35 | 113 |
| 24 | $SiO_2$ | 1.48 | 27 |
| 25 | $Nb_2O_5$ | 2.35 | 102 |
| 26 | $SiO_2$ | 1.48 | 15 |
| 27 | $Nb_2O_5$ | 2.35 | 114 |
| 28 | $SiO_2$ | 1.48 | 31 |
| 29 | $Nb_2O_5$ | 2.35 | 122 |
| 30 | $SiO_2$ | 1.48 | 21 |
| 31 | $Nb_2O_5$ | 2.35 | 188 |
| 32 | $SiO_2$ | 1.48 | 23 |
| 33 | $Nb_2O_5$ | 2.35 | 13 |
| 34 | $SiO_2$ | 1.48 | 134 |

FIG. 25

| DB·FILM DESIGN EXAMPLE | | | |
|---|---|---|---|
| LAYER | FILM MATERIAL | REFRACTIVE INDEX | FILM THICKNESS (nm) |
| 1 | $Nb_2O_5$ | 2.39 | 29 |
| 2 | $SiO_2$ | 1.48 | 74 |
| 3 | $Nb_2O_5$ | 2.39 | 48 |
| 4 | $SiO_2$ | 1.48 | 93 |
| 5 | $Nb_2O_5$ | 2.39 | 45 |
| 6 | $SiO_2$ | 1.48 | 98 |
| 7 | $Nb_2O_5$ | 2.39 | 48 |
| 8 | $SiO_2$ | 1.48 | 100 |
| 9 | $Nb_2O_5$ | 2.39 | 47 |
| 10 | $SiO_2$ | 1.48 | 100 |
| 11 | $Nb_2O_5$ | 2.39 | 48 |
| 12 | $SiO_2$ | 1.48 | 101 |
| 13 | $Nb_2O_5$ | 2.39 | 48 |
| 14 | $SiO_2$ | 1.48 | 101 |
| 15 | $Nb_2O_5$ | 2.39 | 49 |
| 16 | $SiO_2$ | 1.48 | 97 |
| 17 | $Nb_2O_5$ | 2.39 | 65 |
| 18 | $SiO_2$ | 1.48 | 48 |
| 19 | $Nb_2O_5$ | 2.39 | 100 |
| 20 | $SiO_2$ | 1.48 | 50 |
| 21 | $Nb_2O_5$ | 2.39 | 83 |
| 22 | $SiO_2$ | 1.48 | 57 |
| 23 | $Nb_2O_5$ | 2.39 | 70 |
| 24 | $SiO_2$ | 1.48 | 68 |
| 25 | $Nb_2O_5$ | 2.39 | 85 |
| 26 | $SiO_2$ | 1.48 | 31 |
| 27 | $Nb_2O_5$ | 2.39 | 109 |
| 28 | $SiO_2$ | 1.48 | 50 |
| 29 | $Nb_2O_5$ | 2.39 | 46 |
| 30 | $SiO_2$ | 1.48 | 78 |

| DC · FILM DESIGN EXAMPLE | | | |
|---|---|---|---|
| LAYER | FILM MATERIAL | REFRACTIVE INDEX | FILM THICKNESS (nm) |
| 1 | $Al_2O_3$ | 1.64 | 57 |
| 2 | Sub-H4 | 2.09 | 15 |
| 3 | $Al_2O_3$ | 1.64 | 107 |
| 4 | Sub-H4 | 2.09 | 30 |
| 5 | $Al_2O_3$ | 1.64 | 21 |
| 6 | Sub-H4 | 2.09 | 11 |
| 7 | $Al_2O_3$ | 1.64 | 58 |
| 8 | Sub-H4 | 2.09 | 29 |
| 9 | $Al_2O_3$ | 1.64 | 64 |

FIG. 46

| DB2·FILM DESIGN EXAMPLE | | | |
|---|---|---|---|
| LAYER | FILM MATERIAL | REFRACTIVE INDEX | FILM THICKNESS (nm) |
| 1 | $SiO_2$ | 1.46 | 18 |
| 2 | $TiO_2$ | 2.33 | 24 |
| 3 | $SiO_2$ | 1.46 | 51 |
| 4 | $TiO_2$ | 2.33 | 69 |
| 5 | $SiO_2$ | 1.46 | 31 |
| 6 | $TiO_2$ | 2.33 | 60 |
| 7 | $SiO_2$ | 1.46 | 39 |
| 8 | $TiO_2$ | 2.33 | 61 |
| 9 | $SiO_2$ | 1.46 | 32 |
| 10 | $TiO_2$ | 2.33 | 61 |
| 11 | $SiO_2$ | 1.46 | 41 |
| 12 | $TiO_2$ | 2.33 | 67 |
| 13 | $SiO_2$ | 1.46 | 38 |
| 14 | $TiO_2$ | 2.33 | 69 |
| 15 | $SiO_2$ | 1.46 | 43 |
| 16 | $TiO_2$ | 2.33 | 72 |
| 17 | $SiO_2$ | 1.46 | 38 |
| 18 | $TiO_2$ | 2.33 | 70 |
| 19 | $SiO_2$ | 1.46 | 39 |
| 20 | $TiO_2$ | 2.33 | 67 |
| 21 | $SiO_2$ | 1.46 | 28 |
| 22 | $TiO_2$ | 2.33 | 171 |
| 23 | $SiO_2$ | 1.46 | 115 |

FIG. 47

| LAYER | FILM MATERIAL | REFRACTIVE INDEX | FILM THICKNESS (nm) |
|---|---|---|---|
| \multicolumn{4}{c}{DR2·FILM DESIGN EXAMPLE} | | | |

| LAYER | FILM MATERIAL | REFRACTIVE INDEX | FILM THICKNESS (nm) |
|---|---|---|---|
| 1 | $TiO_2$ | 2.33 | 89 |
| 2 | $SiO_2$ | 1.46 | 127 |
| 3 | $TiO_2$ | 2.33 | 78 |
| 4 | $SiO_2$ | 1.46 | 114 |
| 5 | $TiO_2$ | 2.33 | 75 |
| 6 | $SiO_2$ | 1.46 | 116 |
| 7 | $TiO_2$ | 2.33 | 73 |
| 8 | $SiO_2$ | 1.46 | 122 |
| 9 | $TiO_2$ | 2.33 | 75 |
| 10 | $SiO_2$ | 1.46 | 137 |
| 11 | $TiO_2$ | 2.33 | 84 |
| 12 | $SiO_2$ | 1.46 | 149 |
| 13 | $TiO_2$ | 2.33 | 91 |
| 14 | $SiO_2$ | 1.46 | 166 |

| AR2 · FILM DESIGN EXAMPLE | | | |
|---|---|---|---|
| LAYER | FILM MATERIAL | REFRACTIVE INDEX | FILM THICKNESS (nm) |
| 1 | $Al_2O_3$ | 1.64 | 84 |
| 2 | Sub-H4 | 2.09 | 14 |
| 3 | $Al_2O_3$ | 1.64 | 44 |
| 4 | Sub-H4 | 2.09 | 20 |
| 5 | $Al_2O_3$ | 1.64 | 186 |
| 6 | Sub-H4 | 2.09 | 126 |
| 7 | $MgF_2$ | 1.39 | 106 |

COLOR-SEPARATION OPTICAL SYSTEM AND IMAGING APPARATUS

CROSS-REFERENCE TO RELATED APPLICATIONS

This application is based upon and claims the benefit of priority from the Japanese Patent Application Nos. 2007-93178 (filed on Mar. 30, 2007), 2007-93193 (filed on Mar. 30, 2007) and 2007-224437 (filed on Aug. 30, 2007); the entire contents of which are incorporated herein by reference.

BACKGROUND OF THE INVENTION

1. Technical Field

The invention relates to a color-separation optical system for separating incident light into light of plural colors and an imaging apparatus having the color-separation optical system.

2. Description of the Related Art

In general, an imaging apparatus such as a television camera and a video camera includes a color-separation optical system. FIG. 52 shows the configuration of a color-separation optical system of related art. The color-separation optical system 101 separates incident light L entering through a taking lens 102 into three light components, that is, blue light LB, red light LR, and green light LG. Imaging devices for the respective color light 4B, 4R, and 4G, such as CCDs (Charge Coupled Device), are disposed to correspond to the respective color light separated by the color-separation optical system 101. The color-separation optical system 101 is one called the Philips type color separation system. The color-separation optical system 101 includes a first prism 110, a second prism 120 and a third prism 130 in order from the light-incident side along an optical axis Z1 and is configured to extract the blue light LB by the use of the first prism 110, to extract the red light LR by the use of the second prism 120, and to extract the green light LG by the use of the third prism 130.

A blue-light reflecting dichroic film DB1 is formed on a reflecting/transmitting surface 111 of the first prism 110. A red-light reflecting dichroic film DR1 is formed on a reflecting/transmitting surface 121 of the second prism 120. A trimming filter 151 is disposed on a light-exiting surface of the first prism 110. A dichroic film 151A is formed on a light-exiting surface of the trimming filter 151. Similarly, a trimming filter 152 having a dichroic film 152A formed thereon is disposed on a light-exiting surface of the second prism 120, and a trimming filter 153 having a dichroic film 153A is formed thereon is disposed on a light-exiting surface of the third prism 130. The trimming filters 151, 152, and 153 are provided to bring a spectral characteristic closer to an ideal characteristic and have a role of adjusting spectral characteristics of wavelength components, which have not been adjusted satisfactorily by the blue-light reflecting dichroic film DB1 and the red-light reflecting dichroic film DR1.

FIG. 54 shows a spectral characteristic, which is generally considered as ideal in a color imaging apparatus, in terms of three colors of red (R), blue (B), and green (G). The ideal characteristic shown in FIG. 54 is normalized so that the maximum values of the respective light components are 1. The "ideal characteristic" is converted from chromaticity coordinates of three primary colors of a color reproducing medium and can be obtained by a linear transformation of the color-matching function in the XYZ color coordinate system. Here, the "color reproducing medium" is one that reproduces (displays) an image captured by an imaging apparatus and means a display device such as a liquid crystal monitor or a projector. FIG. 53 shows an example of the chromaticity coordinates of three primary colors R, G, and B for obtaining the ideal characteristic. The three primary colors R, G, and B determine a color range that can be reproduced by the color reproducing medium.

When the same characteristic as the ideal characteristic shown in FIG. 54 is obtained by using the color-separation optical system 101 shown in FIG. 52, it is possible to reproduce colors ideally. However, in practice, it is difficult to completely obtain the same characteristic as the ideal characteristic and thus, it is designed to obtain a characteristic approximated to the ideal characteristic. In the color-separation optical system 101 of the related art, it is designed to obtain a characteristic approximated to the ideal characteristic by properly adjusting the dichroic films DB1 and DR1 formed in the prisms and the dichroic films 151A, 152A, and 153A formed in the trimming filters 151, 152, and 153. FIG. 55 shows a spectral transmission characteristic of the color-separation optical system of the related art, which is designed in such a way.

FIG. 56 shows a design example of the dichroic films DB1 and DR1 used in the color-separation optical system 101 of the related art. As shown in FIG. 56, dichroic films having such a characteristic that the transmissivity characteristic curve of the wavelength band goes up or down more sharply than the ideal characteristic curve shown in FIG. 54 were used in the related art as the dichroic films DB1 and DR1. Unnecessary wavelength components of light exiting from the exiting surfaces of the prisms were intercepted by the use of the trimming filters 151, 152, and 153 having the dichroic films 151A, 152A, and 153A, respectively.

In this way, the characteristics were adjusted by the use of various trimming filters. For example, JP 2005-208256 A has proposed a method of improving color reproduction by enhancing a brightness level of a skin color by the use of a trimming filter having a special spectral transmission characteristic. A method of adjusting the transmission characteristic by disposing a half mirror on the bonding surface between the second prism 120 and the third prism 130 instead of the dichroic film DR1 and forming dichroic films having a transmission characteristic approximated to the ideal characteristic in the trimming filters 152 and 153 was also known. FIG. 57 shows a spectral characteristic of a color-separation optical system of related art which is made to be approximated to the ideal characteristic by making such a special adjustment.

However, the color-separation optical system of the related art using a trimming filter having a dichroic film in the exiting surface of a prism has a wavelength range in which reflectivities are high wavelength-selectively, as a characteristic of the dichroic film. Therefore, multiple reflections occur between the dichroic surface and the imaging surface to cause ghost and flare, thereby deteriorating image quality. FIG. 58 shows an example of the multiple reflections occurring in the exiting surface of the third prism 130 for extracting the green light LG in the color-separation optical system 101 of the related art. As shown in FIG. 58, the imaging device 4G includes an imaging surface 401G, a cover glass 402, and an external electrode 403. For example, a part of the green light LG passing through the green trimming filter 153 is reflected by the imaging surface 401G and the returning light is reflected in accordance with the wavelength selection characteristic of the dichroic film 153A of the trimming filter 153. In this way, the multiple-reflected light 160 is generated, which causes ghost and flare. Accordingly, it was difficult to embody an imaging apparatus having the ideal spectral characteristic with ghost and flare being suppressed.

FIG. 59 shows the configuration of another color-separation optical system of related art. The color-separation optical system 201 is one called a Philips type color-separation optical system. The color-separation optical system 201 includes an IR (infrared) cut filter 103, a first prism 110, a second prism 120, and a third prism 130 in order from the light-incident side along an optical axis Z1, and is configured to extract the blue light LB by the use of the first prism 110, to extract the red light LR by the use of the second prism 120, and to extract the green light LG by the use of the third prism 130.

A blue-light reflecting dichroic film DB1 is formed on a reflecting/transmitting surface 111 of the first prism 110. A red-light reflecting dichroic film DR1 is formed on a reflecting/transmitting surface 222 of the second prism 120. The first prism 110 and the second prism 120 are disposed so that the surface 111 having the blue-light reflecting dichroic film DB1 formed thereon and the light incidence surface 221 of the second prism 120 face each other with an air gap 110AG interposed therebetween. An antireflection film AR1 for reducing the reflection of the incident light is formed on the incidence surface 221 of the second prism 120.

In the color-separation optical system 201 shown in FIG. 59, since the first prism 110 and the second prism 120 are disposed with the air gap 110AG interposed therebetween, reflection occurs by the air interface between the two prisms, as shown in FIG. 60, which may cause unnecessary ghost and flare and deteriorate image quality. This phenomenon is caused by light that passes through the blue-light reflecting dichroic film DB1 and is then reflected by the incident surface 221 of the second prism 120. Here, since the blue light is reflected by the blue-light reflecting dichroic film DB1, the blue light hardly reaches the incidence surface 221 of the second prism 120. Since the red light is reduced by the IR cut filter 103 disposed in the earlier stage, the red light is relatively small. Accordingly, in the prism arrangement shown in FIG. 59, the most components of light reaching the incident surface 221 of the second prism 120 would be the green light. However, one for reducing reflectivities all over the visible band as shown in FIG. 48A is used as the antireflection film AR1, and the reflection of light particularly in the green wavelength range (about 500 nm to 600 nm) is not suppressed sufficiently. Accordingly, a part of light in the wavelength range is easily reflected by the incident surface 221 of the second prism 120. As shown in FIG. 60, of the reflected light, the light L1 passing through the blue-light reflecting dichroic film DB1 and entering again the first prism 110 enters a blue imaging device 4B to form an image. Thereby, the thus-formed image is observed as a double image with respect to an image formed by the normal blue light LB. Of the reflected light, the light L2 reflected by the surface 111 of the first prism 110 and entering again the second prism 120 enters the third prism 130 through the red-light reflecting dichroic film DR1 (because the light in the green wavelength range is abundant as described above) and finally enters a green imaging device 4G to form an image. Thereby, the thus-formed image is observed as a double image with respect to an image formed by the normal green light LG. As described above, since the antireflection film AR1 is formed on the incident surface 221 of the second prism 120 but the characteristic for reducing the reflectivities thereof is not sufficient, the ghost and the like occurs due to the reflection by the air interface between the two prisms.

SUMMARY OF THE INVENTION

The invention has been made in view of the above circumstances and has an object to provide a color-separation optical system and an imaging apparatus that can reduce ghost and flare in comparison with a wavelength selecting method employing a trimming filter having a dichroic film attached thereto and that can obtain a characteristic approximated to the ideal spectral characteristic so as to improve color reproducibility.

The invention also has another object to provide a color-separation optical system and an imaging apparatus that can effectively reduce ghost occurring due to reflection at an air interface between two prisms in comparison with the related art.

According to a first aspect of the invention, a color-separation optical system for separating incident light into at least three color light components of blue light, red light, and green light, includes in order from a light-incident side a first prism, a second prism, and a third prism. The first prism has a first dichroic film and extracts a first color light component reflected by the first dichroic film. The second prism has a second dichroic film and extracts a second color light component which passes through the first dichroic film and which is reflected by the second dichroic film. The third prism extracts a third color light component which passes through the first and second dichroic films. The first dichroic film has a film configuration for reflecting the blue light as the first color light component. The second dichroic film has a film configuration for reflecting the red or green light as the second color light component. A transmission characteristic curve of wavelength versus transmissivity of the first dichroic film has a shape that tracks a short-wavelength side of an ideal spectral characteristic of green. A transmission characteristic curve of wavelength versus transmissivity of the second dichroic film has a shape that tracks a long-wavelength side of the ideal spectral characteristic of green when the second dichroic film reflects the red light. A reflection characteristic curve of wavelength versus reflectivity of the second dichroic film has a shape that tracks the long-wavelength side of the ideal spectral characteristic of green when the second dichroic film reflects the green light.

In the color-separation optical system according to the first aspect of the invention, the first dichroic film has the film configuration for reflecting the blue light as the first color light component, and the first prism extracts the blue light. The second dichroic film has a film configuration for reflecting the red light or the green light as the second color light component, and the second prism extracts the red light or the green light. The third prism extracts the third color light component (a light component other than the first color light component and the second color light component) that passes through the first and second dichroic films.

In this case, since the curve representing the characteristic of the first dichroic film and the curve representing the characteristic of the second dichroic film have the shapes that track the ideal spectral characteristic of green, it is possible to obtain a characteristic approximated to the ideal spectral characteristic without using a trimming filter having a dichroic film in an exiting surface of a prism. Since it is not necessary to use the trimming filter having the dichroic film, it is possible to prevent ghost and flare from occurring due to the dichroic film of the trimming filter. Accordingly, it is possible to embody an imaging apparatus having the ideal spectral characteristic with ghost and flare being reduced.

In the color-separation optical system of the first aspect, when the first prism extracts the blue light, the second prism extracts the red light and the third prism extracts the green light, it is preferable that the first dichroic film reflects the blue light and that the transmission characteristic curve of the first dichroic film has a shape that goes up from a low transmissivity to a high transmissivity in a wavelength range of 430 nm to 670 nm while tracking the short wavelength side of the ideal spectral characteristic of green. Furthermore, it is preferable that the second dichroic film reflects the red light, and that the transmission characteristic curve of the second dichroic film has a shape that goes down from a high transmissivity to a low transmissivity in the wavelength range of 430 nm to 670 nm while tracking the long-wavelength side of the ideal spectral characteristic of green.

In this case where the first prism extracts the blue light, the second prism extracts the red light and the third prism extracts the green light, the color-separation optical system may further include a fourth prism that has a third dichroic film, is disposed between the second prism and the third prism, and extracts a fourth color light component passing through the first and second dichroic films. In this case, it is preferable that the third dichroic film reflects a part of light in a wavelength range of 400 nm to 600 nm as the fourth color light component, and that the third prism extracts the green light, which passes through the first and second dichroic films and passes through the third dichroic film.

Also, in the color-separation optical system of the first aspect of the invention, when the first prism extracts the blue light, the second prism extracts the green light and the third prism extracts the red light, it is preferable that the first dichroic film reflects the blue light, and that the transmission characteristic curve of the first dichroic film has a shape that goes up from a low transmissivity to a high transmissivity in a wavelength range of 430 nm to 670 nm while tracking on the short-wavelength side of the ideal spectral characteristic of green. Furthermore, it is preferable that the second dichroic film reflects the green light, and that the reflection characteristic curve of the second dichroic film has a shape that goes down from a high reflectivity to a low reflectivity in the wavelength range of 430 nm to 670 nm while tracking the long-wavelength side of the ideal spectral characteristic of green.

According to a second aspect of the invention, a color-separation optical system for separating incident light into at least three light components of blue light, red light, and green light, includes, in order from a light-incident side, a first prism, a second prism and a third prism. The first prism has a first dichroic film and extracts a first color light component reflected by the first dichroic film. The second prism has a second dichroic film and extracts a second color light component which passes through the first dichroic film and which is reflected by the second dichroic film. The third prism extracts a third color light component having which passes through the first and second dichroic films. The first dichroic film has a film configuration for reflecting the red light as the first color light component. The second dichroic film has a film configuration for the blue or green light as the second color light component. A transmission characteristic curve of wavelength versus transmissivity of the first dichroic film has a shape that tracks a long-wavelength side of an ideal spectral characteristic of green. A transmission characteristic curve of wavelength versus transmissivity of the second dichroic film has a shape that tracks a short-wavelength side of the ideal spectral characteristic of green when the second dichroic film reflects the blue light. A reflection characteristic curve of wavelength versus reflectivity of the second dichroic film has a shape that tracks the short-wavelength side of the ideal spectral characteristic of green when the second dichroic film reflects the green light.

In the color-separation optical system according to the second aspect of the invention, the first dichroic film has the film configuration for reflecting the red light as the first color light component, and the first prism extracts the red light. The second dichroic film has the film configuration for reflecting the blue light or the green light as the second color light component, and the second prism extracts the blue light or the green light. The third prism extracts the third color light component (a light component other than the first color light component and the second color light component), which passes through the first and second dichroic films.

In this case, since the curve representing the characteristic of the first dichroic film and the curve representing the characteristic of the second dichroic film have the shapes that track the ideal spectral characteristic of green, it is possible to obtain a characteristic approximated to the ideal spectral characteristic without using a trimming filter having a dichroic film in an exiting surface of a prism. Since it is not necessary to use the trimming filter having the dichroic film, it is possible to prevent ghost and flare from occurring due to the dichroic film of the trimming filter. Accordingly, it is possible to embody an imaging apparatus having the ideal spectral characteristic with ghost and flare being reduced.

In the color-separation optical system according to the second aspect of the invention, when the first prism extracts the red light, the second prism extracts the blue light and the third prism extracts the green light, it is preferable that the first dichroic film reflects the red light, and that the transmission characteristic curve of the first dichroic film has a shape that goes down from a high transmissivity to a low transmissivity in a wavelength range of 430 nm to 670 nm while tracking on the short-wavelength side of the ideal spectral characteristic of green. Furthermore, it is preferable that the second dichroic film reflects the blue light, and that the transmission characteristic curve of the second dichroic film has a shape that goes up from a low transmissivity to a high transmissivity in the wavelength range of 430 nm to 670 nm while tracking the long-wavelength side of the ideal spectral characteristic of green.

Also, in the color-separation optical system according to the second aspect of the invention, when the first prism extracts the red light, the second prism extracts the green light and the third prism extracts the blue light, it is preferable that the first dichroic film reflects the red light and that the transmission characteristic curve of the first dichroic film has a shape that goes down from a high transmissivity to a low transmissivity in a wavelength range of 430 nm to 670 nm while tracking the long-wavelength side of the ideal spectral characteristic of green. Furthermore, it is preferable that the second dichroic film reflects the green light, and that the reflection characteristic curve of the second dichroic film has a shape that goes up from a low reflectivity to a high reflectivity in the wavelength range of 430 nm to 670 nm while tracking the short-wavelength side of the ideal spectral characteristic of green.

According to a third aspect of the invention, a color-separation optical system for separating incident light into at least three light components of blue light, red light, and green light, includes, in order from a light-incident side, a first prism, a second prism and a third prism. The first prism has a first dichroic film and extracts a first color light component reflected by the first dichroic film. The second prism has a second dichroic film and extracts a second color light component which passes through the first dichroic film and which is reflected by the second dichroic film. The third prism extracts a third color light component which passes through the first and second dichroic films. The first dichroic film has a film configuration for reflecting the green light as the first color light component. The second dichroic film has a film configuration for reflecting the blue or red light as the second color light component. A reflection characteristic curve of wavelength versus reflectivity of the first dichroic film has a shape that tracks a short-wavelength side and a long-wavelength side of an ideal spectral characteristic of green.

In the color-separation optical system according to the third aspect of the invention, the first dichroic film has the film configuration for reflecting the green light as the first color light component, and the first prism extracts the green light. The second dichroic film has the film configuration for reflecting the blue light or the red light as the second color light component, and the second prism extracts the blue light or the red light. The third prism extracts the third color light component (a light component other than the first color light component and the second color light component), which passes through the first and second dichroic films.

In this case, since the curve representing the characteristic of the first dichroic film has the shape that tracks the ideal spectral characteristic of green, it is possible to obtain a characteristic approximated to the ideal spectral characteristic without using a trimming filter having a dichroic film in an exiting surface of a prism. Since it is not necessary to use the trimming filter having the dichroic film, it is possible to prevent ghost and flare from occurring due to the dichroic film of the trimming filter. Accordingly, it is possible to embody an imaging apparatus having the ideal spectral characteristic with ghost and flare being reduced.

In the color-separation optical system according to the third aspect of the invention, it is preferable that in a portion where the reflection characteristic curve of the first dichroic film that goes up in a wavelength range of 430 nm to 670 nm, the reflection characteristic curve of the first dichroic film has a shape that changes from a low reflectivity to a high reflectivity while tracking the short-wavelength side of the ideal spectral characteristic of green, and that in a portion where the reflection characteristic curve of the first dichroic film that goes down in the wavelength range of 430 nm to 670 nm, the reflection characteristic curve of the first dichroic film has a shape that changes from a high reflectivity to a low reflectivity while tracking the long-wavelength side of the ideal spectral characteristic of green.

Also, in the color-separation optical system according to the third aspect of the invention, when the first prism extracts the green light, the second prism extracts the blue light and the third prism extracts the red light, it is preferable that the second dichroic film has a film configuration for reflecting the blue light, and that a transmission characteristic curve of wavelength versus transmissivity of the second dichroic film has a shape that tracks a short-wavelength side of an ideal spectral characteristic of red.

Also, in the color-separation optical system according to the third aspect of the invention, when the first prism extracts the green light, the second prism extracts the red light and the third prism extracts the blue light, it is preferable that the second dichroic film has a film configuration for reflecting the red light, and a reflection characteristic curve of wavelength versus reflectivity of the second dichroic film has a shape that tracks a short-wavelength side of an ideal spectral characteristic of red.

Here, in the color-separation optical systems according to any of the first to third aspects of the invention, the "ideal spectral characteristic" means an ideal characteristic represented, for example, by the color-matching function in an RGB color coordinate system. Alternatively, the ideal spectral characteristic may be an ideal characteristic that is converted from chromaticity coordinates of three primary colors of a color reproducing medium and represented by a linear transformation of the color-matching function in the XYZ color coordinate system.

Also, the ideal spectral characteristic may be a characteristic obtained by additionally performing an inverse e transformation, such as decreasing negative values, for the ideal characteristic represented by the color-matching function or the ideal characteristic represented by the linear transformation of the color-matching function.

According to a fourth aspect of the invention, a color-separation optical system includes, in order from a light-incident side, a first prism, a second prism and a third prism. The first prism has a first dichroic film and extracts, among incident light, a first color light component reflected by the first dichroic film from. The second prism has a second dichroic film and extracts a second color light component which passes through the first dichroic film and which is reflected by the second dichroic film. The third prism extracts a third color light component which passes through the first and second dichroic films. A surface of the first prism on which the first dichroic film is formed and a light incidence surface of the second prism face each other with an air gap interposed therebetween. An antireflection film that reduces reflection of light, which is in a specific wavelength range and which passes through the first dichroic film, is formed on the light incidence surface of the second prism.

In the color-separation optical system according to the fourth aspect of the invention, the antireflection film for reducing reflection of light, which is in the specific wavelength range and which passes through the first dichroic film, is formed on the incident surface of the second prism. Therefore, it is possible to more effectively suppress the reflection from the air interface between the first prism and the second prism, in comparison with an antireflection film of a related art for reducing reflectivity all over the visible band. Accordingly, it is possible to reduce ghost occurring due to the reflection by the air interface between two prisms in comparison with the related art.

In the color-separation optical system according to the fourth aspect of the invention, when the first prism extracts blue light as the first color light component, the second prism extracts red light as the second color light component and the third prism extracts green light as the third color light component, it is preferable that the antireflection film formed on the light incidence surface of the second prism has a characteristic of reducing the reflection of light at least in a wavelength range of 500 nm to 550 nm as the light in the specific wavelength range. More specifically, it is preferable that the antireflection film has an average reflectivity of 0.7% or less in the wavelength range of 500 nm to 550 nm.

Also, the color-separation optical system according to any one of the first to fourth aspect of the invention may further include an absorbing filter that is disposed on a front side of the first prism or on an exiting-surface side of the prism, which extracts the red light. The absorbing filter may have a characteristic approximated to a luminosity factor. Also, a coating-type infrared cut filter for cutting an infrared ray may be further provided on a front side of the first prism. Also, an ultraviolet cut filter for cutting an ultraviolet ray may be further provided on the front side of the first prism. Also, a depolarizing plate for depolarizing polarization of incident light in a specific direction may be further provided on the front side of the first prism. Also, an absorbing filter for intercepting the blue light and the green light and transmitting the red light may be further provided on an exiting-surface side of the prism that extracts the red light.

Accordingly, it is easier to obtain a characteristic approximated to the ideal spectral characteristic.

An antireflection film may be formed on an exiting surface of at least one prism. Accordingly, it is possible to advantageously reduce the ghost and flare.

According to further another aspect of the invention, an imaging apparatus includes the color-separation optical system according to any one of the first to fourth aspect of the invention, and imaging devices. The imaging devices are disposed for the respective color components separated by the color-separation optical system. The imaging devices output electrical signals in accordance with the color components incident thereon.

In the imaging apparatus according to the one aspect of the invention, image signals with high color reproducibility are obtained on the basis of the light components obtained by the color-separation optical system according to any one of the first to fourth aspect of the invention.

In the imaging apparatus according to the one aspect of the invention, when the color-separation optical system uses the ideal characteristic for which the inverse transformation, such as reducing negative values, are performed, it may further include a calculation circuit that makes an inverse transformation, such as reproducing the negative values in the ideal characteristic on the basis of the signal values obtained by the imaging devices.

In the color-separation optical system according to the first aspect of the invention having the configuration that the blue light reflected by the first dichroic film is extracted as the first color light component by the first prism and the red light or the green light reflected by the second dichroic film is extracted as the second color light component by the second prism, the curve representing the characteristic of the first dichroic film and the curve representing the characteristic of the second dichroic film have the shapes that track the ideal spectral characteristic of green. Accordingly, it is possible to obtain the characteristic approximated to the ideal spectral characteristic without using the trimming filter having the dichroic film in the exiting surface of the prism. Therefore, it is possible to reduce ghost and flare in comparison with a wavelength selecting method of a related art that employing the trimming filter having the dichroic film and to obtain the characteristic approximated to the ideal spectral characteristic to improve color reproduction.

In the color-separation optical system according to the second aspect of the invention having the configuration that the red light reflected by the first dichroic film is extracted as the first color light component by the first prism and the blue light or the green light reflected by the second dichroic film is extracted as the second color light component by the second prism, the curve representing the characteristic of the first dichroic film and the curve representing the characteristic of the second dichroic film have the shapes that track the ideal spectral characteristic of green. Accordingly, it is possible to obtain a characteristic approximated to the ideal spectral characteristic without using the trimming filter having the dichroic film in the exiting surface of the prism. Therefore, it is possible to reduce ghost and flare in comparison with a wavelength selecting method of a related art that employs the trimming filter having the dichroic film and to obtain the characteristic approximated to the ideal spectral characteristic to improve color reproduction.

In the color-separation optical system according to the third aspect of the invention having the configuration that the green light reflected by the first dichroic film is extracted as the first color light component by the first prism and the blue light or the red light reflected by the second dichroic film is extracted as the second color light component by the second prism, the curve representing the characteristic of the first dichroic film has the shape that tracks the ideal spectral characteristic of green. Accordingly, it is possible to obtain a characteristic approximated to the ideal spectral characteristic without using the trimming filter having the dichroic film in the exiting surface of the prism. Therefore, it is possible to reduce ghost and flare in comparison with a wavelength selecting method of a related art that employs the trimming filter having the dichroic film and to obtain the characteristic approximated to the ideal spectral characteristic to improve color reproduction.

In the color-separation optical system according to the fourth aspect of the invention, the antireflection film that reduces the reflection of light, which is in the specific wavelength and which passes through the first dichroic film, is formed on the incidence surface of the second prism. Accordingly, it is possible to more effectively reduce the ghost due to the reflection by the air interface between two prisms in comparison with a related art.

In the imaging apparatus according to the one aspect of the invention, since the image signals corresponding to the light components obtained by the high-performance color-separation optical system according to any of the first to fourth aspect of the invention are output, it is possible to capture an image with high color reproducibility. Specifically, by employing the color-separation optical system according to the fourth aspect of the invention, it is possible to obtain a photographed image having excellent quality with ghost being reduced.

BRIEF DESCRIPTION OF THE DRAWINGS

FIG. 10 is a diagram illustrating numerical examples of a film design of the blue-light reflecting dichroic film DB, which is used in the color-separation optical system shown in FIG. 1.

FIG. 11 is a diagram illustrating numerical examples of a film design of the red-light reflecting dichroic film DR, which is used in the color-separation optical system shown in FIG. 1.

FIG. 24 is a diagram illustrating specific numerical examples for realizing a characteristic of the green-light reflecting dichroic film DG shown in FIG. 23.

FIG. 25 is a diagram illustrating specific numerical examples for realizing a characteristic of the blue-light reflecting dichroic film DB shown in FIG. 23.

FIG. 32 is a diagram illustrating an ideal characteristic used in a color-separation optical system according to a fifth embodiment of the invention, where

FIG. 46 is a diagram illustrating numerical examples of a film design of the blue-light reflecting dichroic film DB2, which is used in the color-separation optical system according to the eighth embodiment of the invention.

FIG. 47 is a diagram illustrating numerical examples of a film design of the red-light reflecting dichroic film DR2, which is used in the color-separation optical system according to the eighth embodiment of the invention.

DETAILED DESCRIPTION OF EMBODIMENTS OF THE INVENTION

Hereinafter, embodiments of the invention will be described in detail with reference to the drawings.

First Embodiment

Figure 1:
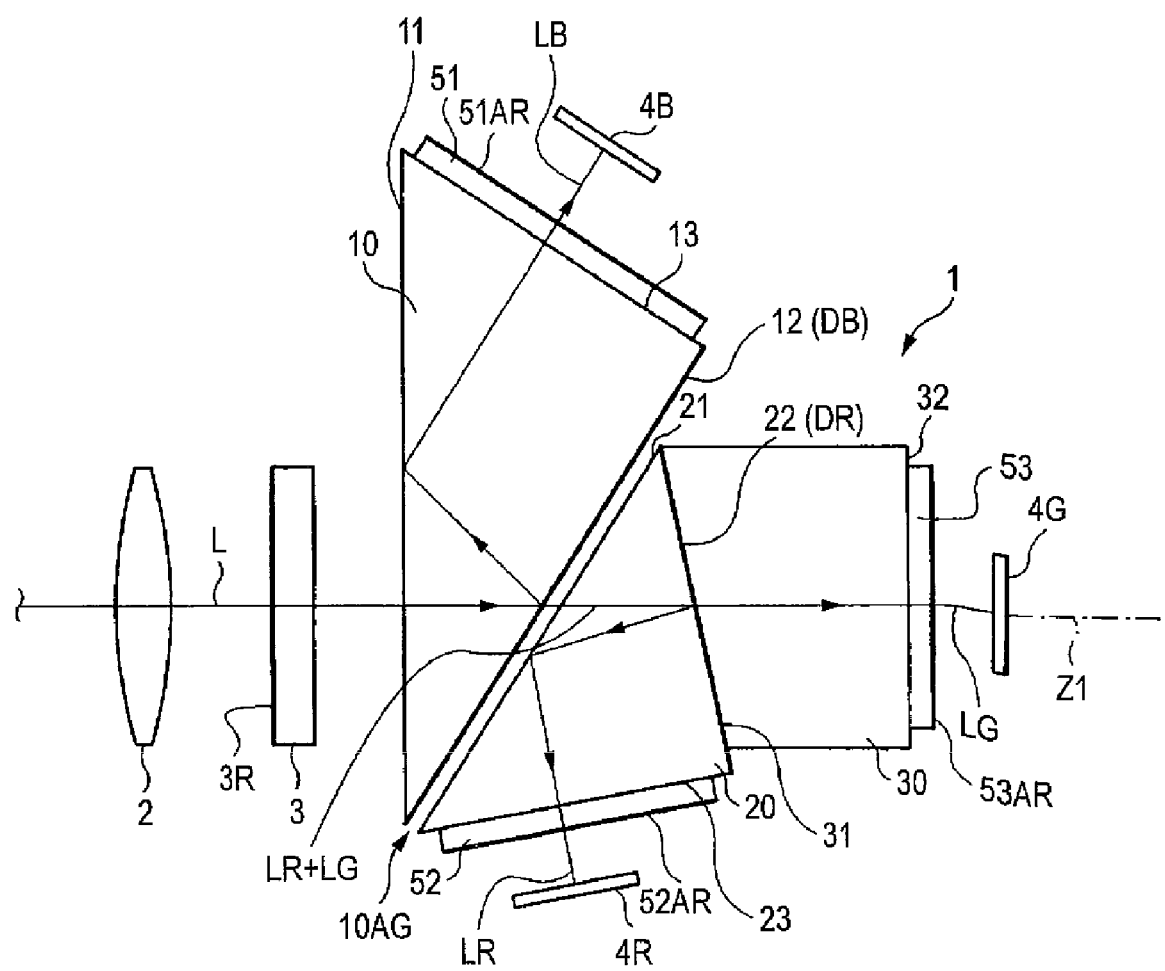
FIG. 1 is a sectional view illustrating an example of an imaging apparatus having a color-separation optical system according to a first embodiment of the invention.

FIG. 1 shows the configuration of a main portion of an imaging apparatus having a color-separation optical system 1 according to a first embodiment of the invention. The imaging apparatus is used as an imaging unit of, for example, a television camera. The color-separation optical system 1 serves to separate incident light L input through a taking lens 2 into three light components of blue light LB, red light LR, and green light LG. Imaging devices 4B, 4R, and 4G such as CCD are disposed to correspond to the respective light components separated by the color-separation optical system 1. The color-separation optical system 1 includes an IR (infrared) cut filter 3, a first prism 10, a second prism 20, and a third prism 30 in order from a light-incident side along an optical axis Z1. The color-separation optical system 1 according to this embodiment has the configuration that the blue light LB is extracted by the use of the first prism 10, the red light LR is extracted by the use of the second prism 20, and the green light LG is extracted by the use of the third prism 30.

The first prism 10 has a first surface 11, a second surface 12, and a third surface 13. The third surface 13 of the first prism 10 is a light exiting surface. A trimming filter 51 is formed on the exiting surface. The characteristic-adjusting dichroic film which is used in a related art is not disposed in the trimming filter 51, but instead, a ghost-flare preventing antireflection film 51AR is formed on the light exiting surface of the trimming filter 51. The antireflection film 51AR may be formed directly on the third surface 13 of the first prism 10, without the trimming filter 51 being provided.

A blue-light reflecting dichroic film DB as a first dichroic film is formed on the second surface 12 of the first prism 10. The blue-light reflecting dichroic film DB has a film configuration for reflecting the blue light LB as the first color light component and transmitting the red light LR and the green light LG. A transmission characteristic curve of wavelength versus transmissivity of the blue-light reflecting dichroic film DB has a shape that tracks a short-wavelength side of an ideal spectral characteristic of green, which is obtained by the conversion from chromaticity coordinates of three primary colors of a color reproducing medium and which is determined based on the color-matching function in the XYZ color coordinate system. Here, the "ideal characteristic" is a characteristic known in the past and shown in FIG. 54 and. The ideal characteristic itself is converted from the chromaticity coordinates of three primary colors of the color reproducing medium and can be obtained by the linear transformation of the color-matching function in the XYZ color coordinate system. An ideal characteristic itself represented by a color-matching function in the RGB color coordinate system may be used as the "ideal characteristic."

Figure 2A:
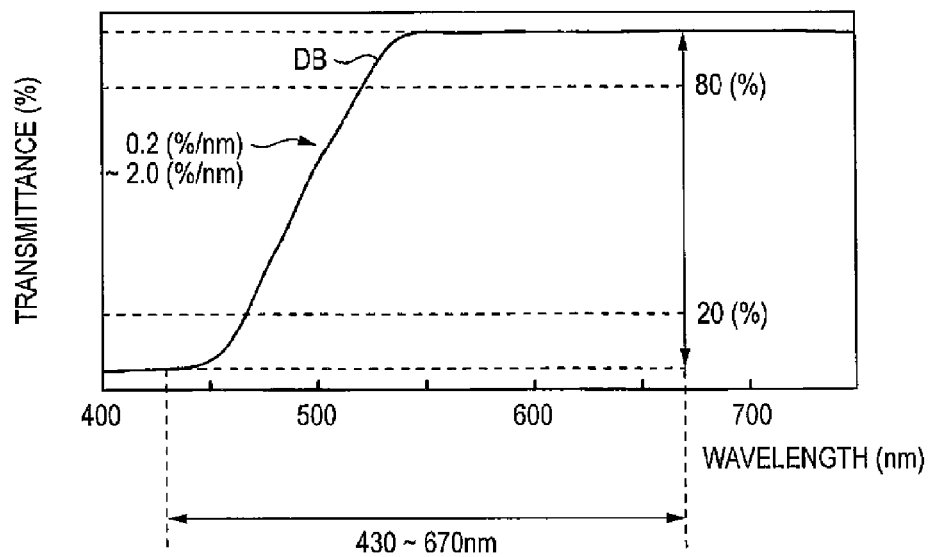
FIG. 2A is a diagram illustrating a characteristic of a blue-light reflecting dichroic film DB used in the color-separation optical system shown in FIG. 1.

FIG. 2A shows an example of the transmission characteristic curve of the blue-light reflecting dichroic film DB in the configuration shown in FIG. 1. The blue-light reflecting dichroic film DB is configured so that the transmission characteristic curve has a shape that goes up from a low transmissivity to a high transmissivity in a wavelength range of 430 nm to 670 nm while tracking the short-wavelength side of the ideal spectral characteristic of green. More specifically, it is preferable that the transmission characteristic curve has such a shape that an average slope is equal to or larger than 0.2 (%/nm) and is equal to or less than 2.0 (%/nm) in a portion where the transmission characteristic curve changes from 20% to 80% of a range that is defined between the lowest transmissivity and the highest transmissivity in the wavelength range of 430 nm to 670 nm.

The second prism 20 has a first surface 21, a second surface 22, and a third surface 23. The second prism 20 is disposed apart from the first prism 10 with a predetermined air gap 10AG interposed therebetween. More specifically, the first surface 21 of the second prism 20 and the second surface 12 of the first prism 10 are disposed to face each other with the air gap 10AG interposed therebetween so as to be substantially parallel to each other. The third surface 23 of the second prism 20 is a light exiting surface. A trimming filter 52 is disposed on the exiting surface. Similarly to the trimming filter 51 of the first prism 10, a characteristic-adjusting dichroic film is not disposed in the trimming filter 52, but a ghost-flare preventing antireflection film 52AR is formed on the light exiting surface of the trimming filter 52. Without the trimming filter 52 being provided, the antireflection film 52AR may be formed directly on the third surface 23 of the second prism 20.

A red-light reflecting dichroic film DR as a second dichroic film is formed on the second surface 22 of the second prism 20. The red-light reflecting dichroic film DR has a film configuration for reflecting the red light LR as the second color light component and transmitting the green light LG. A transmission characteristic curve of wavelength versus transmissivity of the red-light reflecting dichroic film DR has a shape that tracks the long-wavelength side of the ideal spectral characteristic of green.

Figure 2B:
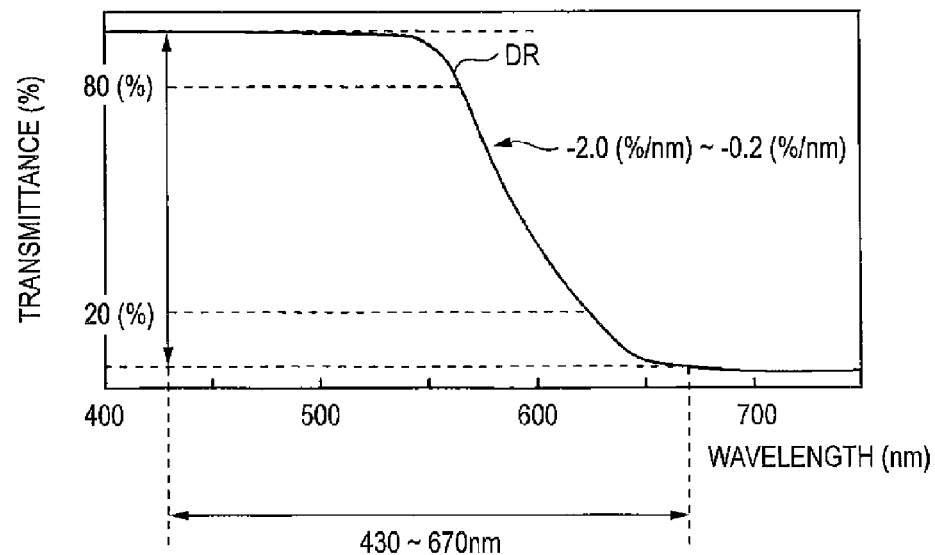
FIG. 2B is a diagram illustrating a characteristic of a red-light reflecting dichroic film DR used therein.

FIG. 2B shows an example of the transmission characteristic curve of the red-light reflecting dichroic film DR in the configuration shown in FIG. 1. The red-light reflecting dichroic film DR is configured so that the transmission characteristic curve has a shape that goes down from a high transmissivity to a low transmissivity in the wavelength range of 430 nm to 670 nm while tracking the long-wavelength side of the ideal spectral characteristic of green. More specifically, it is preferable that the transmission characteristic curve has such a shape that an average slope value is equal to or larger than −2.0 (%/nm) and is equal to or less than −0.2 (%/nm) in a portion where the transmission characteristic curve changes from 80% to 20% of a range that is defined between the highest transmissivity and the lowest transmissivity in the wavelength range of 430 nm to 670 nm.

The third prism 30 has a first surface 31 and a second surface 32. The third prism 30 is bonded to the second prism 20 with the red-light reflecting dichroic film DR interposed therebetween. More specifically, the second surface 22 of the second prism 20 and the first surface 31 of the third prism 30 are bonded to each other with the red-light reflecting dichroic film DR. The second surface 32 of the third prism 30 is a light exiting surface. A trimming filter is disposed on the exiting surface. Similarly to the trimming filter 51 of the first prism 10, a characteristic-adjusting dichroic film is not disposed in the trimming filter 53, but a ghost-flare preventing antireflection film 53AR is formed on the light exiting surface of the trimming filter 53 instead. Without the trimming filter 53 being provided, an antireflection film 53AR may be formed directly on the second surface 32 of the third prism 30.

The IR cut filter 3 is disposed on the front side of the first prism 10. In order to more easily obtain a characteristic approximated to the ideal spectral characteristic, the IR cut filter 3 preferably includes an absorbing filter having a characteristic approximated to the luminosity factor If the infrared ray cannot be removed sufficiently only by the absorbing filter, a coating-type infrared cut filter for cutting the infrared ray may be further provided. FIG. 1 shows an example where a panel-shaped absorbing filter is coated with a film 3R for cutting the infrared ray. The IR cut filter 3 may be disposed on at least one of (i) the light-exiting-surface side of the prism (the second prism 20 in FIG. 1) for extracting the red light and (ii) the front side of the first prism 10.

Although not shown, the color-separation optical system 1 may further include an absorbing type or coating type infrared cut filter disposed on the front side of the first prism 10 so as to cut the infrared ray.

Next, operations of the imaging apparatus according to this embodiment and particularly, operations and advantages of the color-separation optical system 1 will be described.

In the imaging apparatus, light that is emitted from a light source not shown and is reflected by a subject not shown is incident on the color-separation optical system 1 through the taking lens 2. The color-separation optical system 1 separates the incident light L into three light components of the blue light LB, the red light LR, and the green light LG. More specifically, the blue light LB of the incident light L is reflected by the blue-light reflecting dichroic film DB and is extracted as the first color light component by the first prism 10. The red light LR passing through the blue-light reflecting dichroic film DB is reflected by the red-light reflecting dichroic film DR and is extracted as the second color light component by the second prism 20. The green light LG passing through the blue-light reflecting dichroic film DB and the red-light reflecting dichroic film DR is extracted as the third color light component by the third prism 30. The light components separated by the color-separation optical system 1 are incident on the imaging devices 4B, 4R, and 4G disposed to correspond to the respective light components. The imaging devices 4B, 4R, and 4G output electrical signals in accordance with the light components are output as the image signals.

In this embodiment, since the curve representing the characteristic of the blue-light reflecting dichroic film DB and the curve representing the characteristic of the red-light reflecting dichroic film DR have the shapes along the characteristic curve of the ideal spectral characteristic of green, a characteristic approximated to the ideal spectral characteristic is obtained without using a trimming filter which having a dichroic film in the exiting surface of the prism. Since it is not necessary to use the trimming filter having the dichroic film, the ghost and flare due to the dichroic film of the trimming filter is suppressed from occurring. Accordingly, it is possible to embody the ideal spectral characteristic with the ghost and flare being reduced.

Hereinafter, the spectral characteristic obtained in this embodiment will be described with reference to actual design examples.

Figure 3:
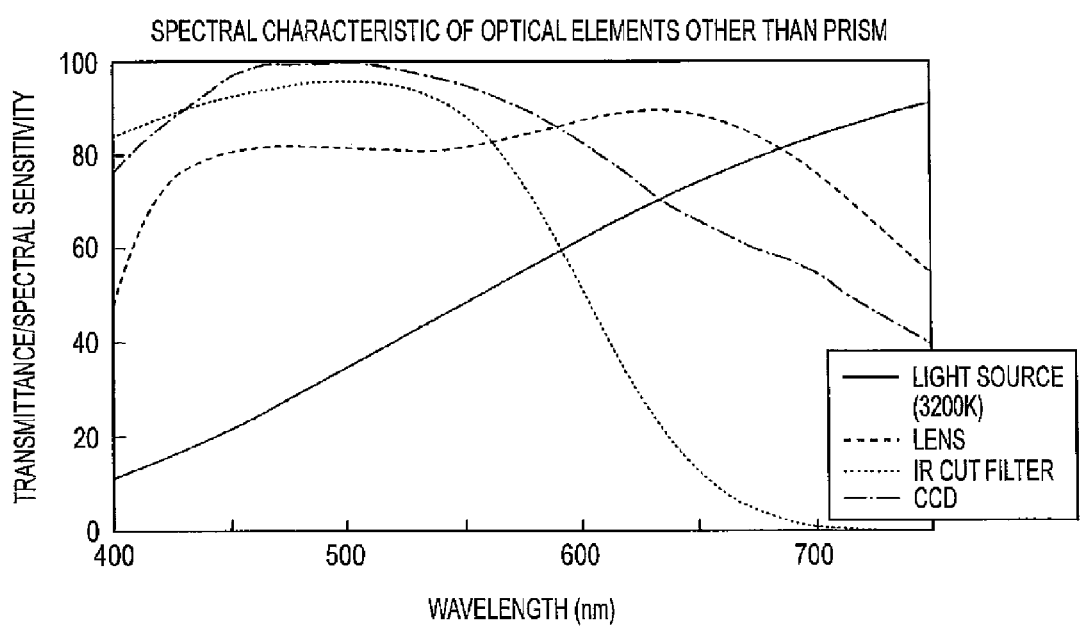
FIG. 3 is a diagram illustrating a spectral characteristic of optical elements other than a prism portion in the imaging apparatus according to the first embodiment of the invention.
Figure 4:
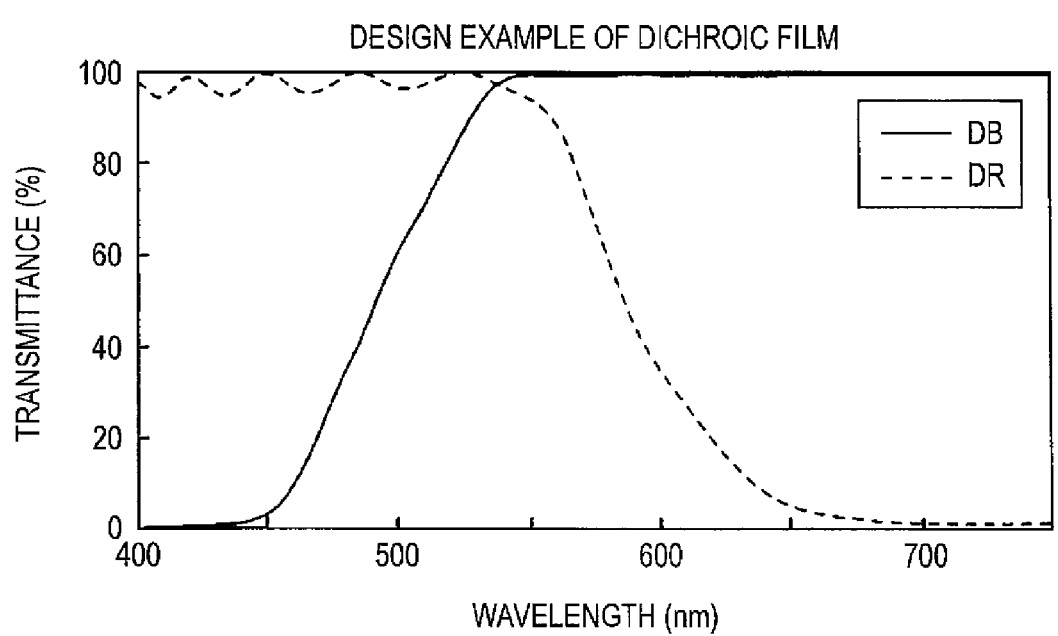
FIG. 4 is a characteristic diagram illustrating a design example of the blue-light reflecting dichroic film DB and the red-light reflecting dichroic film DR, which are used in the color-separation optical system shown in FIG. 1.

FIG. 3 shows an example of a spectral characteristic of optical elements other than the prism portion in the imaging apparatus. In FIG. 3, a light source (not shown) having a color temperature of 3200K, the taking lens 2, the IR cut filter 3, and the CCDs as the imaging devices 4R, 4G, and 4B are shown as the optical element other than the prism portion. FIG. 4 shows specific design examples of the blue-light reflecting dichroic film DB and the red-light reflecting dichroic film DR, which are used in the color-separation optical system 1 shown in FIG. 1. For example, the film characteristic shown in FIG. 4 is obtained by a film design shown as specific numerical data in FIGS. 10 and 11. However, the film material, the number of layers, and thicknesses of the layers are not limited to the examples shown in FIGS. 10 and 11.

Figure 5:
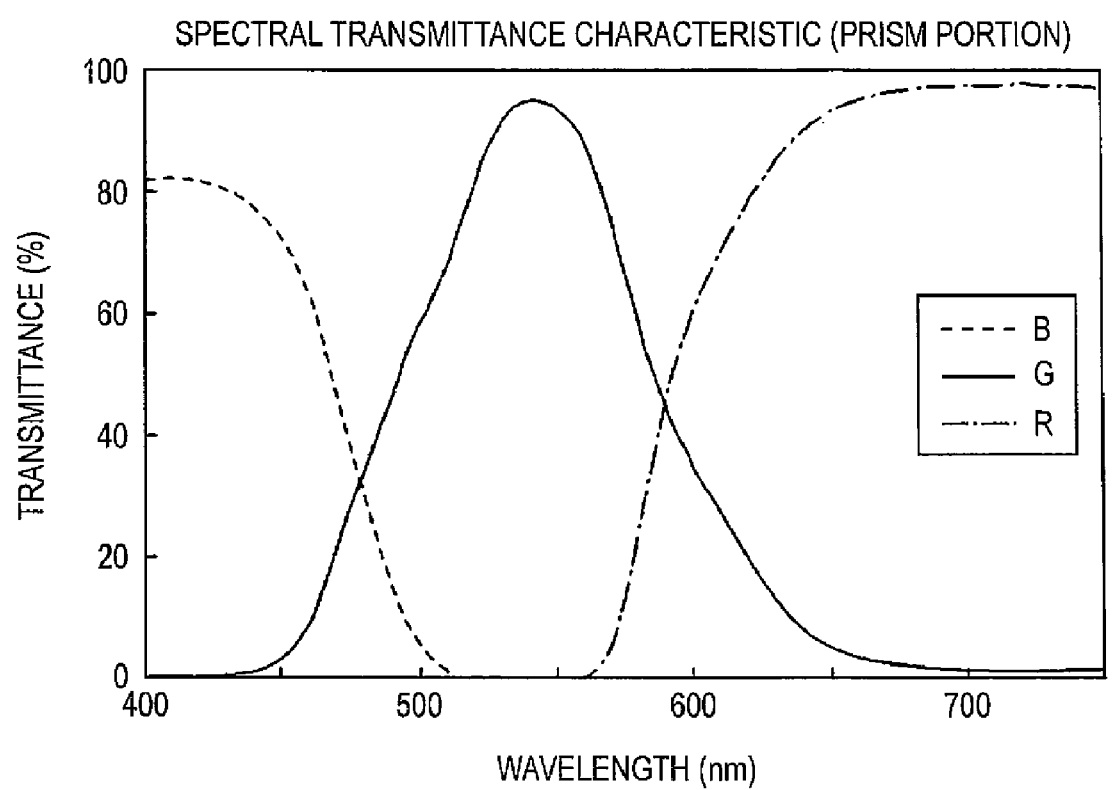
FIG. 5 is a diagram illustrating a spectral characteristic of the prism portion in the imaging apparatus according to the first embodiment of the invention.
Figure 6:
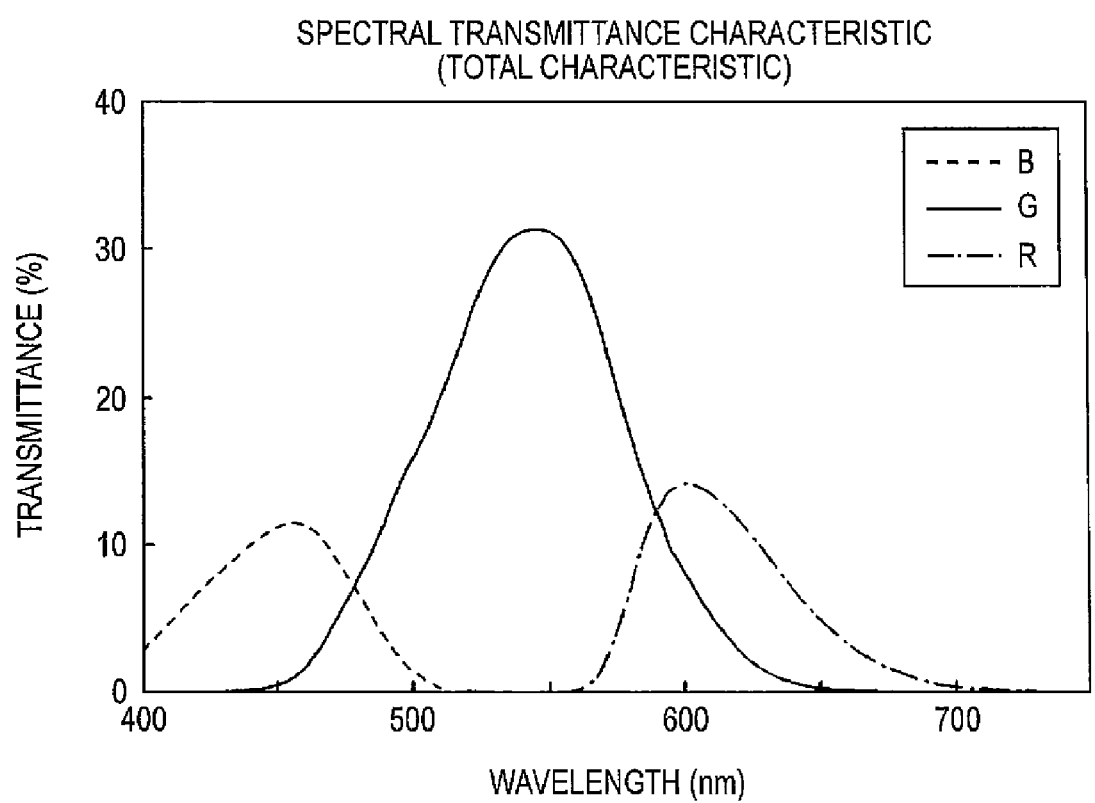
FIG. 6 is a diagram illustrating a total spectral characteristic of an optical system in the imaging apparatus according to the first embodiment of the invention.

FIG. 5 shows a spectral transmission characteristic of the entire prism portion (all the first, second, and third prisms 10, 20, and 30) having the film design shown in FIG. 4. FIG. 6 shows a total spectral transmission characteristic of the entire optical system in the imaging apparatus, in which the characteristic of the optical elements other than the prism portion shown in FIG. 3 and the total characteristic of the prism portion shown in FIG. 5 are combined.

Figure 7:
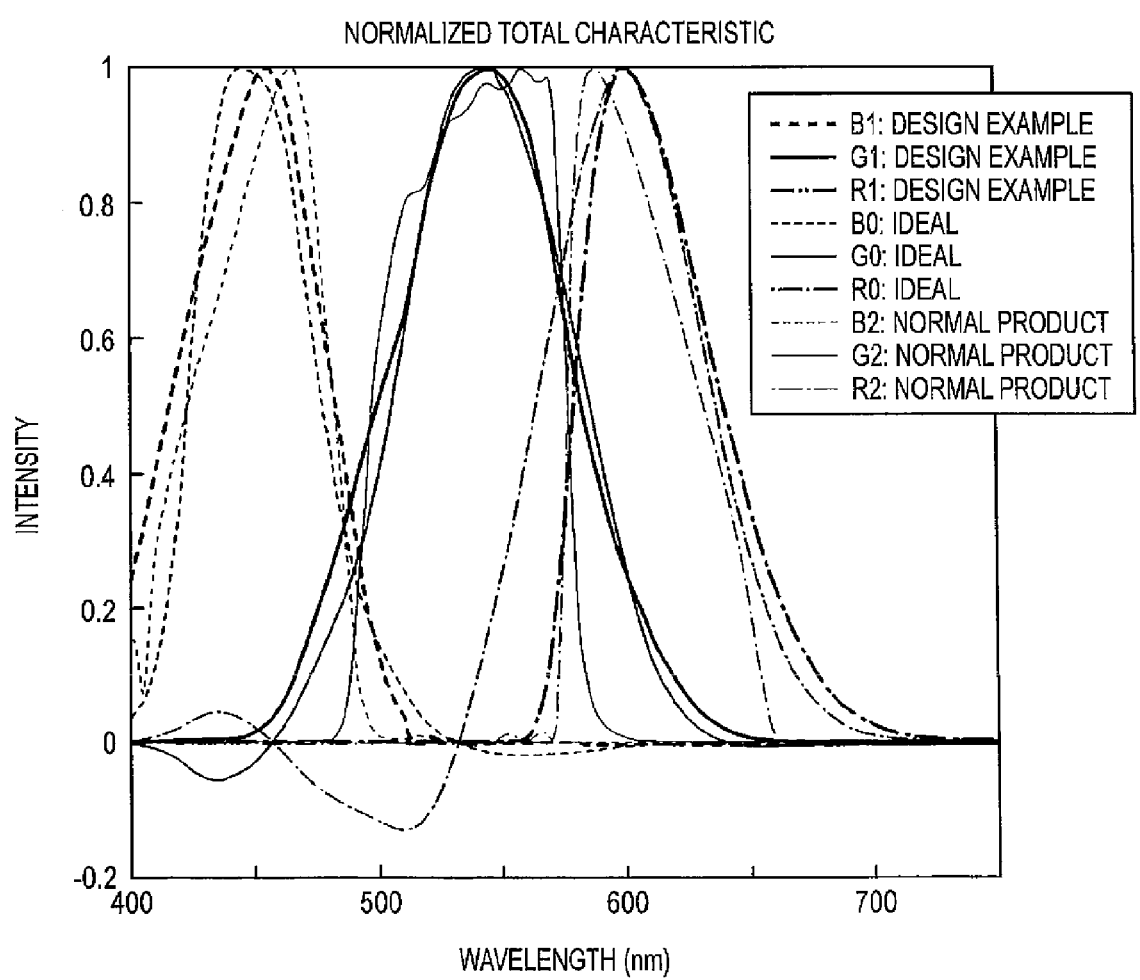
FIG. 7 is a diagram illustrating a normalized total spectral characteristic according to the first embodiment of the invention with the normalized total spectral characteristic being compared to an ideal characteristic and a characteristic of a related art.

FIG. 7 shows a normalized characteristic of the total spectral transmission characteristic shown in FIG. 6. For the purpose of comparison, FIG. 7 also shows characteristics (B2, R2, and G2) of a normal product using the color-separation optical system of the related art together with the ideal characteristics (B0, R0, and G0). Here, the ideal characteristic is a characteristic known in the past and shown in FIG. 54. It can be seen from FIG. 7 that the characteristics (B1, R1, and G1) in the design example according to this embodiment are more approximated to the ideal characteristic in comparison with the characteristics of the normal product of the related art.

Figure 8:
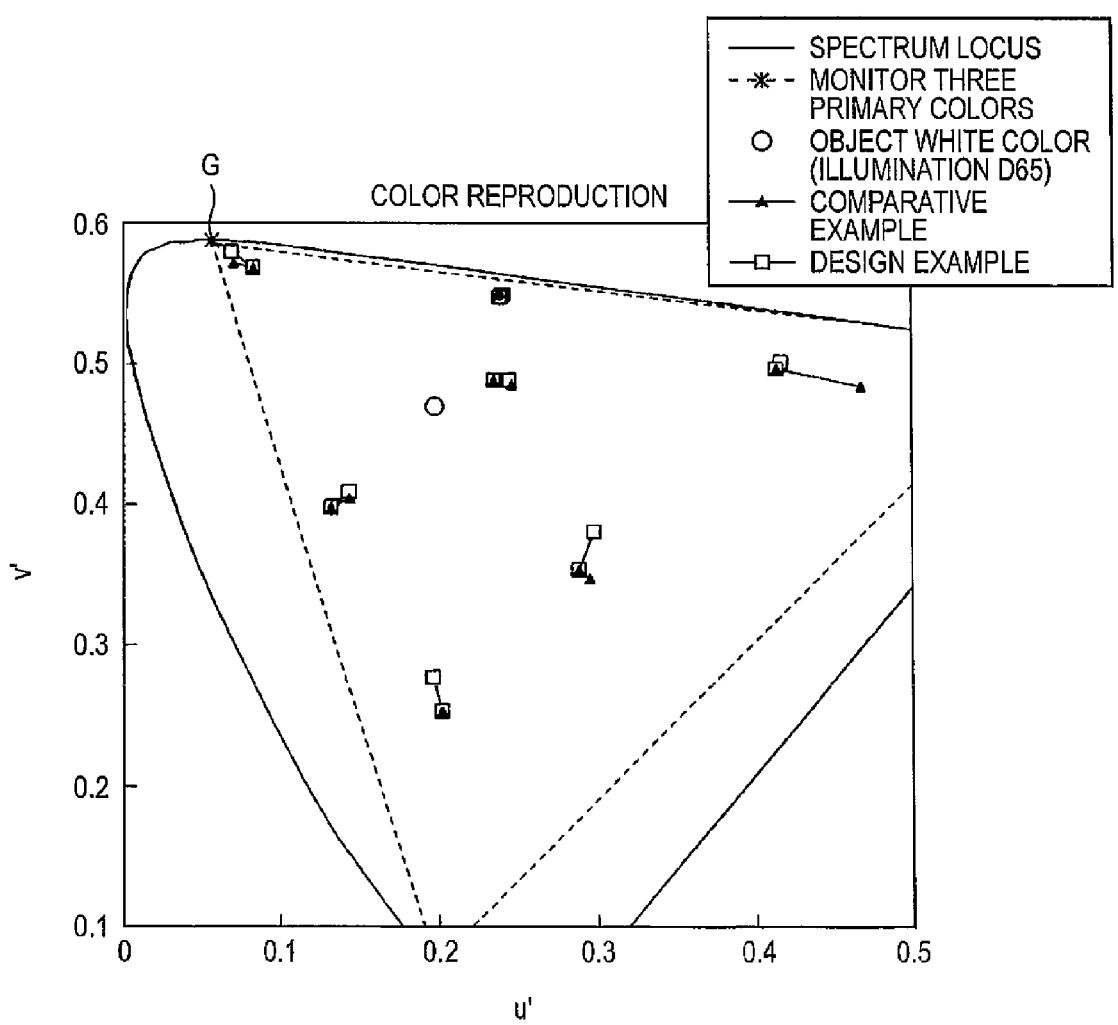
FIG. 8 is an u'v' chromaticity diagram illustrating color reproduction in the first embodiment of the invention with the color reproduction being compared to the conventional.

FIG. 8 is an u'v' chromaticity diagram illustrating color reproduction of the design example according to this embodiment with the color reproduction being compared to the related art. The horizontal axis represents a u' chromaticity coordinate value and the vertical axis represents a v' chromaticity coordinate value. In the drawing, the triangular region surrounded by dotted lines is obtained by connecting the chromaticity coordinate values of three primary colors R, G, and B of a color reproducing medium (monitor), representing a color range which can be reproduced by the color reproducing medium. As it gets closer to the periphery of the triangle, the saturation becomes higher. Although coordinate points of red R and blur B are hidden in FIG. 8 due to enlargement of the chromaticity coordinates, the coordinate point of red R as a primary color exists in the upper-right side in the color reproducing medium and the coordinate point of blue B as a primary color exists in the lower-left side. In the drawing, the coordinate point of an outlined circle "○" in the triangular region represents a white color of an object. In the drawing, the coordinate points of filled triangles "▲" in the triangular region represent coordinate points of arbitrary colors in the configuration of the related art. The coordinate points of outlined squares "☐" represent coordinate points of arbitrary colors in the design example according to this embodiment. In the configuration of the related art and the design example according to this embodiment, a deviated amount from an ideal point (deviated amount in reproduced color) is indicated by a solid line connecting the coordinate points. Although the reproduced colors in the configuration of the related art largely move in the upper-right red region, it is improved greatly in the design example according to this embodiment. In the design example according to this embodiment, there is no space where a color largely moves from the ideal point in total balance, thereby improving the color reproduction. An average color difference of seven colors of B (blue), G (green), R (red), C (cyan), Y (yellow), M (magenta), and skin (skin color) is improved from 8.84 to 7.37.

Figure 9:
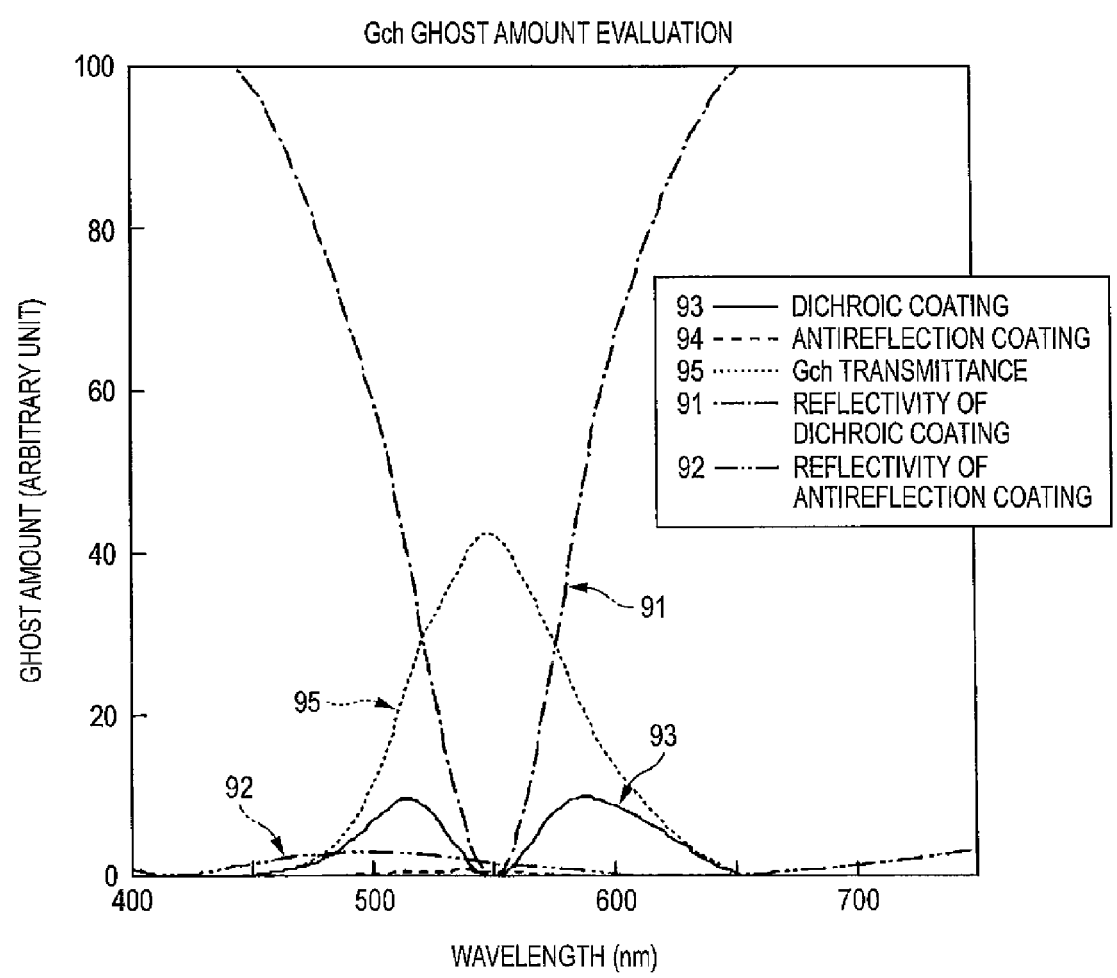
FIG. 9 is a diagram illustrating a ghost amount in the color-separation optical system according to the first embodiment of the invention with the ghost amount being compared to the related art.
Figure 52:
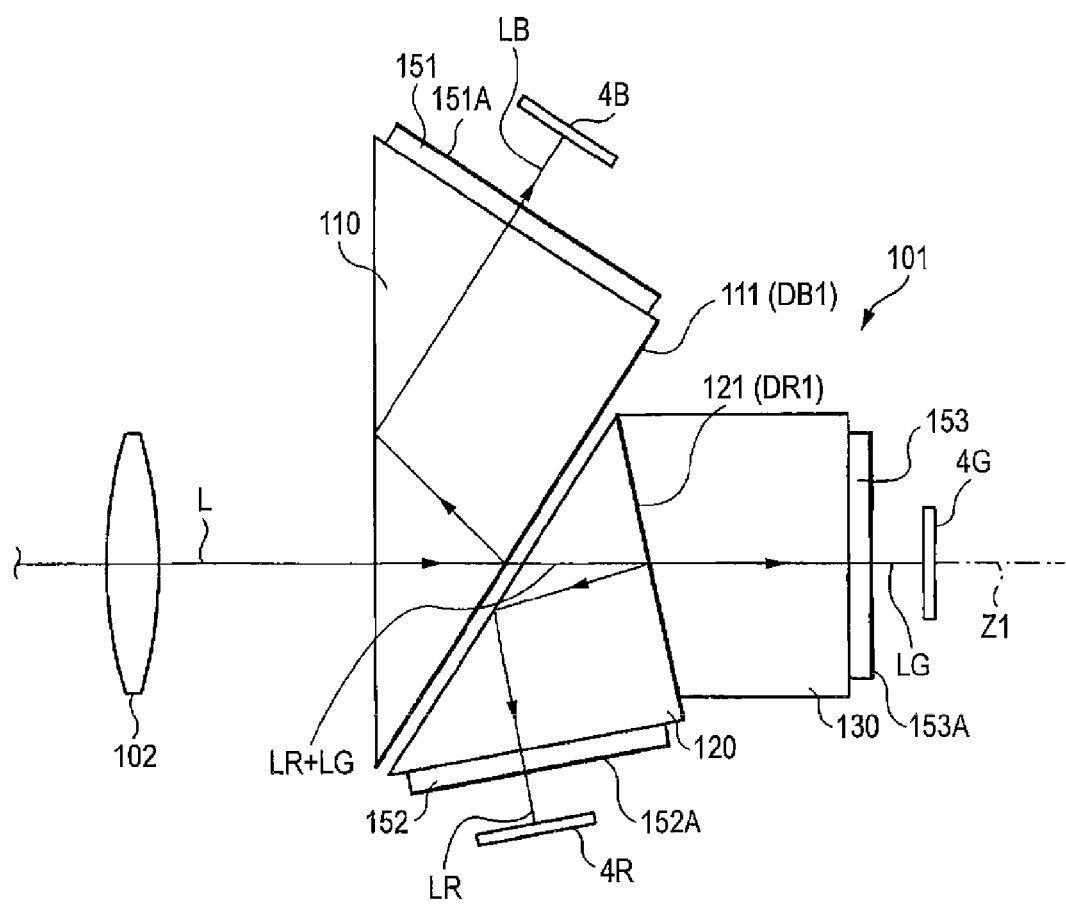
FIG. 52 is a sectional view illustrating an example of the color-separation optical system of a related art.
Figure 53:
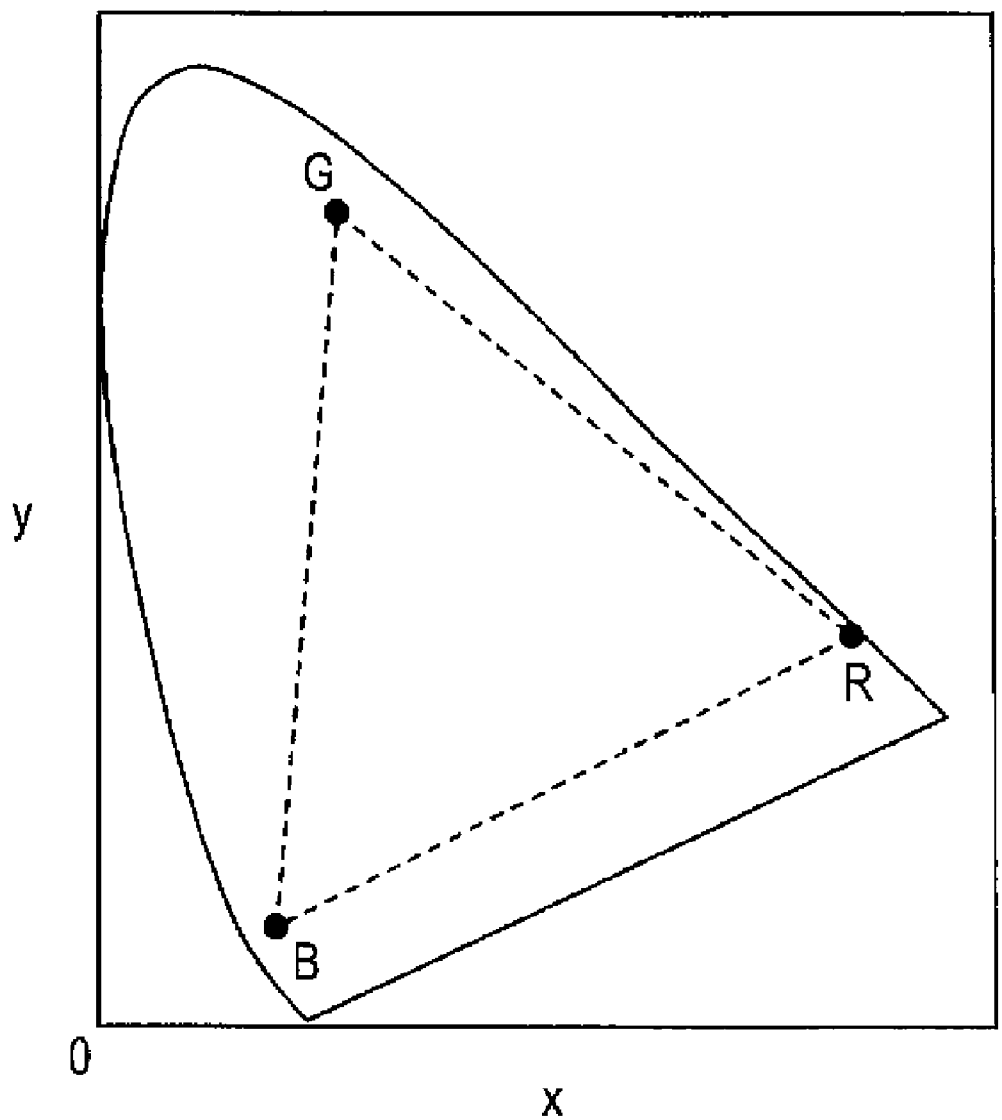
FIG. 53 is a xy chromaticity diagram illustrating chromaticity coordinates of three primary colors for obtaining an ideal characteristic.

FIG. 9 shows a ghost amount occurring in the color-separation optical system 1 according to this embodiment with the ghost amount being compared to the configuration of the related art. Here, the configuration of the related art means a configuration of a color-separation optical system 101 having trimming filters 151, 152, and 153 having dichroic films 151A, 152A, and 153A, as shown in FIG. 52. On the contrary, in the color-separation optical system 1 according to this embodiment, the ghost-flare preventing antireflection films 51AR, 52AR, and 53AR instead of the dichroic films are formed on the light exiting surfaces of the trimming filters 51, 52, and 53.

FIG. 9 shows ghost amounts occurring on a side from which the green light LG is emitted. In FIG. 9, a curve denoted by reference numeral 95 represents transmissivity of the green light LG in the trimming filter 153 of the related-art configuration and the trimming filter 53 of this embodiment. A curve denoted by reference numeral 91 represents reflectivity of the dichroic film 153A of the trimming filter 153 in the related-art configuration. A curve denoted by reference numeral 92 represents reflectivity of the antireflection film 53AR of the trimming filter 53 in this embodiment. The ghost amount of the green light LG in the related-art configuration is obtained by multiplying the transmissivity denoted by reference numeral 95 by the reflectivity denoted by reference numeral 91. A curve denoted by reference numeral 93 represents the ghost amount of the related art. On the other hand, the ghost amount of the green light LG in this embodiment is obtained by multiplying the transmissivity denoted by reference numeral 95 by the reflectivity denoted by reference numeral 92. A curve denoted by reference numeral 94 represents the ghost amount in this embodiment. The ghost amount in this embodiment is much smaller than that in the related-art configuration. In FIG. 9, a general antireflection coating for reducing the reflection over the entire visible range is exemplified as the antireflection film 53AR. However, an antireflection coating in a specific wavelength range may be used, which reduces the reflectivity particularly in a wavelength range in which light is emitted from the exiting surface of the prism.

As described above, in the color-separation optical system 1 according to this embodiment, it is possible to reduce the ghost and flare in comparison with a wavelength selecting method of the related art employing a trimming filter having a dichroic film and to obtain a characteristic approximated to the ideal spectral characteristic to improve the color reproduction. In the imaging apparatus according to this embodiment, image signals are output in accordance with the color components obtained by the color-separation optical system 1, having high performance, according to this embodiment. Therefore, it is possible to capture an image with high color reproduction.

Modified Examples of First Embodiment

Hereinafter, modified examples of the color-separation optical system 1 will be described. In the following modified examples, the same elements as shown in FIG. 1 are denoted by the same reference numerals.

First Modified Example

Figure 12:
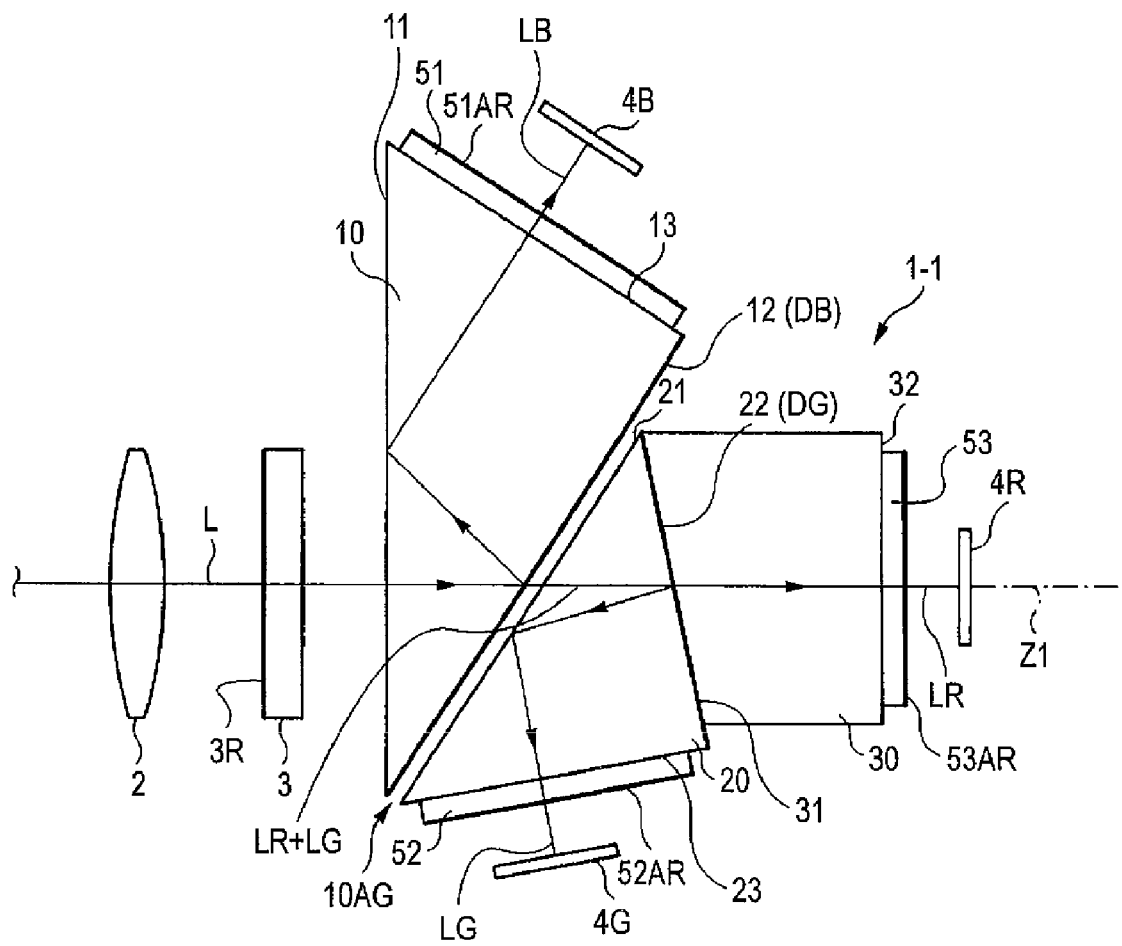
FIG. 12 is a sectional view illustrating an imaging apparatus having a color-separation optical system according to a first modified example of the first embodiment of the invention.

FIG. 12 shows a configuration of a color-separation optical system 1-1 according to a first modified example. The color-separation optical system 1-1 is different from the color-separation optical system 1 shown in FIG. 1 in the sequence of extracting the light components. In the color-separation optical system 1-1, the blue light LB is extracted by the use of the first prism 10, the green light LG is extracted by the use of the second prism 20, and the red light LR is extracted by the use of the third prism 30.

Figure 13A:
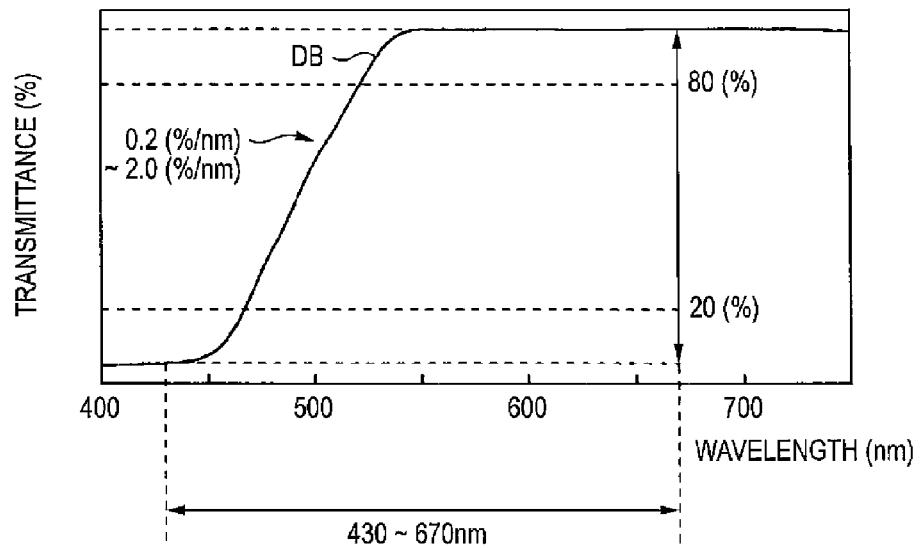
FIG. 13A is a diagram illustrating a characteristic of a blue-light reflecting dichroic film DB used in the color-separation optical system shown in FIG. 12.

In the color-separation optical system 1-1 according to this modified example, similarly to the color-separation optical system 1 shown in FIG. 1, the blue-light reflecting dichroic film DB is formed as the first dichroic film on the second surface 12 of the first prism 10. An example of the transmission characteristic curve of the blue-light reflecting dichroic film DB of this modified example is shown in FIG. 13A, which is similar to the transmission characteristic curve shown in FIG. 2A.

Although the red-light reflecting dichroic film DR is formed as the second dichroic film on the second surface 22 of the second prism 20 in the color-separation optical system 1 shown in FIG. 1, the green-light reflecting dichroic film DG instead of the red-light reflecting dichroic film DR is formed as the second dichroic film in the color-separation optical system 1-1 according to this modified example. The green-light reflecting dichroic film DG has a film configuration for reflecting the green light LG as the second color light component and transmitting the red light LR. In this modified example, the reflection characteristic curve of wavelength versus reflectivity of the green-light reflecting dichroic film DG has a shape that tracks the long-wavelength side of the ideal spectral characteristic of green.

Figure 13B:
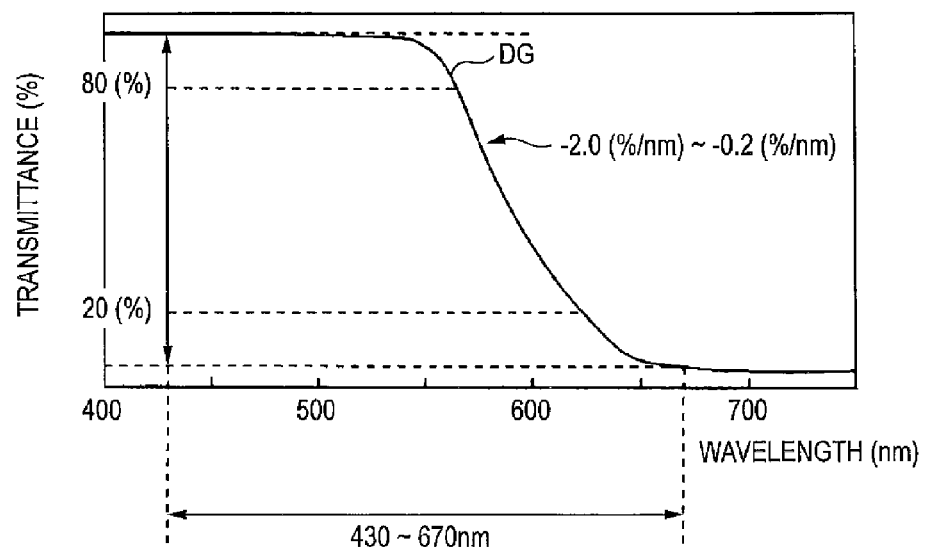
FIG. 13B is a diagram illustrating a characteristic of a green-light reflecting dichroic film DG used therein.

FIG. 13B shows an example of the reflectivity characteristic curve of the green-light reflecting dichroic film DG in the configuration shown in FIG. 12. In this modified example, the green-light reflecting dichroic film DG is configured so that the reflection characteristic curve has a shape that goes down from a high reflectivity to a low reflectivity in the wavelength range of 430 nm to 670 nm while tracking the long-wavelength side of the ideal spectral characteristic of green. More specifically, it is preferable that the reflection characteristic curve has such a shape that an average slope value is equal or larger than −2.0 (%/nm) and is equal or less than −0.2 (%/nm) in a portion where the reflection characteristic curve changes from 80% to 20% of a range that is defined between the highest reflectivity and the lowest reflectivity in the wavelength range of 430 nm to 670 nm.

In the color-separation optical system 1-1, first, the blue light LB of the incident light L is reflected by the blue-light reflecting dichroic film DB and is extracted as the first color light component from the first prism 10. The green light LG passing through the blue-light reflecting dichroic film DB is reflected by the green-light reflecting dichroic film DG and is extracted as the second color light component from the second prism 20. The red light LR passing through the blue-light reflecting dichroic film DB and the green-light reflecting dichroic film DG is extracted as the third color light component from the third prism 30.

In this modified example, since the curve representing the characteristic of the blue-light reflecting dichroic film DB and the curve representing the characteristic of the green-light reflecting dichroic film DG have shapes that track the ideal spectral characteristic of green, a characteristic approximated to the ideal spectral characteristic without using the trimming filter having a dichroic film attached thereto in the exiting surface of a prism. Since it is not necessary to use the trimming filter having a dichroic film attached thereto, the ghost and flare due to the dichroic film of the trimming filter is suppressed from occurring. Accordingly, it is possible to embody an imaging apparatus having the ideal spectral characteristic with the ghost and flare being reduced. The other configurations, operations, and advantages are similar to those of the color-separation optical system 1 shown in FIG. 1.

Second Modified Example

Figure 14:
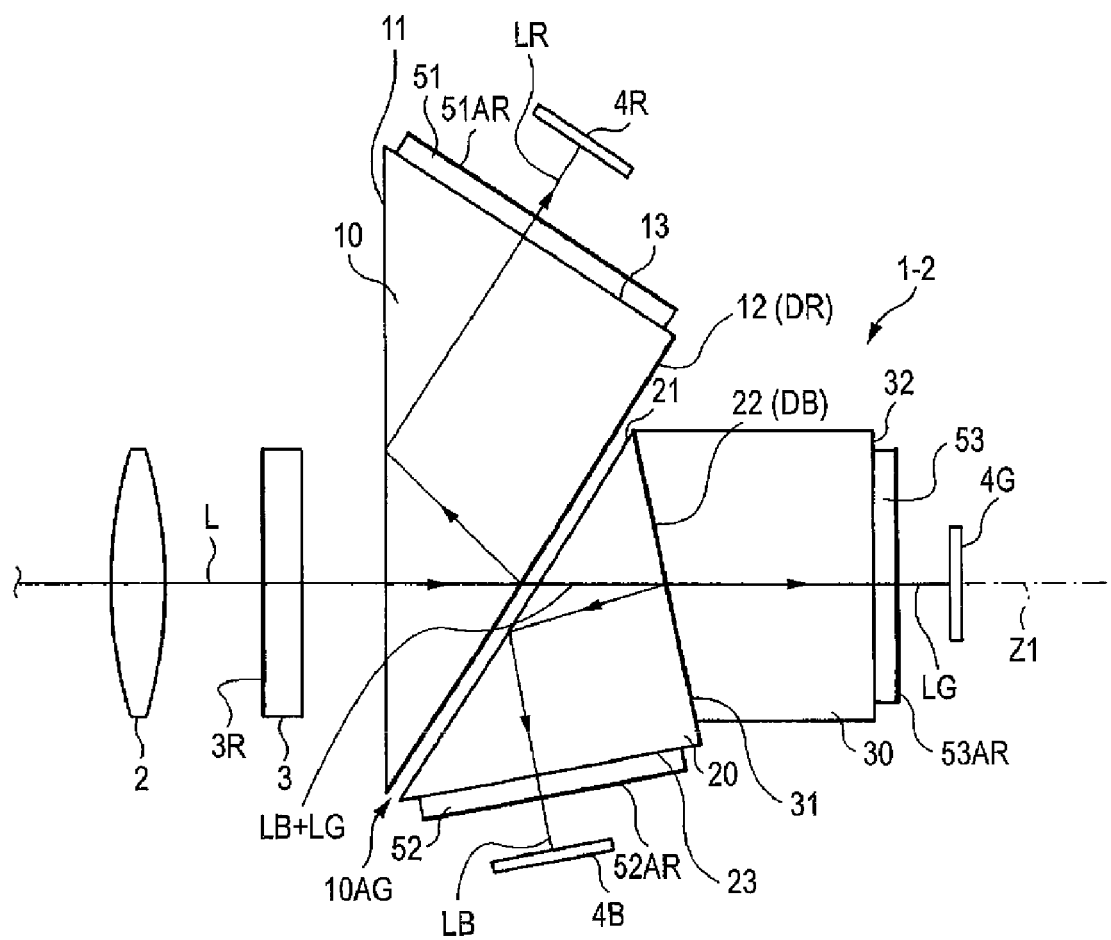
FIG. 14 is a sectional view illustrating an imaging apparatus having a color-separation optical system according to a second modified example of the first embodiment of the invention.

FIG. 14 shows the configuration of a color-separation optical system 1-2 according to a second modified example. The color-separation optical system 1-2 is different from the color-separation optical system 1 shown in FIG. 1 in the sequence of extracting the light components. In the color-separation optical system 1-2, the red light LR is extracted by the use of the first prism 10, the blue light LB is extracted by the use of the second prism 20, and the green light LG is extracted by the use of the third prism 30.

Although the blue-light reflecting dichroic film DB is formed as the first dichroic film on the second surface 12 of the first prism 10 in the color-separation optical system 1 shown in FIG. 1, the red-light reflecting dichroic film DR is formed, instead of the blue-light reflecting dichroic film DB, in the color-separation optical system 1-2 according to this modified example. The red-light reflecting dichroic film DR has a film configuration for reflecting the red light LR as the second color light component and transmitting the blue light LB and the green light LG. The red-light reflecting dichroic film DR in this modified example is different in surface of a prism on which the film is formed, and is similar in characteristic to the red-light reflecting dichroic film DR in the color-separation optical system 1 shown in FIG. 1. The transmission characteristic curve thereof is similar to that shown in FIG. 2B.

Although the red-light reflecting dichroic film DR is formed as the second dichroic film on the second surface 22 of the second prism 20 in the color-separation optical system 1 shown in FIG. 1, the blue-light reflecting dichroic film DB instead of the red-light reflecting dichroic film DR is formed as the second dichroic film in the color-separation optical system 1-2 according to this modified example. The blue-light reflecting dichroic film DB has a film configuration for reflecting the blue light LB as the second color light component and transmitting the green light LG. The blue-light reflecting dichroic film DB in this modified example is different in surface of a prism on which the film is formed, and is similar in characteristic to the blue-light reflecting dichroic film DB in the color-separation optical system 1 shown in FIG. 1. The transmission characteristic curve thereof is similar to that shown in FIG. 2A.

In the color-separation optical system 1-2, first, the red light LR of the incident light L is reflected by the red-light reflecting dichroic film DR and is extracted as the first color light component by the first prism 10. The blue light LB passing through the red-light reflecting dichroic film DR is reflected by the blue-light reflecting dichroic film DB and is extracted as the second color light component by the second prism 20. The green light LG passing through the red-light reflecting dichroic film DR and the blue-light reflecting dichroic film DB is extracted as the third color light component by the third prism 30.

This modified example is different from the color-separation optical system 1 shown in FIG. 1 in prism surfaces on which the red-light reflecting dichroic film DR and the blue-light reflecting dichroic film DB are formed and in sequence of extracting the light components. The basic configuration, operations, and advantages are similar to those of the color-separation optical system 1 shown in FIG. 1.

Third Modified Example

Figure 15:
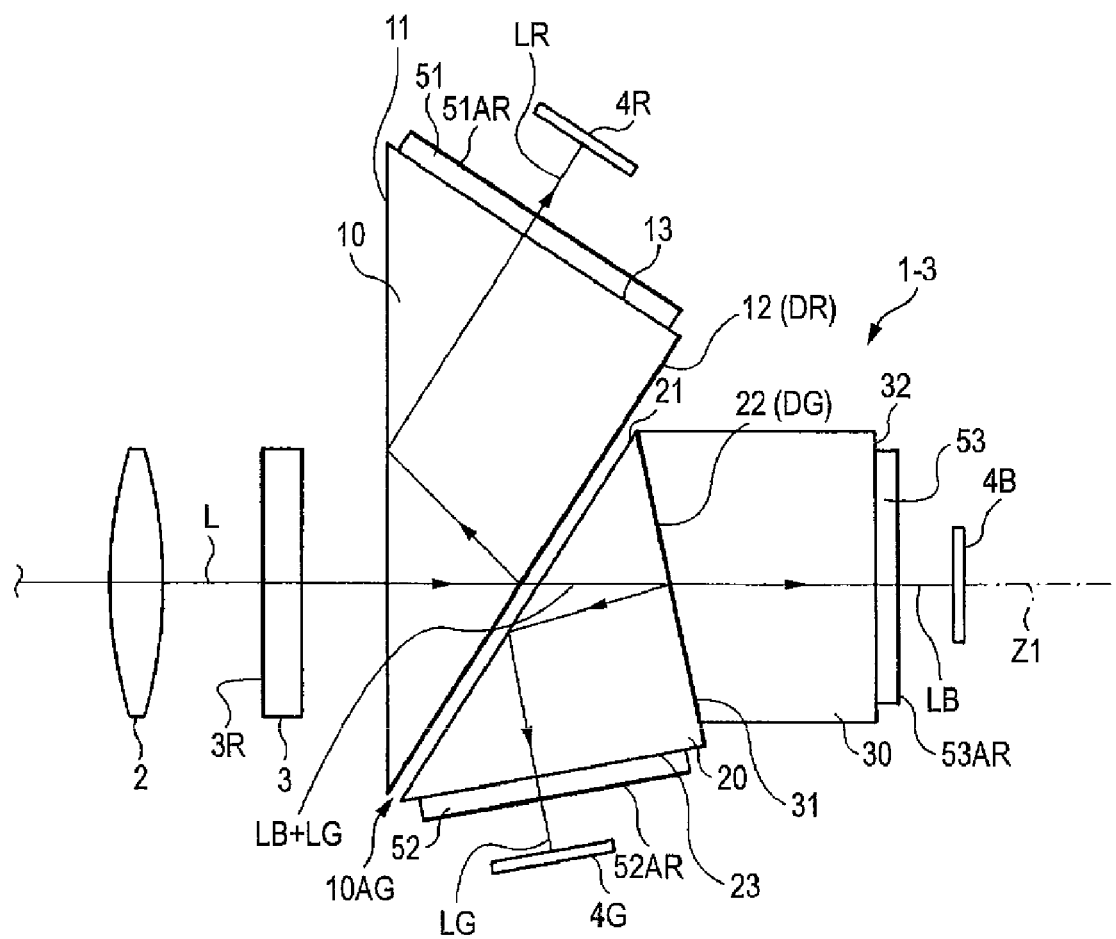
FIG. 15 is a sectional view illustrating an imaging apparatus having a color-separation optical system according to a third modified example of the first embodiment of the invention.

FIG. 15 shows the configuration of a color-separation optical system 1-3 according to a third modified example. The color-separation optical system 1-3 is different from the color-separation optical system 1 shown in FIG. 1 in sequence of extracting the light components. The color-separation optical system 1-3 is configured to extract the red light LR by the first prism 10, to extract the green light LG by the second prism 20, and to extract the blue light LB by the third prism 30.

Although the blue-light reflecting dichroic film DB is formed as the first dichroic film on the second surface 12 of the first prism 10 in the color-separation optical system 1 shown in FIG. 1, the red-light reflecting dichroic film DR is formed, instead of the blue-light reflecting dichroic film DB, in the color-separation optical system 1-3 according to this modified example. The red-light reflecting dichroic film DR has a film configuration for reflecting the red light LR as the second color light component and transmitting the blue light LB and the green light LG. The red-light reflecting dichroic film DR in this modified example is different from the color-separation optical system 1 shown in FIG. 1 in surface of a prism on which the film is formed, and is similar in characteristic to the red-light reflecting dichroic film DR in the color-separation optical system 1 shown in FIG. 1. An example of the transmission characteristic curve of the red-light reflecting dichroic film DR in this modified example is shown in FIG. 16B, which is similar to the transmission characteristic curve shown in FIG. 2B.

Although the red-light reflecting dichroic film DR is formed as the second dichroic film on the second surface 22 of the second prism 20 in the color-separation optical system 1 shown in FIG. 1, the green-light reflecting dichroic film DG, instead of the red-light reflecting dichroic film DR, is formed as the second dichroic film in the color-separation optical system 1-3 according to this modified example. The green-light reflecting dichroic film DG has a film configuration for reflecting the green light LG as the second color light component and transmitting the blue light LB. In this modified example, the reflection characteristic curve of wavelength versus reflectivity of the green-light reflecting dichroic film DG has a shape tracking the short-wavelength side of the ideal spectral characteristic of green.

Figure 16A:
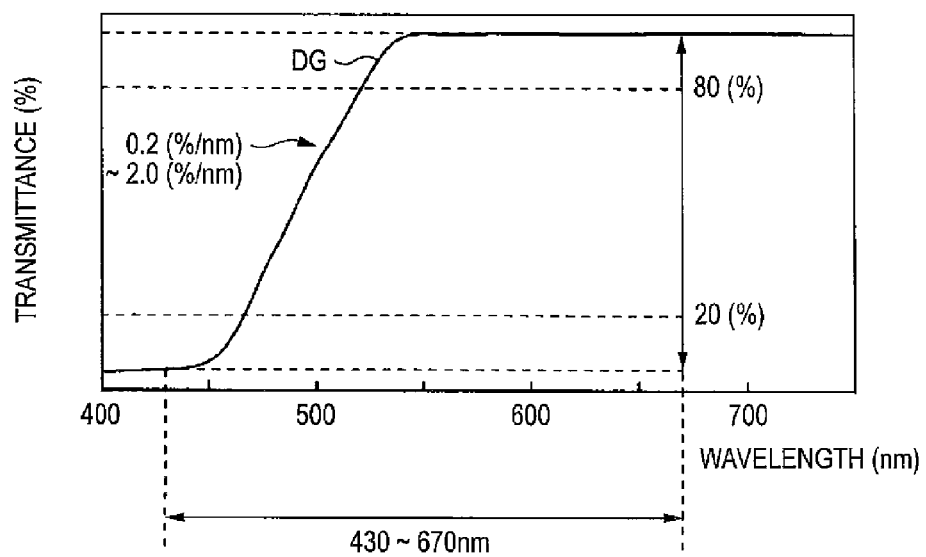
FIG. 16A is a diagram illustrating a characteristic of a green-light reflecting dichroic film DG, which is used in the color-separation optical system shown in FIG. 15.
Figure 16B:
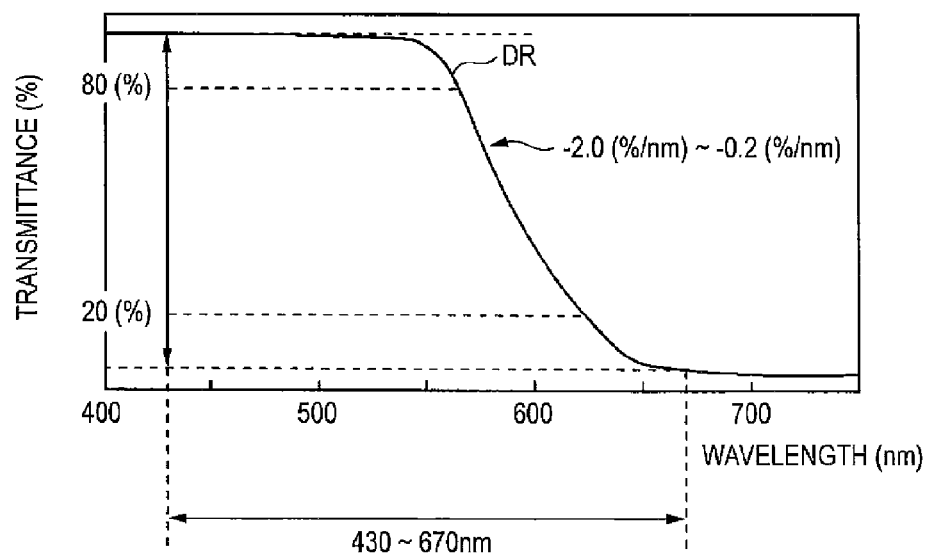
FIG. 16B is a diagram illustrating a characteristic of a red-light reflecting dichroic film DR used therein.

FIG. 16A shows an example of the transmission characteristic curve of the green-light reflecting dichroic film DG in the configuration shown in FIG. 15. In this modified example, the green-light reflecting dichroic film DG is configured so that the reflection characteristic curve has a shape that goes up from a low reflectivity to a high reflectivity in the wavelength range of 430 nm to 670 nm while tracking the short-wavelength side of the ideal spectral characteristic of green. More specifically, it is preferable that the reflection characteristic curve has such a shape that an average slope value is equal to or larger than 0.2 (%/nm) and equal to or less than 2.0 (%/nm) in a portion where from the reflection characteristic curve changes from 20% to 80% of a range that is defined between the lowest reflectivity and the highest reflectivity in the wavelength range of 430 nm to 670 nm.

In the color-separation optical system 1-3, first, the red light LR of the incident light L is reflected by the red-light reflecting dichroic film DR and is extracted as the first color light component by the first prism 10. The green light LG passing through the red-light reflecting dichroic film DR is reflected by the green-light reflecting dichroic film DG and is extracted as the second color light component by the second prism 20. The blue light LB passing through the red-light reflecting dichroic film DR and the green-light reflecting dichroic film DG is extracted as the third color light component by the third prism 30.

In this modified example, since the curve representing the characteristic of the red-light reflecting dichroic film DR and the curve representing the characteristic of the green-light reflecting dichroic film DG have shapes that track the ideal spectral characteristic of green, a characteristic that is closed to the ideal spectral characteristic can be obtained without using a trimming filter having a dichroic film in the exiting surface of a prism. Since it is not necessary to use the trimming filter having the dichroic film, the ghost and flare due to the dichroic film of the trimming filter is suppressed from occurring. Accordingly, it is possible to embody an imaging apparatus having the ideal spectral characteristic with the ghost and flare being reduced. The other configurations, operations, and advantages are similar to those of the color-separation optical system 1 shown in FIG. 1.

Second Embodiment

Next, a second embodiment of the invention will be described. Elements that are substantially same as those of the first embodiment are denoted by the same reference numerals and description thereof will be omitted.

Figure 17:
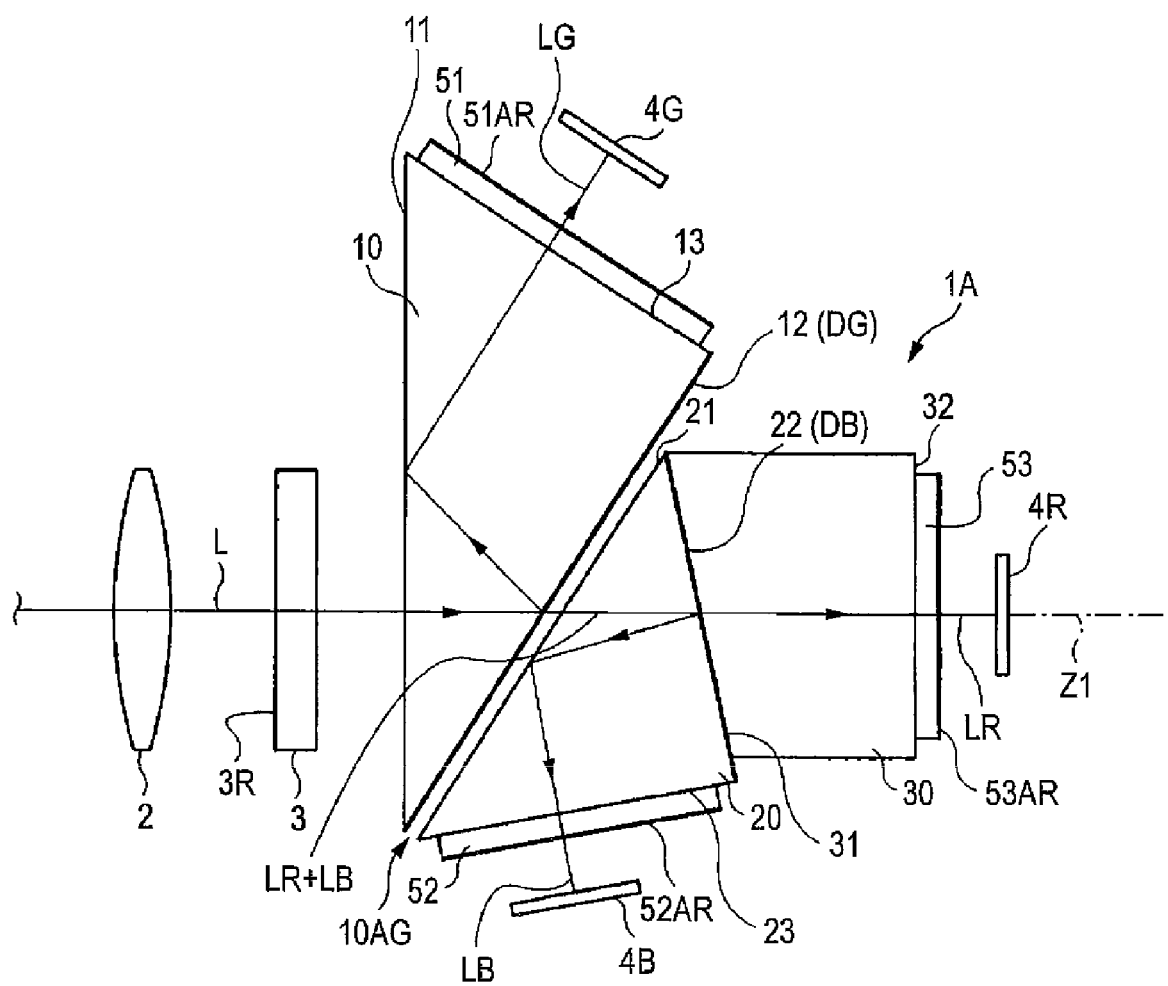
FIG. 17 is a sectional view illustrating an example of an imaging apparatus having a color-separation optical system according to a second embodiment of the invention.

FIG. 17 shows the configuration of a color-separation optical system 1A according to the second embodiment of the invention. The color-separation optical system 1A is different from the color-separation optical system 1 shown in FIG. 1 in sequence of extracting the light components. In the color-separation optical system 1A, the green light LG is extracted by the first prism 10, the blue light LB is extracted by the second prism 20, and the red light LR is extracted by the third prism 30.

Figure 54:
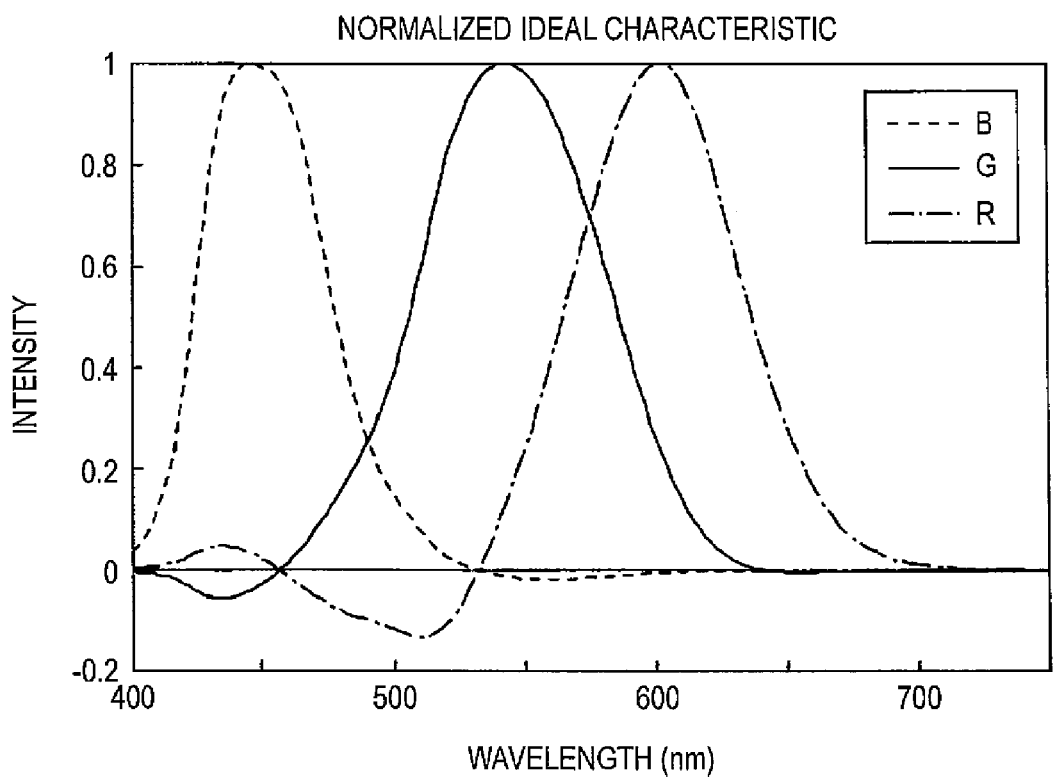
FIG. 54 is a diagram illustrating a normalized ideal characteristic.
Figure 55:
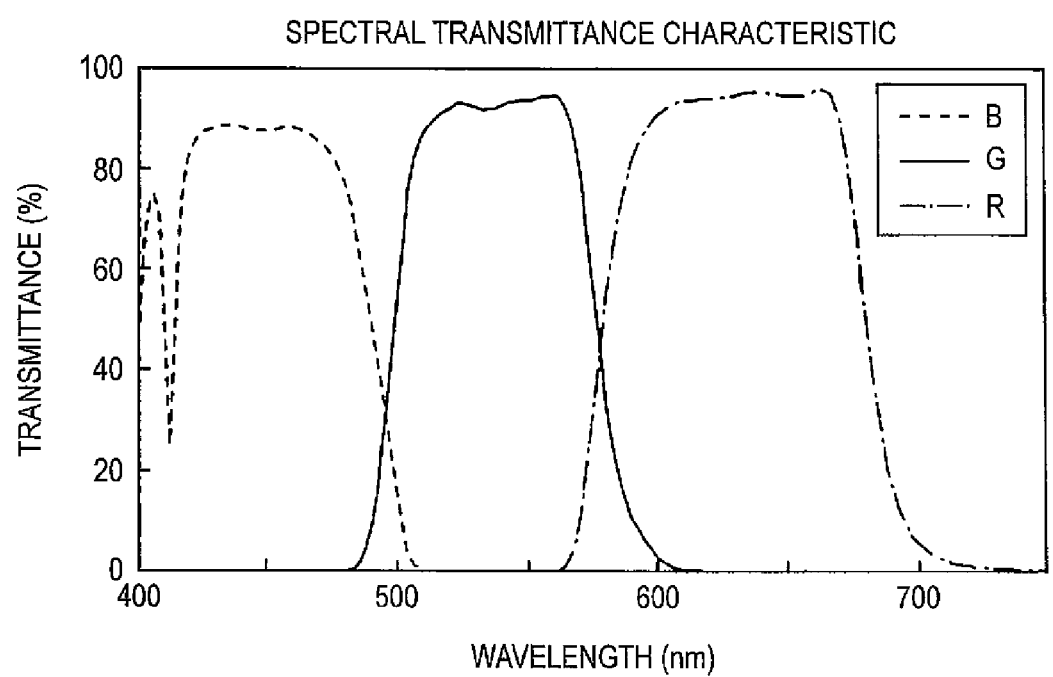
FIG. 55 is a diagram illustrating a spectral characteristic of a color-separation optical system of the related art.
Figure 56:
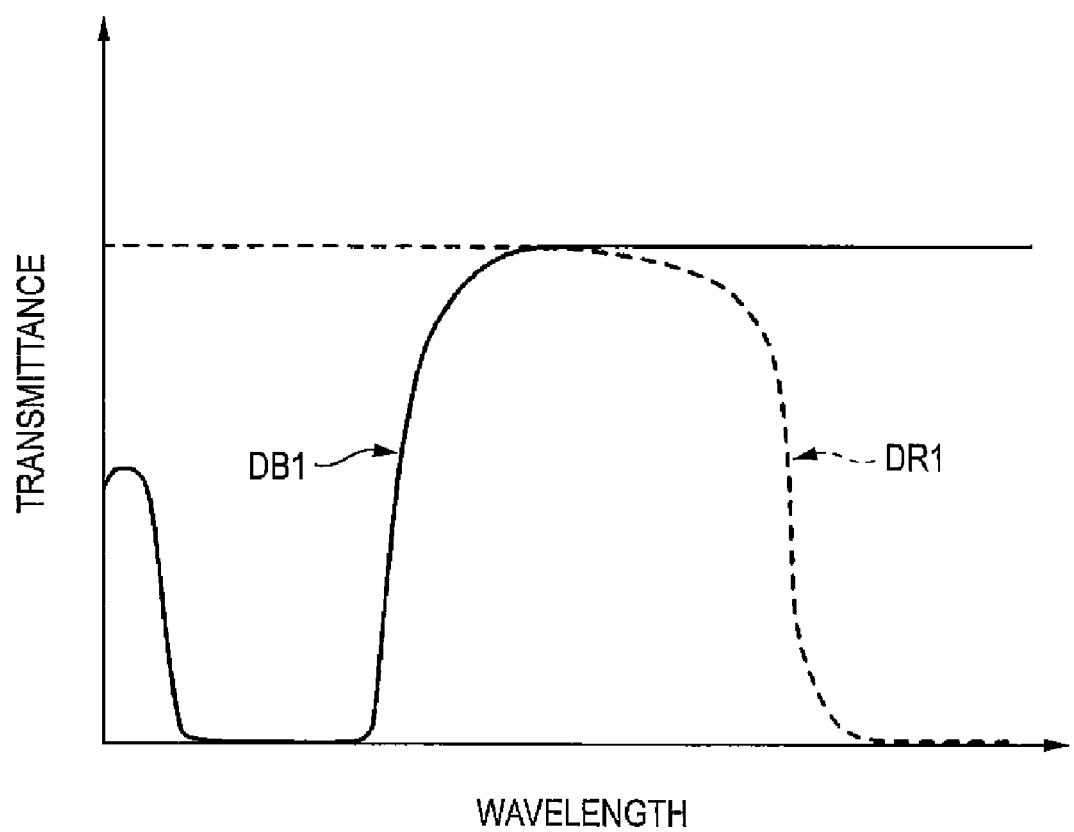
FIG. 56 is a diagram illustrating a characteristic of a dichroic film used in the color-separation optical system of the related art.
Figure 57:
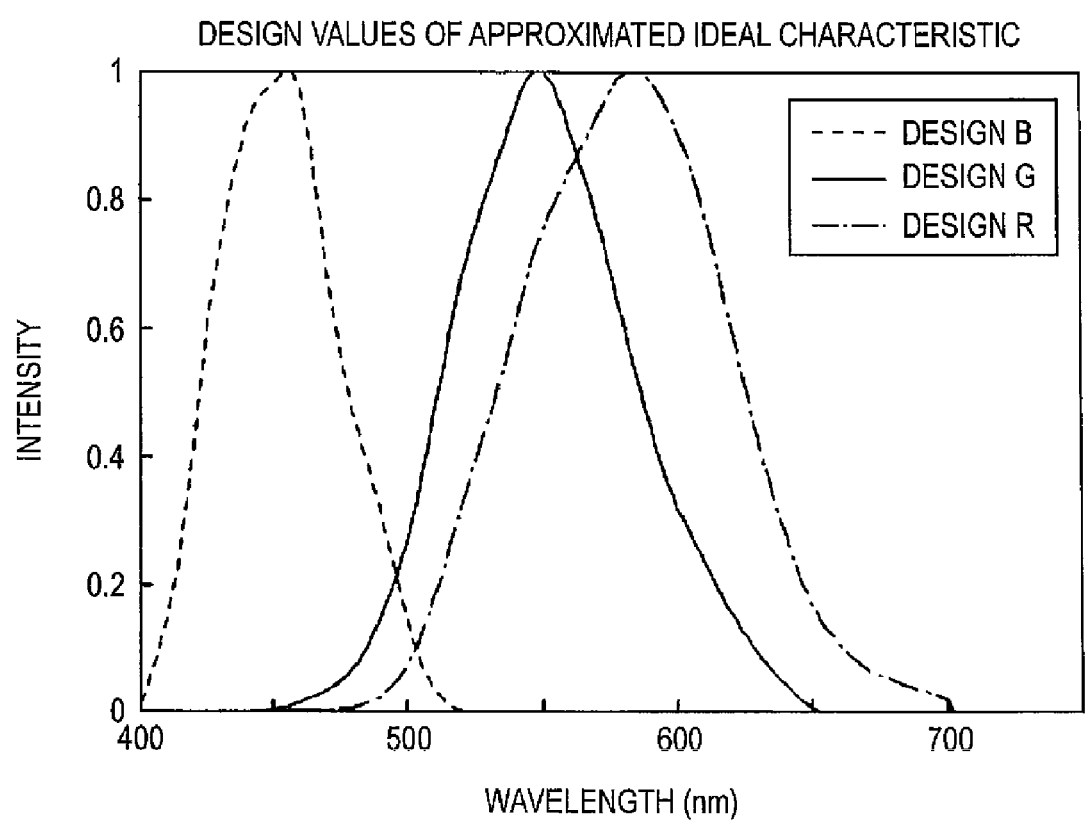
FIG. 57 is a diagram illustrating a spectral characteristic, approximated to the ideal characteristic, of the color-separation optical system of the related art.

Although the blue-light reflecting dichroic film DB is formed as the first dichroic film on the second surface 12 of the first prism 10 in the color-separation optical system 1 shown in FIG. 1, the green-light reflecting dichroic film DG is formed, instead of the blue-light reflecting dichroic film DB, in the color-separation optical system 1A according to this embodiment. The green-light reflecting dichroic film DG has a film configuration for reflecting the green light LG as the first color light component and transmitting the blue light LB and the red light LR. In this embodiment, a transmission characteristic curve of wavelength versus transmissivity of the green-light reflecting dichroic film DG has a shape that tracks a short-wavelength side of the ideal spectral characteristic of green, which is determined based on a color-matching function in the XYZ color coordinate system through conversion from chromaticity coordinates of three primary colors of a color reproducing medium. Here, similarly to the first embodiment, the "ideal characteristic" is a characteristic known in the past, for example, as shown in FIG. 54. The "ideal characteristic" is converted from the chromaticity coordinates of three primary colors of the color reproducing medium and can be obtained by the linear transformation of the color-matching function in the XYZ color coordinate system. An ideal characteristic itself represented by the color-matching function in the RGB color coordinate system may be used as the "ideal characteristic."

Figure 18A:
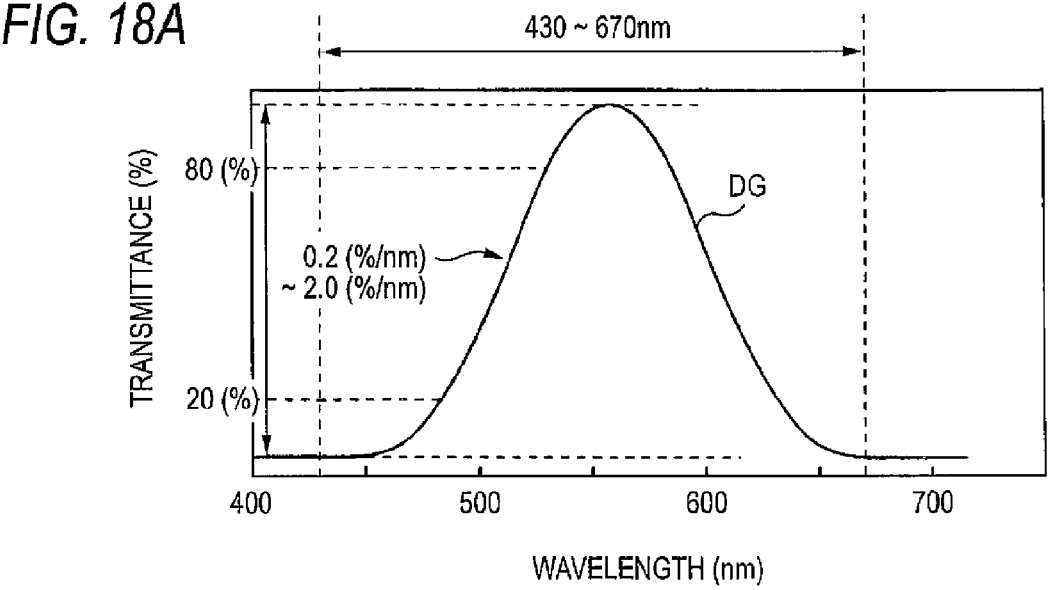
FIG. 18A is a diagram illustrating a short-wavelength side of a characteristic of a green-light reflecting dichroic film DG used in the color-separation optical system according to the second embodiment of the invention and FIG. 18B is a diagram illustrating a long-wavelength side of the characteristic thereof.
Figure 18B:
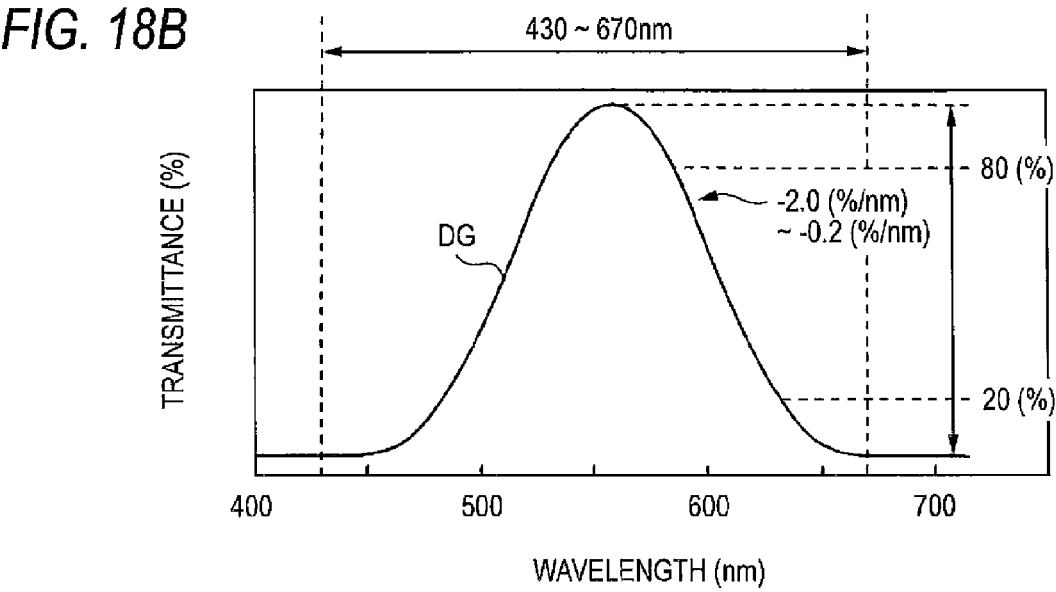

FIGS. 18A and 18B show an example of the reflection characteristic curve of the green-light reflecting dichroic film DG in the configuration shown in FIG. 17. As shown in FIG. 18A, the reflection characteristic curve of the green-light reflecting dichroic film DG has a shape that changes from a low reflectivity to a high reflectivity while tracking the short-wavelength side of the ideal spectral characteristic of green in a portion where the reflection characteristic curve of the green-light reflecting dichroic film DG goes up in the wavelength range of 430 nm to 670 nm. More specifically, it is preferable that the reflection characteristic curve has such a shape that an average slope value is equal to or larger than 0.2 (%/nm) and equal or less than 2.0 (%/nm) in a portion where the reflection characteristic curve of the green-light reflecting dichroic film DG changes from 20% to 80% of a range that is defined between the lowest reflectivity and the highest reflectivity in the wavelength range of 430 nm to 670 nm.

As shown in FIG. 18B, the reflection characteristic curve has a shape that changes from a high reflectivity to a low reflectivity while tracking the short-wavelength side of the ideal spectral characteristic of green in a portion where the reflection characteristic curve of the green-light reflecting dichroic film DG goes down in the wavelength range of 430 nm to 670 nm. More specifically, it is preferable that the reflection characteristic curve has such a shape that an average slope value is equal to or larger than −2.0 (%/nm) and equal or less than −0.2 (%/nm) in a portion where the reflection characteristic curve of the green-light reflecting dichroic film DG changes from 80% to 20% of a range that is defined between the highest reflectivity and the lowest reflectivity in the wavelength range of 430 nm to 670 nm.

Although the red-light reflecting dichroic film DR is formed as the second dichroic film on the second surface 22 of the second prism 20 in the color-separation optical system 1 shown in FIG. 1, the blue-light reflecting dichroic film DB is formed, instead of the red-light reflecting dichroic film DR, as the second dichroic film in the color-separation optical system 1A according to this embodiment. In this embodiment, the blue-light reflecting dichroic film DB has a film configuration for reflecting the blue light LB as the second color light component and transmitting the red light LR. In this embodiment, the transmission characteristic curve of wavelength versus transmissivity of the blue-light reflecting dichroic film DB has a shape that tracks a short-wavelength side of an ideal spectral characteristic of red, which is obtained by conversion from chromaticity coordinates of three primary colors of a color reproducing medium and which is determined based on the color-matching function in the XYZ color coordinate system. Here, the "ideal characteristic" is the characteristic known in the past, for example, as shown in FIG. 54. The "ideal characteristic" is converted from the chromaticity coordinates of three primary colors of the color reproducing medium and can be obtained by the linear transformation of the color-matching function in the XYZ color coordinate system. An ideal characteristic itself represented by the color-matching function in the RGB color coordinate system may be used as the "ideal characteristic."

Figure 19:
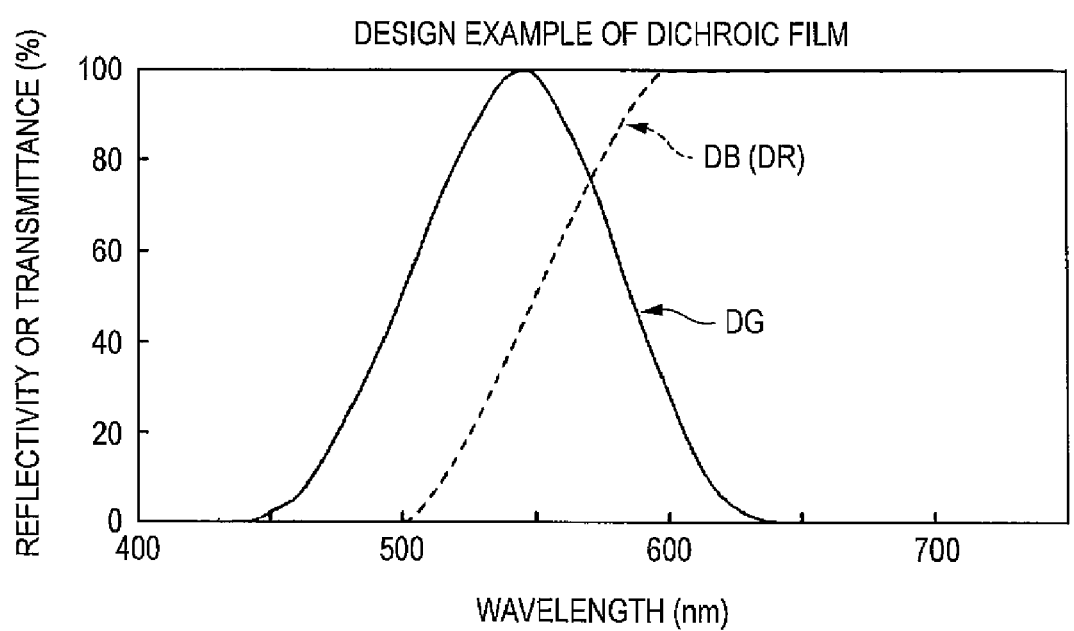
FIG. 19 is a characteristic diagram illustrating a design example of a dichroic film, which is used in the color-separation optical system according to the second embodiment of the invention.
Figure 20:
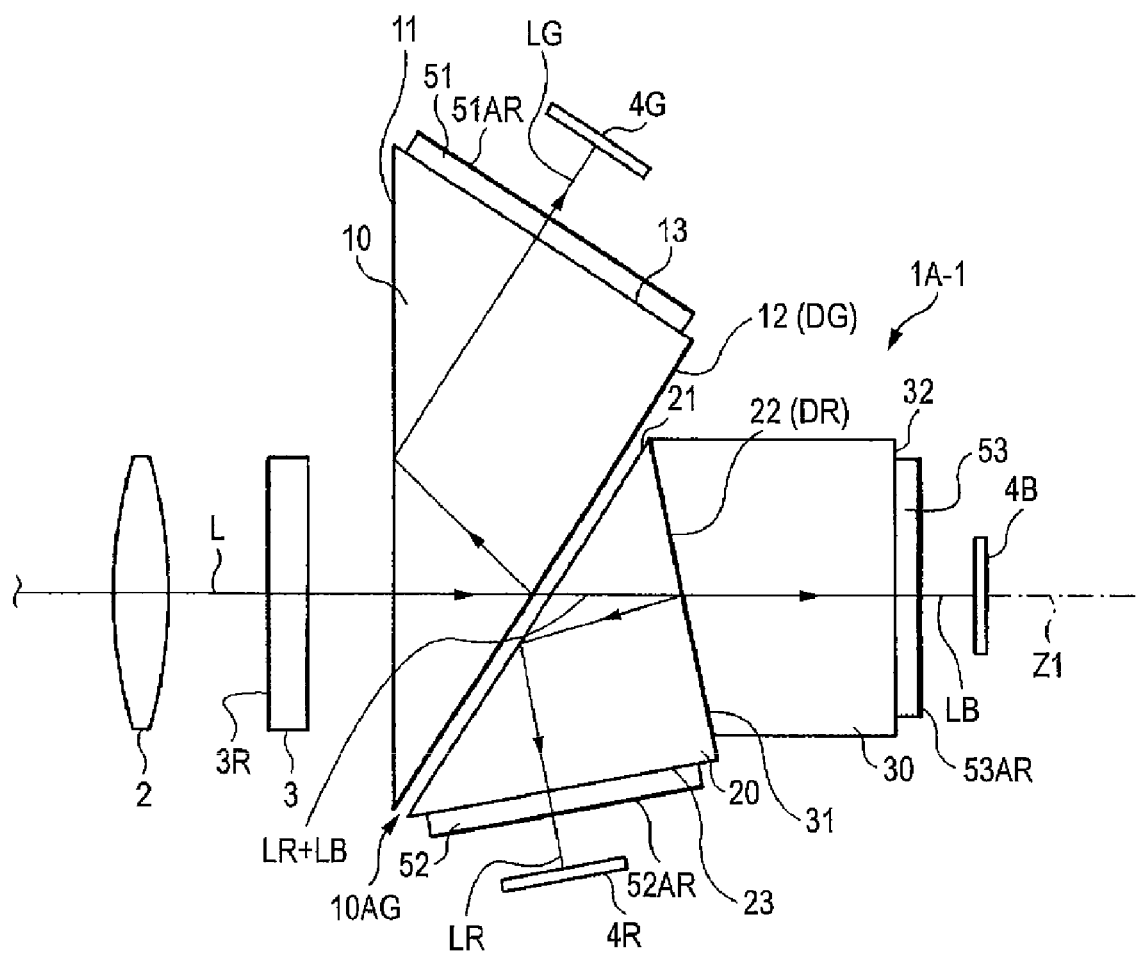
FIG. 20 is a sectional view illustrating an imaging apparatus having a color-separation optical system according to a modified example of the second embodiment of the invention.

For the purpose of reference, FIG. 19 shows characteristics of specific design examples of the green-light reflecting dichroic film DG and the blue-light reflecting dichroic film DB used in the color-separation optical system 1A shown in FIG. 17. In FIG. 19, the reflection characteristic is shown for the green-light reflecting dichroic film DG, and the transmission characteristic is shown for the blue-light reflecting dichroic film DB. The characteristic of the red-light reflecting dichroic film DR in a modified example shown in FIG. 20 is also shown in FIG. 19.

In the color-separation optical system 1A, first, the green light LG of the incident light L is reflected by the green-light reflecting dichroic film DG and is extracted as the first color light component by the first prism 10. The blue light LB passing through the green-light reflecting dichroic film DG is reflected by the blue-light reflecting dichroic film DB and is extracted as the second color light component by the second prism 20. The red light LR passing through the green-light reflecting dichroic film DG and the blue-light reflecting dichroic film DB is extracted as the third color light component by the third prism 30.

In this embodiment, the curve representing the characteristic of the green-light reflecting dichroic film DG has the shape that tracks the ideal spectral characteristic of green and the curve representing the characteristic of the blue-light reflecting dichroic film DB has the shape that tracks the short-wavelength side of the ideal spectral characteristic of red. Therefore, a characteristic approximated to the ideal spectral characteristic is obtained without using a trimming filter having a dichroic film in the exiting surface of the prism. Since it is not necessary to use the trimming filter having the dichroic film, the ghost and flare due to the dichroic film of the trimming filter is suppressed from occurring. Accordingly, it is possible to embody the ideal spectral characteristic with the ghost and flare being reduced. The other configurations, operations, and advantages are similar to those of the color-separation optical system 1 according to the first embodiment shown in FIG. 1.

Modified Example of Second Embodiment

Hereinafter, a modified example of the color-separation optical system 1A will be described. In the following modified example, the elements same as those in the configuration shown in FIG. 17 are denoted by the same reference numerals.

FIG. 20 shows the configuration of a color-separation optical system 1A-1 according to this modified example. The color-separation optical system 1A-1 is different from the color-separation optical system 1A shown in FIG. 17 in sequence of extracting the light components. In the color-separation optical system 1A-1, the green light LG is extracted by the use of the first prism 10, the red light LR is extracted by the use of the second prism 20, and the blue light LB is extracted by the use of the third prism 30.

In the color-separation optical system 1A-1 according to this modified example, similarly to the color-separation optical system 1A shown in FIG. 17, the green-light reflecting dichroic film DG is formed as the first dichroic film on the second surface 12 of the first prism 10. The characteristic of the green-light reflecting dichroic film DG in this modified example is similar to that of the color-separation optical system 1A shown in FIG. 17. The reflection characteristic curve thereof is similar to the reflection characteristic curve shown in FIGS. 18A and 18B.

Although the blue-light reflecting dichroic film DB is formed as the second dichroic film on the second surface 22 of the second prism 20 in the color-separation optical system 1A shown in FIG. 17, the red-light reflecting dichroic film DR, instead of the blue-light reflecting dichroic film DB, is formed as the second dichroic film in the color-separation optical system 1A-1 according to this modified example. In this modified example, the red-light reflecting dichroic film DR has a film configuration for reflecting the red light LR as the second color light component and transmitting the blue light LB. In this modified example, the reflection characteristic curve of wavelength versus reflectivity of the red-light reflecting dichroic film DR has a shape that tracks the short-wavelength side of the ideal spectral characteristic of red, which is obtained by the conversion from the chromaticity coordinates of three primary colors of the color reproducing medium and which is determined based on the color-matching function in the XYZ color coordinate system. Here, the "ideal characteristic" is a characteristic known in the past, for example, as shown in FIG. 54, is converted from the chromaticity coordinates of three primary colors of the color reproducing medium and can be obtained by the linear transformation of the color-matching function in the XYZ color coordinate system. An ideal characteristic itself represented by the color-matching function in the RGB color coordinate system may be used as the "ideal characteristic."

For the purpose of reference, FIG. 19 shows characteristics of specific design examples of the green-light reflecting dichroic film DG and the red-light reflecting dichroic film DR used in the color-separation optical system 1A-1 shown in FIG. 20. In FIG. 19, the reflection characteristic is shown for the green-light reflecting dichroic film DG and the transmission characteristic is shown for the red-light reflecting dichroic film DR.

In the color-separation optical system 1A-1, first, the green light LG of the incident light L is reflected by the green-light reflecting dichroic film DG and is extracted as the first color light component by the first prism 10. The red light LR passing through the green-light reflecting dichroic film DG is reflected by the red-light reflecting dichroic film DR and is extracted as the second color light component by the second prism 20. The blue light LB passing through the green-light reflecting dichroic film DG and the red-light reflecting dichroic film DR is extracted as the third color light component by the third prism 30.

In this modified example, the curve representing the characteristic of the green-light reflecting dichroic film DG has the shape that tracks the ideal spectral characteristic of green and the curve representing the characteristic of the red-light reflecting dichroic film DR has the shape that tracks the short-wavelength side of the ideal spectral characteristic of red. Therefore, a characteristic approximated to the ideal spectral characteristic is obtained without using a trimming filter having a dichroic film in the exiting surface of the prism. Since it is not necessary to use the trimming filter having the dichroic film, the ghost and flare due to the dichroic film of the trimming filter is suppressed from occurring. Accordingly, it is possible to embody the ideal spectral characteristic with the ghost and flare being reduced. The other configurations, operations, and advantages are equal to those of the color-separation optical system 1 according to the first embodiment shown in FIG. 1.

Third Embodiment

Next, a third embodiment of the invention will be described. Elements that are substantially same as those of the first and second embodiments are denoted by the same reference numerals and description thereof will be omitted.

Although the configuration in which the air gap 10AG is disposed between the first prism 10 and the second prism 20, that is, a so-called Philips type color-separation optical system, has been exemplified in the first and second embodiments, the structure is not limited to the Philips type so long as it has a function of actually separating white light into three colors.

Figure 21:
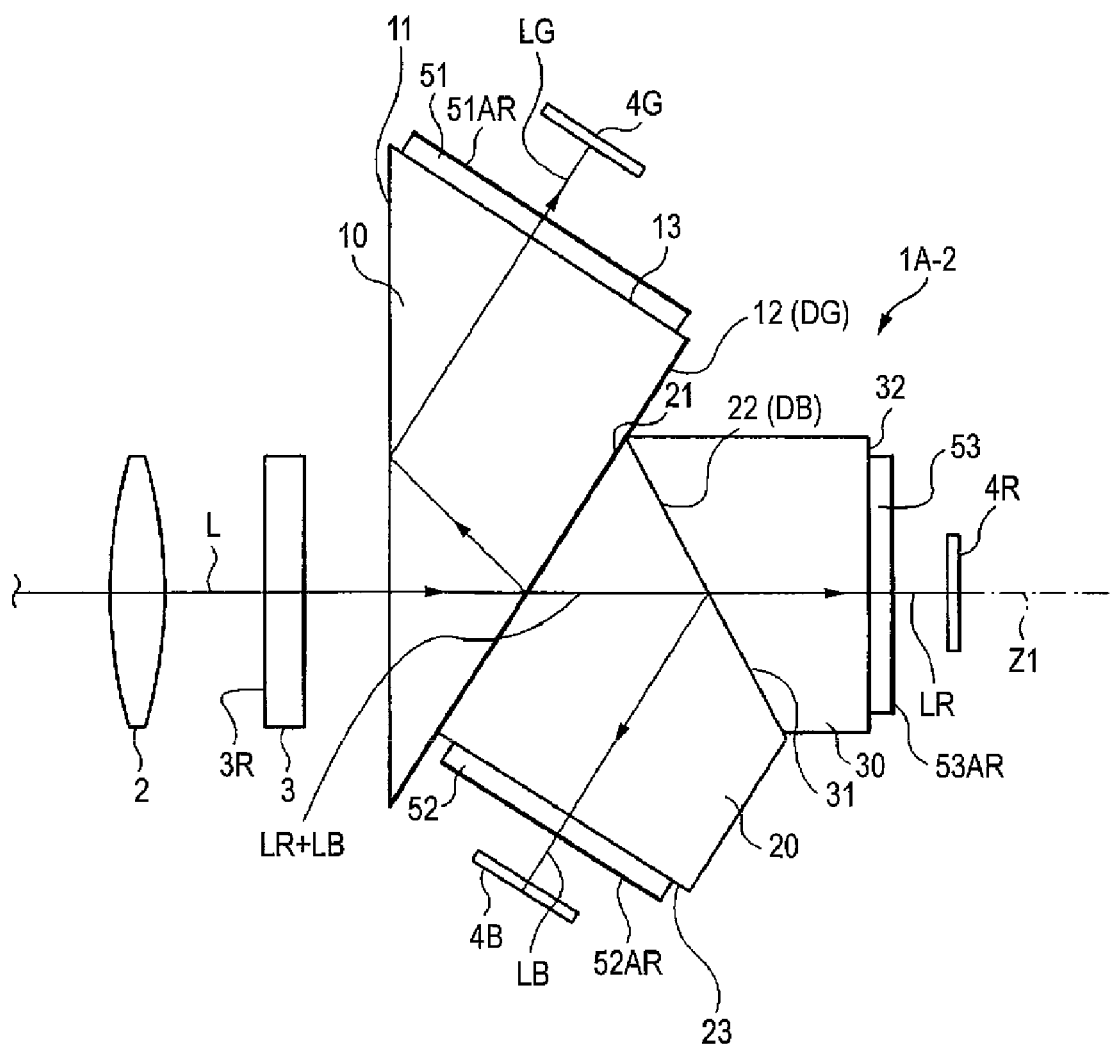
FIG. 21 is a sectional view illustrating an example of an imaging apparatus having a color-separation optical system according to a third embodiment of the invention.

FIG. 21 shows the configuration of a color-separation optical system 1A-2 according to the third embodiment of the invention. In the color-separation optical system 1A-2, the air gap 10AG is not provided between the first prism 10 and the second prism 20 but the second surface 12 of the first prism and the first surface 21 of the second prism 20 are in direct contact with each other with the green-light reflecting dichroic film DG interposed therebetween. The other configurations are basically similar to those of the color-separation optical system 1A shown in FIG. 17. That is, the color-separation optical system 1A-2 has a structure for extracting the green light LG by the use of the first prism 10, extracting the blue light LB by the use of the second prism 20, and extracting the red light LR by the use of the third prism 30, similarly to the color-separation optical system 1A shown in FIG. 17. The green-light reflecting dichroic film DG is formed as the first dichroic film and the blue-light reflecting dichroic film DB is formed as the second dichroic film. In the color-separation optical system 1A-2, by using dichroic films having proper characteristics as the green-light reflecting dichroic film DG and the blue-light reflecting dichroic film DB, similarly to the color-separation optical system 1A shown in FIG. 17. Thereby, it is possible to obtain a prism spectral characteristic approximated to the spectral characteristic shown in FIG. 5. It is also possible to embody an imaging apparatus having the ideal spectral characteristic with the ghost and flare being reduced.

Figure 22:
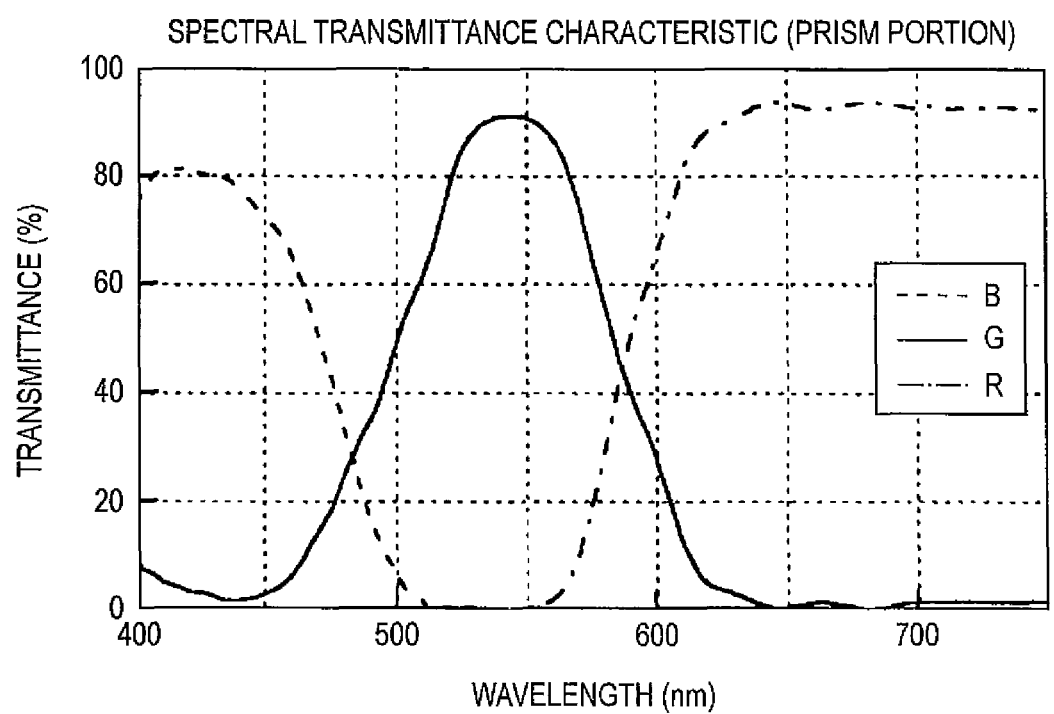
FIG. 22 is a diagram illustrating a spectral characteristic of a prism portion in the imaging apparatus according to the third embodiment of the invention.
Figure 23:
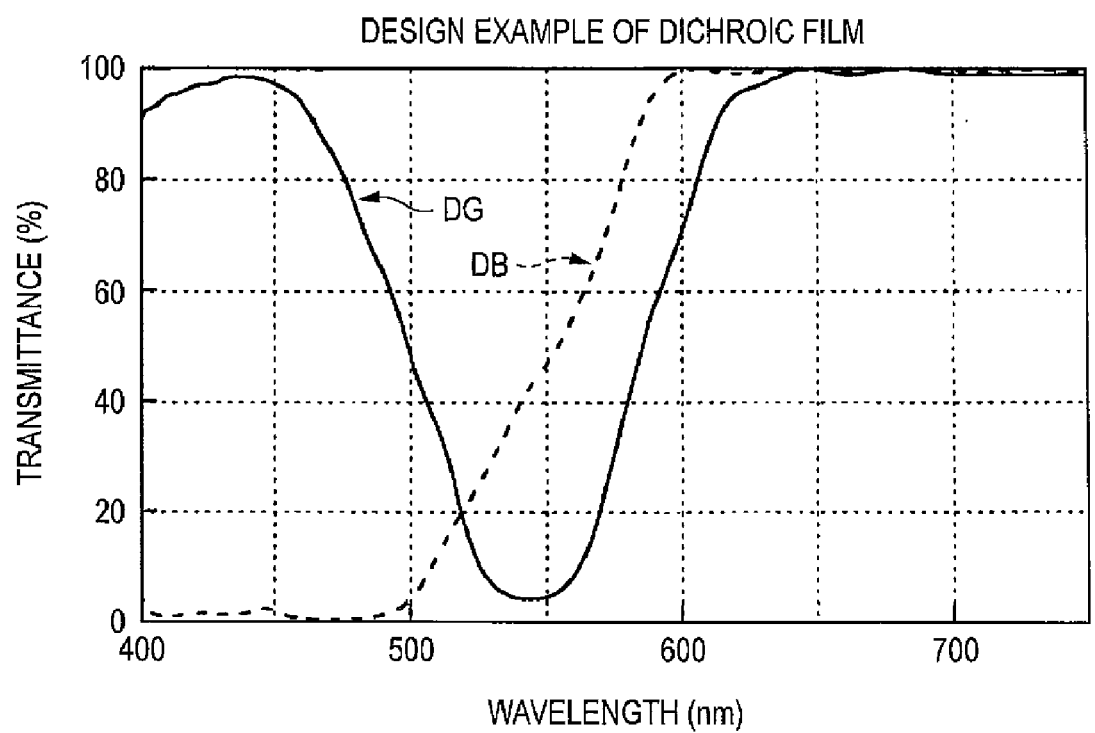
FIG. 23 is a characteristic diagram illustrating a design example of a dichroic film, which is used in the color-separation optical system according to the third embodiment of the invention.

FIG. 22 shows an example of the spectral transmission characteristic of the entire prism portion (all of the first, second, and third prisms 10, 20, and 30) in the color-separation optical system 1A-2. FIG. 23 shows film characteristics of the specific design examples of the green-light reflecting dichroic film DG and the blue-light reflecting dichroic film DB in the color-separation optical system 1A-2. The film characteristics shown in FIG. 23 are obtained from the film design represented by specific numerical data shown in FIGS. 24 and 25. However, the film materials, the number of layers, and the thicknesses of the layers are not limited to the examples shown in FIGS. 24 and 25. As can be seen from FIG. 22, a characteristic similar to the spectral characteristic (FIG. 5) of the Philips type configuration is obtained in the color-separation optical system 1A-2.

The configuration for extracting the green light LG by the first prism 10, extracting the blue light LB by the second prism 20, and extracting the red light LR by the third prism 30 has been described. However, the method of extracting the color components by the first to third prisms 10, 20, and 30 is not limited to this embodiment. That is, the configurations of the Philips type color-separation optical systems according to the first and second embodiments may be configured so that the first prism 10 and the second prism 20 are in close contact with each other without the air gap 10AG being provided therebetween, similarly to the configuration shown in FIG. 21.

Fourth Embodiment

Next, a fourth embodiment of the invention will be described. Elements that are substantially same as those in the first to third embodiments are denoted by the same reference numerals and description thereof will be omitted.

Figure 26:
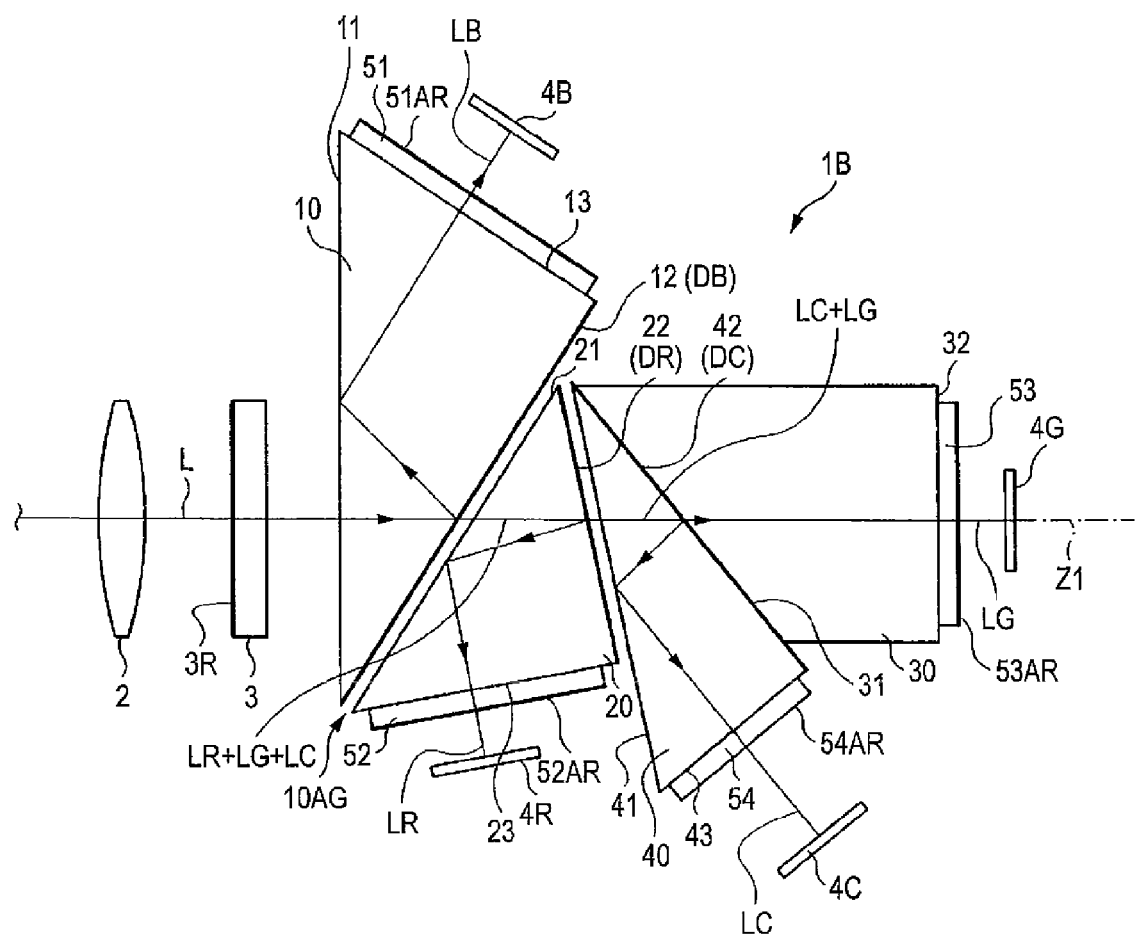
FIG. 26 is a sectional view illustrating an example of an imaging apparatus having a color-separation optical system according to a fourth embodiment of the invention.

FIG. 26 is the partial configuration of an imaging apparatus having a color-separation optical system 1B according to the fourth embodiment of the invention. In the first to third embodiments, it has been described that the incident light L is separated into three light components of the blue light LB, the red light LR, and the green light LG. However, the color-separation optical system 1B according to this embodiment is configured to separate the incident light into four light components including a cyan light component as a fourth color light component as well as the other three components, red, green and blue.

In the color-separation optical system 1B according to this embodiment further includes a fourth prism 40 disposed between the second prism 20 and the third prism 30 in the color-separation optical system 1 shown in FIG. 1. An imaging device 4C is disposed on a light exiting side of the fourth prism 40. The fourth prism 40 has a first surface 41, a second surface 42, and a third surface 43. The fourth prism 40 is disposed with a predetermined air gap from the second prism 20. More specifically, the second surface 22 of the second prism 20 and the first surface 41 of the fourth prism 40 are disposed parallel to each other with the air gap interposed therebetween. The third surface 43 of the fourth prism 40 is a light exiting surface. A trimming filter 54 is disposed on the exiting surface. The characteristic-adjusting dichroic film is not disposed in the trimming filter 54, similarly to the trimming filter 51 of the first prism 10, but the ghost-flare preventing antireflection film 54AR is formed on the light exiting surface of the trimming filter 54 instead. Without disposing the trimming filter 54, the antireflection film 54AR may be formed directly on the third surface 43 of the fourth prism 40.

A cyan-light-component reflecting dichroic film DC as a third dichroic film is formed on the second surface 22 of the fourth prism 40. The cyan-light-component reflecting dichroic film DC has a film configuration for reflecting the cyan light component LC as a fourth color light component and transmitting the green light LG. The cyan-light-component reflecting dichroic film DC serves to reflect a part of light in the cyan region of 400 nm to 600 nm as the fourth color light component.

Figures 27A, 27B:
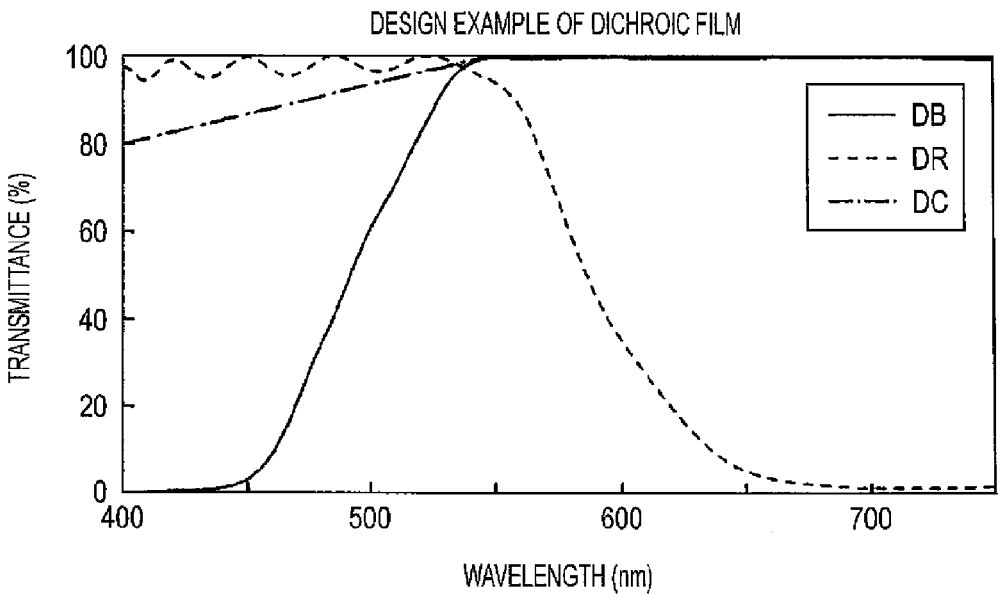
FIG. 27 is a characteristic diagram illustrating a design example of a dichroic film, which is used in the color-separation optical system according to the fourth embodiment of the invention, and is a diagram illustrating examples of film data thereof.

FIG. 27A shows characteristics of specific design examples of the blue-light reflecting dichroic film DB, the red-light reflecting dichroic film DR, and the cyan-light-component reflecting dichroic film DC, which are used in the color-separation optical system 1B shown in FIG. 26. The characteristics of the blue-light reflecting dichroic film DB and the red-light reflecting dichroic film DR are similar to the characteristics (FIG. 4) in the color-separation optical system 1 shown in FIG. 1. The characteristic of the cyan-light-component reflecting dichroic film DC shown in FIG. 27A is obtained by the film design represented by specific numerical data shown, for example, in FIG. 27B. However, the film materials, the number of layers, and the thicknesses of the layers are not limited to the example shown in FIG. 27B. In FIG. 27B, "Sub-H4" represents Substance H4 (made by Merck KGaA in Germany) containing $LaTiO_3$ as a major component.

In this embodiment, the third prism 30 is bonded to the fourth prism 40 with the cyan-light-component reflecting dichroic film DC interposed therebetween. More specifically, the second surface 42 of the fourth prism 40 and the first surface 31 of the third prism 30 are bonded to each other with the cyan-light-component reflecting dichroic film DC interposed therebetween. In this embodiment, the third prism 30 is configured to extract the green light that passes through the blue-light reflecting dichroic film DB and the red-light reflecting dichroic film DR and further passes through the cyan-light-component reflecting dichroic film DC.

In the imaging apparatus having the color-separation optical system 1B according to this embodiment, by taking an image using the four light components including the cyan light component LC as the fourth color light component in addition to the blue light LB, the red light LR, and the green light LG, it is possible to approximate the characteristic to the ideal characteristic of the imaging apparatus. In the ideal characteristic of the imaging apparatus shown in FIG. 54, there is a portion having a negative sensitivity, particularly, there are many portions having negative sensitivity for the red spectral characteristic. The portions having negative sensitivity can be hardly reproduced by the use of the three-color separation method of the related art. However, by acquiring as the light component the cyan light component LC corresponding to the portion having the negative sensitivity, it is possible to reproduce the portion having the negative sensitivity by means of calculation of an imaging circuit. That is, by properly subtracting a characteristic value C obtained based on the cyan light component LC from a characteristic value R obtained based on the red light LR after the separation of colors by the use of the following expression, it is possible to obtain a characteristic value R' with the portion having the negative sensitivity being reproduced:

$$R'=R-kC$$

where k represents a coefficient optimized to reproduce the negative sensitivity.

Hereinafter, a design example where the negative sensitivity is actually reproduced will be described.

Figure 28:
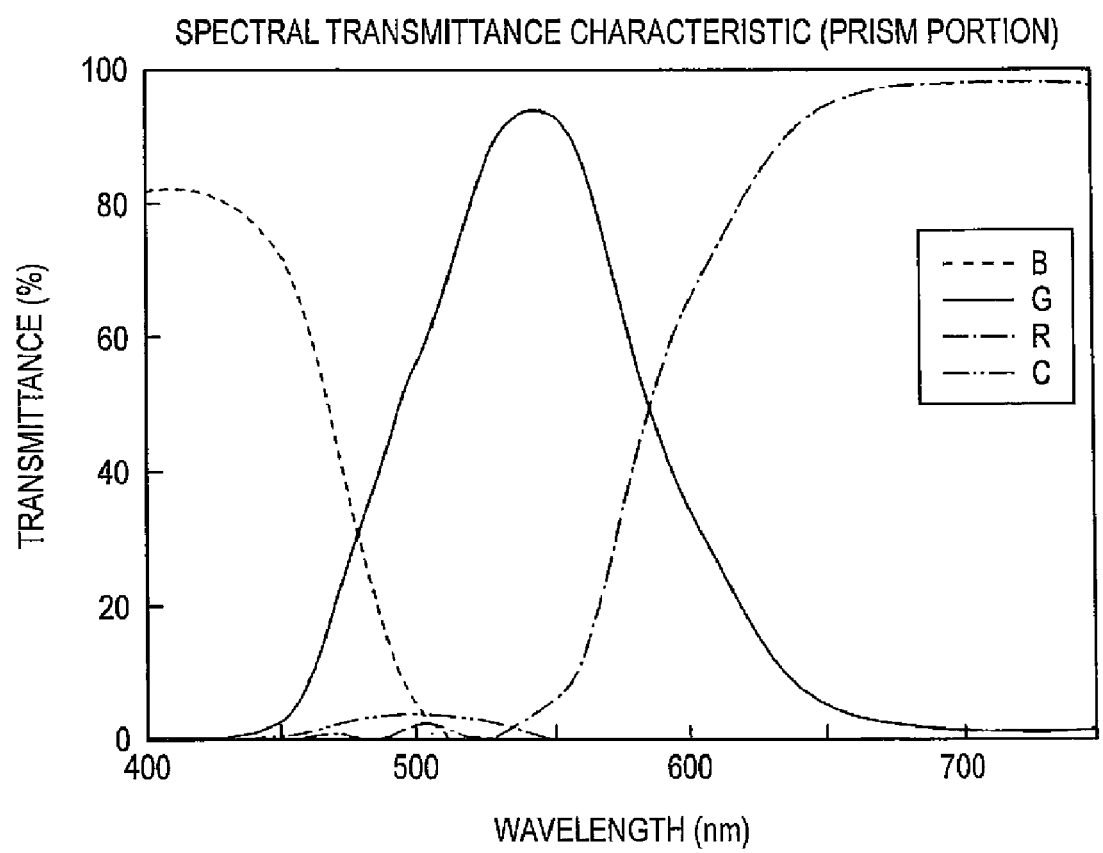
FIG. 28 is a diagram illustrating a spectral characteristic of a prism portion in the imaging apparatus according to the fourth embodiment of the invention.
Figure 29:
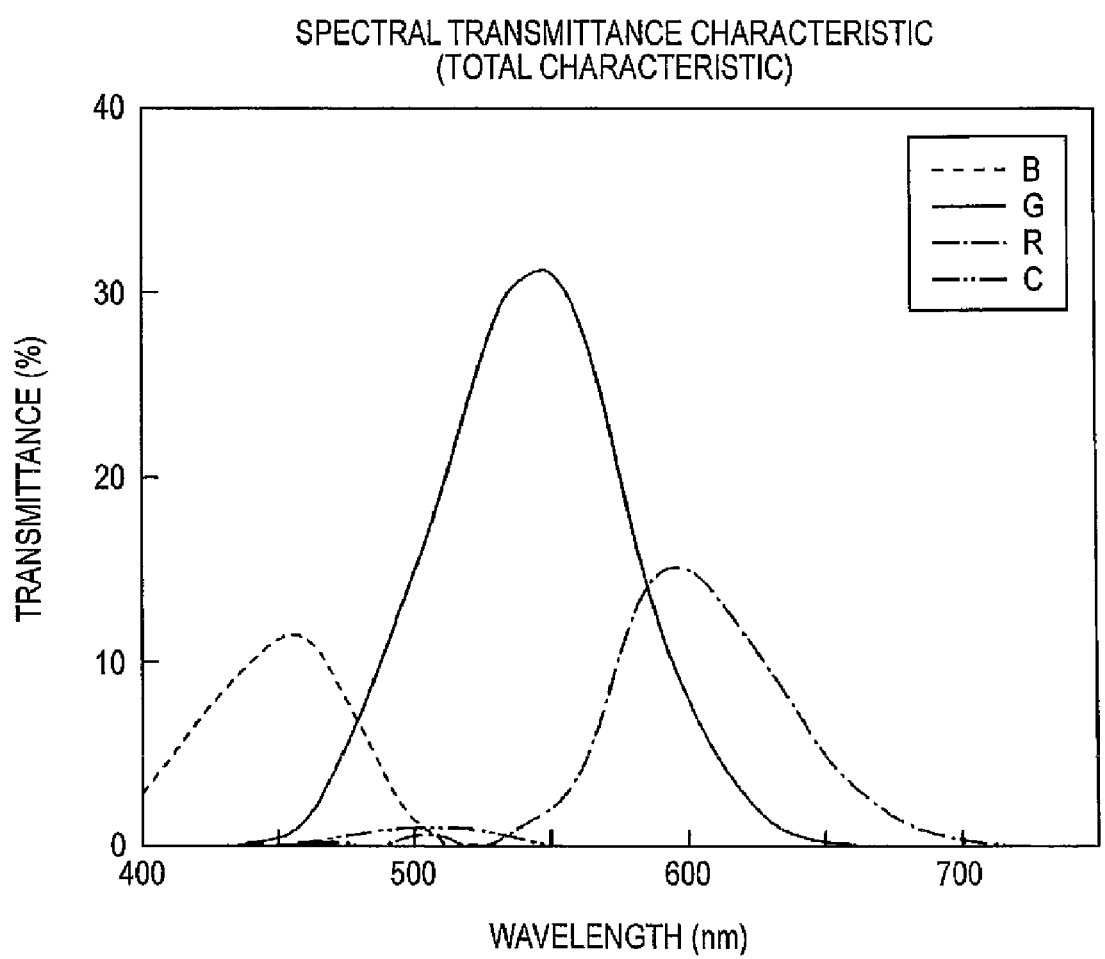
FIG. 29 is a diagram illustrating a total spectral characteristic of an optical system in the imaging apparatus according to the fourth embodiment of the invention.

FIG. 28 shows the spectral transmission characteristic of the entire prim portion (all of the first, second, third, and fourth prisms 10, 20, 30, and 40) having the film design shown in FIG. 27 in the color-separation optical system 1B according to this embodiment. FIG. 29 shows a total spectral transmission characteristic, shown in FIG. 3, of the entire optical system of the imaging apparatus in which the characteristics of the optical elements other than the prim portion and the characteristic of the entire prim portion shown in FIG. 28 are combined. In FIGS. 28 and 29, reference sign C represents the spectral characteristic of the cyan light component LC.

Figure 30:
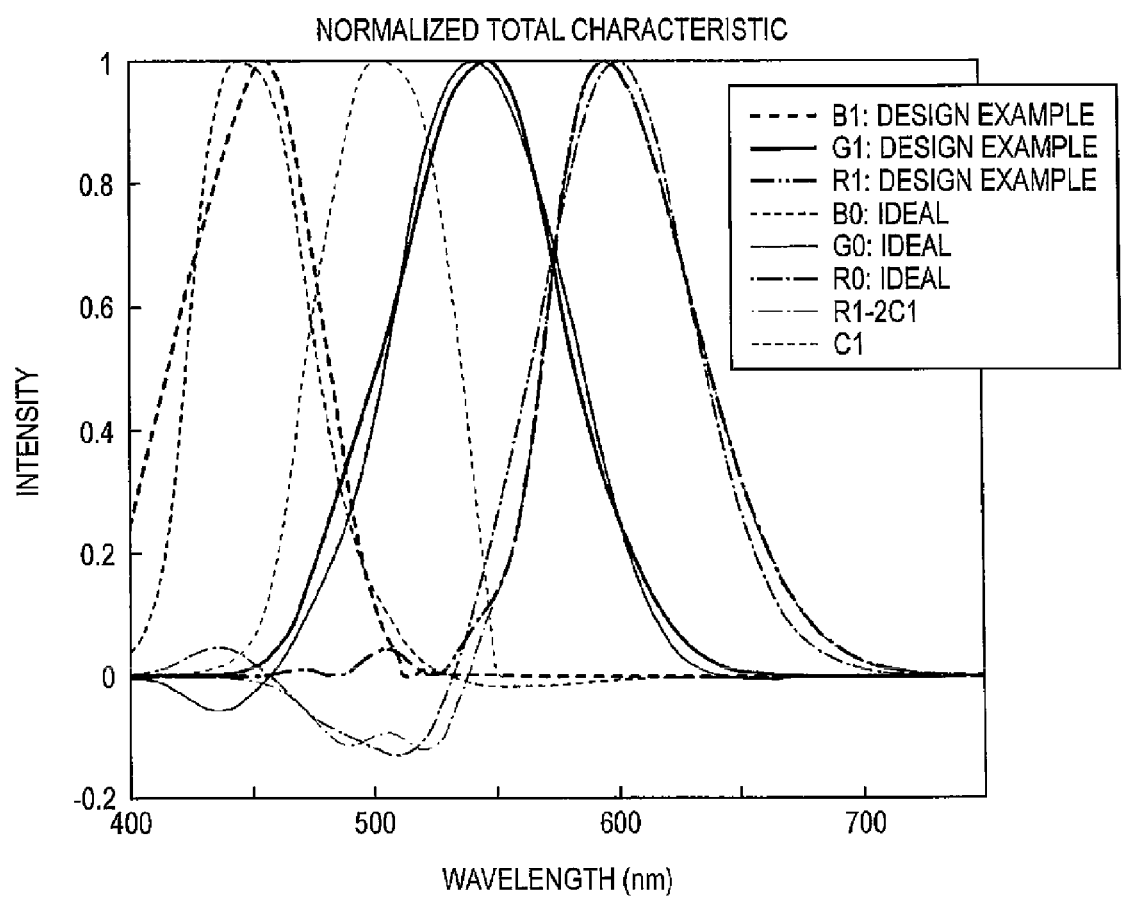
FIG. 30 is a diagram illustrating a normalized total spectral characteristic according to the fourth embodiment of the invention with the normalized total spectral characteristic being compared to an ideal characteristic and a characteristic of a related art.

FIG. 30 shows a normalized characteristic of the total spectral transmission characteristic shown in FIG. 29. For the purpose of comparison, the ideal characteristics (B0, R0, and G0) are also shown in FIG. 30. Here, the ideal characteristic means the characteristic known in the past, for example, as shown in FIG. 54. In FIG. 30, B1, R1, G1, and C1 represent characteristics obtained directly from the design examples according to this embodiment. In FIG. 30, C1 represents the spectral characteristic of the cyan light component LC. "R1−2C1" is a characteristic of R' obtained by means of the above-mentioned optimized calculation. It can be seen that the characteristic of "R1−2C1" obtained by calculation includes the reproduced negative sensitivity and further approaches the ideal characteristic of red (R0).

Figure 31:
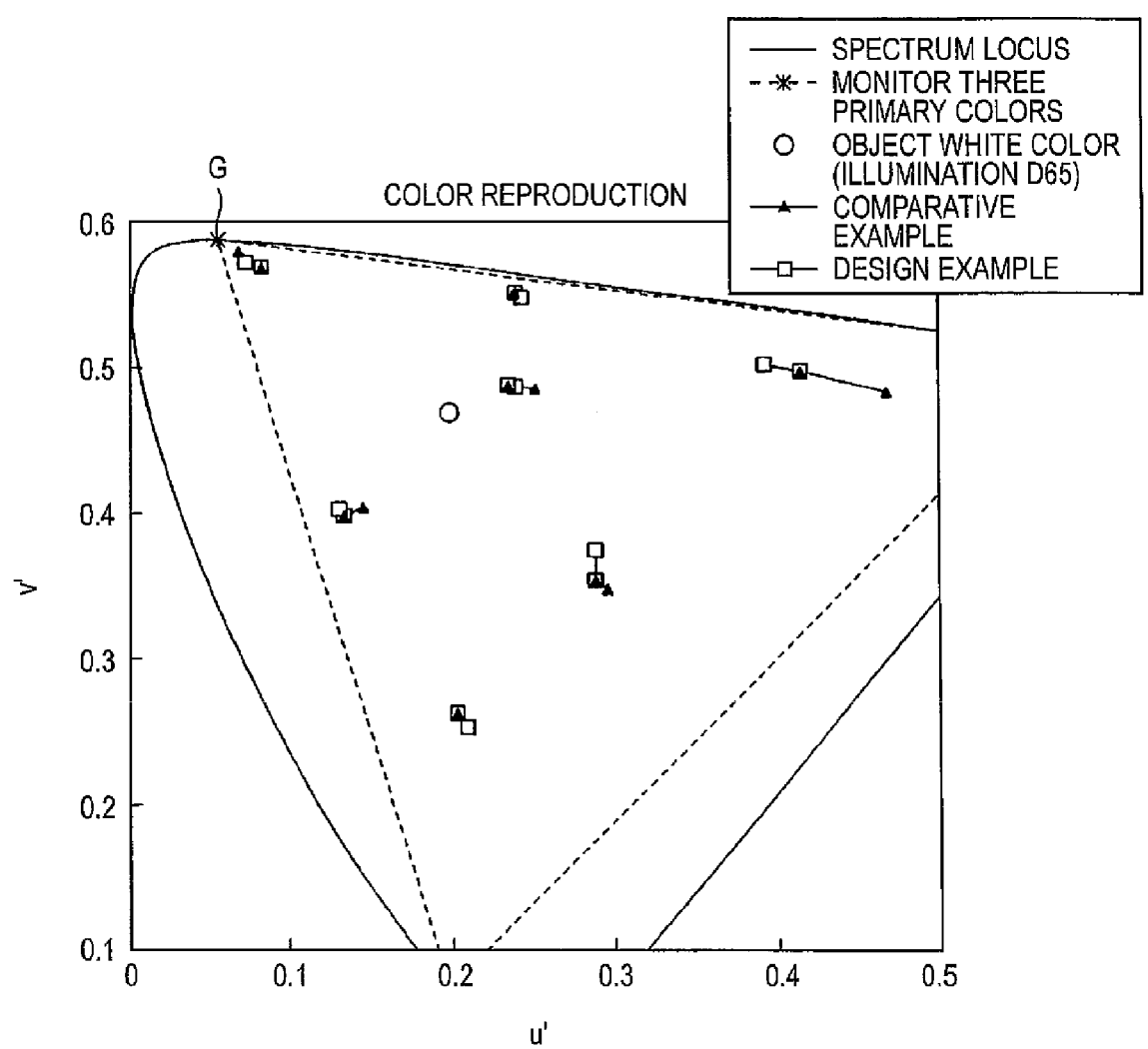
FIG. 31 is an u'v' chromaticity diagram illustrating color reproduction in the fourth embodiment of the invention with the color reproduction being compared to the related art.

FIG. 31 is an u'v' chromaticity diagram illustrating the color reproduction of the design examples according to this embodiment with the color reproduction of the design examples being compared to the related art, similarly to FIG. 8. In the drawing, the coordinate points of the filled triangles "▲" represent coordinate points of arbitrary colors in the related-art configuration. The coordinate points of outlined squares "□" represent coordinate points of arbitrary colors in the design example according to this embodiment. In the related-art configuration and the design example according to this embodiment, a deviated amount from an ideal point (deviated amount of a reproduced color) is indicated by a solid line connecting the coordinate points. Although the reproduced colors largely move in the upper-right red region in the related-art configuration, it is improved greatly in the design example according to this embodiment. In the design example according to this embodiment, there is no space where a color largely moves form the ideal point in the total balance, thereby improving the color reproduction. Specifically, the color reproduction of cyan is improved. An average color difference of seven colors of B (blue), G (green), R (red), C (cyan), Y (yellow), M (magenta), and skin (skin color) is improved from 8.84 to 5.96.

As described above, in the color-separation optical system 1B and the imaging apparatus according to this embodiment, since the fourth color light component is acquired, it is possible to further improve the color reproduction in comparison with the color-separation optical system 1 and the imaging apparatus according to the first embodiment.

Fifth Embodiment

Next, a fifth embodiment of the invention will be described. Elements that are substantially same as those in the first to fourth embodiments are denoted by the same reference numerals and description thereof will be omitted.

It has been designed that the characteristics of the dichroic films are approximated to the ideal characteristics shown in FIG. 54. However, in this embodiment, the film design is carried out using characteristics that are obtained by performing a linear transformation for the ideal characteristic, as the ideal spectral characteristic. This linear transformation is performed for the ideal characteristic itself represented by the color-matching function in the RGB color coordinate system or the ideal characteristic, which is converted from the chromaticity coordinates of three primary colors of the color reproducing medium and which is represented by the linear transformation of the color-matching function in the XYZ color coordinate system, so as to further decrease negative values.

Figure 32A:
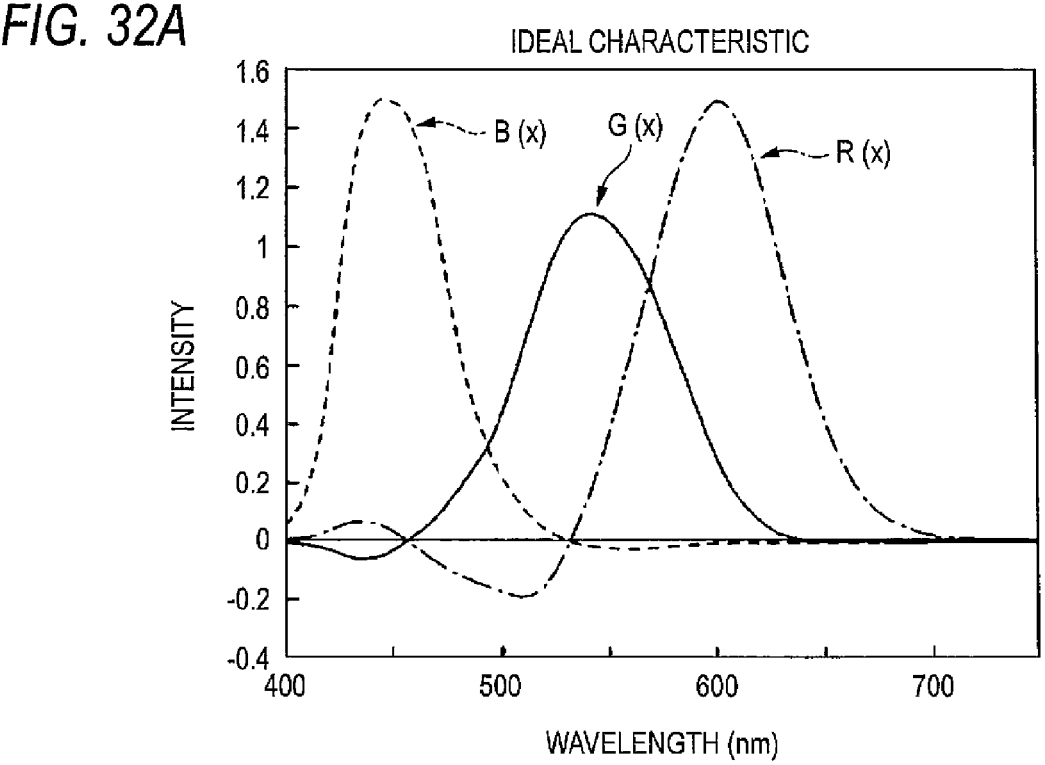
FIG. 32A shows an ideal characteristic before transformation and FIG. 32B shows an ideal characteristic after the transformation.
Figure 32B:
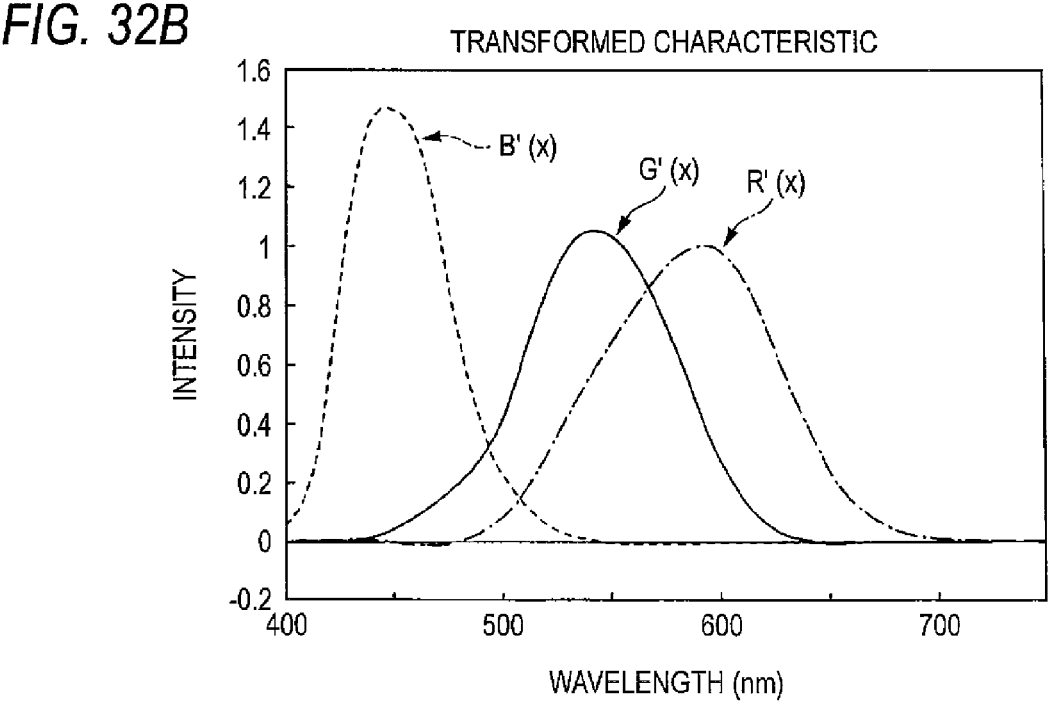
Figure 33:
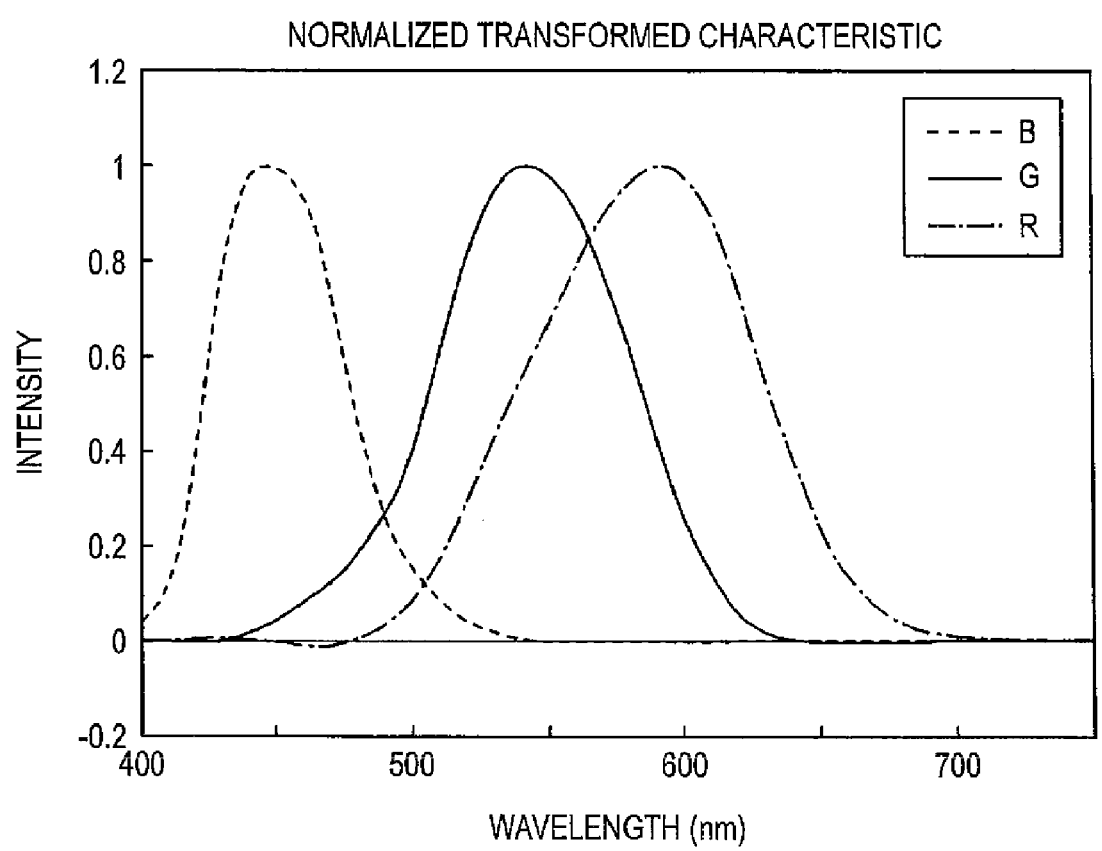
FIG. 33 is a diagram illustrating a normalized ideal characteristic used in the color-separation optical system according to the fifth embodiment of the invention.

FIG. 32A shows ideal spectral characteristics R(x), G(x), and B(x) before performing this linear transformation. This is substantially similar to the ideal characteristic shown in FIG. 54, except that it is not normalized. FIG. 32B shows transformed characteristics R'(x), G'(x), and B'(x) obtained by performing this linear transform for the ideal characteristics R(x), G(x), and B(x) shown in FIG. 32A. Furthermore, FIG. 33 shows normalized characteristics obtained by normalizing the transformed characteristics R'(x), G'(x), and B'(x) shown in FIG. 32B. A calculation example of the linear transformation is expressed by Expression (1). Here, M represents a matrix that makes the negative values in the transformed characteristics R'(x), G'(x), and B'(x) as small as possible.

$$\begin{pmatrix} R'(x) \\ G'(x) \\ B'(x) \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R(x) \\ G(x) \\ B(x) \end{pmatrix} \quad (1)$$

$$= M \begin{pmatrix} R(x) \\ G(x) \\ B(x) \end{pmatrix}$$

Here, by multiplying R'(x), G'(x), and B'(x) by the inverse matrix $M^{-1}$, it is possible to obtain characteristics approximated to the original ideal characteristics R(x), G(x), and B(x). In the respective configurations of the first and second embodiments, the characteristics of the dichroic films are designed using the R'(x), G'(x), and B'(x) as the ideal characteristics (normalized transformed ideal characteristic), so as to obtain characteristics approximated to R'(x), G'(x), and B'(x). Then, by multiplying the obtained characteristics by the inverse matrix $M^{-1}$ in calculation performed by the calculation circuit of the imaging apparatus, it is possible to obtain characteristics approximated to the original ideal characteristics R(x), G(x), and B(x). Here, since R'(x), G'(x), and B'(x) are characteristics in which the negative values are made as small as possible, it is possible to reproduce R'(x), G'(x), and B'(x) even with 3-color separation. By allowing the calculation circuit of the imaging apparatus to perform inverse calculation for the reproduced characteristics R'(x), G'(x), and B'(x), it is possible to obtain the characteristics approximated to the original ideal characteristics R(x), G(x), and B(x). That is, it is possible to virtually reproduce a portion having the negative sensitivity even with the 3-color separation.

Figure 34:
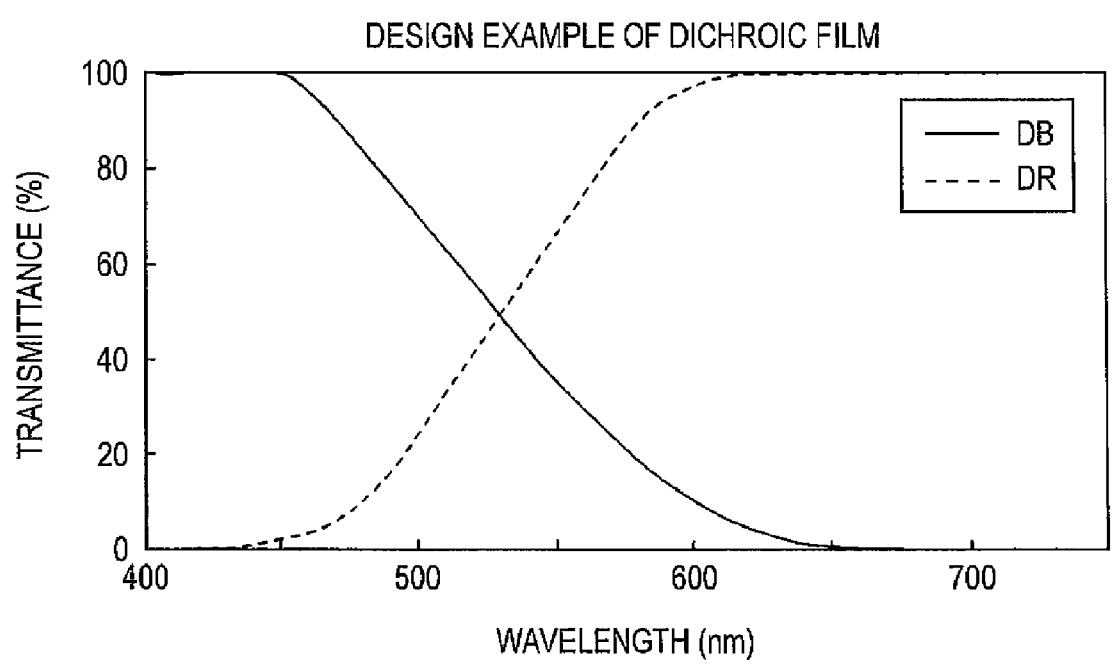
FIG. 34 is a characteristic diagram illustrating a design example of the blue-light reflecting dichroic film DB and the red-light reflecting dichroic film DR, which are used in the color-separation optical system according to the fifth embodiment of the invention.

FIG. 34 shows specific characteristics of the blue-light reflecting dichroic film DB and the red-light reflecting dichroic film DR, which are designed for in the configuration shown in FIG. 1 using the transformed characteristics R'(x), G'(x), and B'(x) shown in FIG. 33 as the ideal characteristics.

Figure 35:
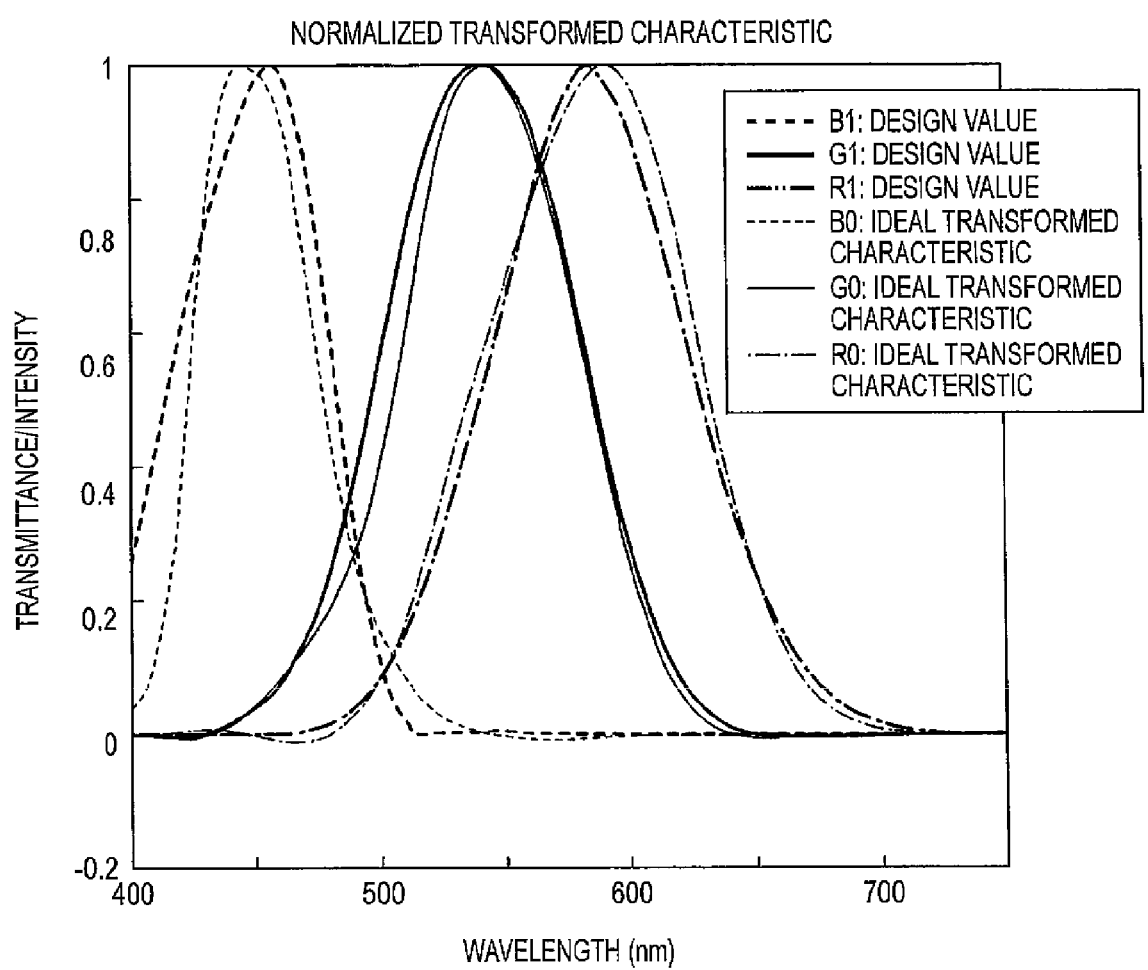
FIG. 35 is a diagram illustrating a normalized total spectral characteristic according to the fifth embodiment of the invention as the normalized total spectral characteristic being compared to an ideal characteristic for which a linear transformation is performed.

FIG. 35 shows the total spectral transmission characteristics (B1, R1, and G1) of the entire optical system of the imaging apparatus having the color-separation optical system having the film design shown in FIG. 34. For the purpose of comparison, the ideal characteristics (B0, R0, and G0) are also shown in FIG. 35. Here, the ideal characteristics are the transformed ideal characteristics shown in FIG. 33.

Figure 36:
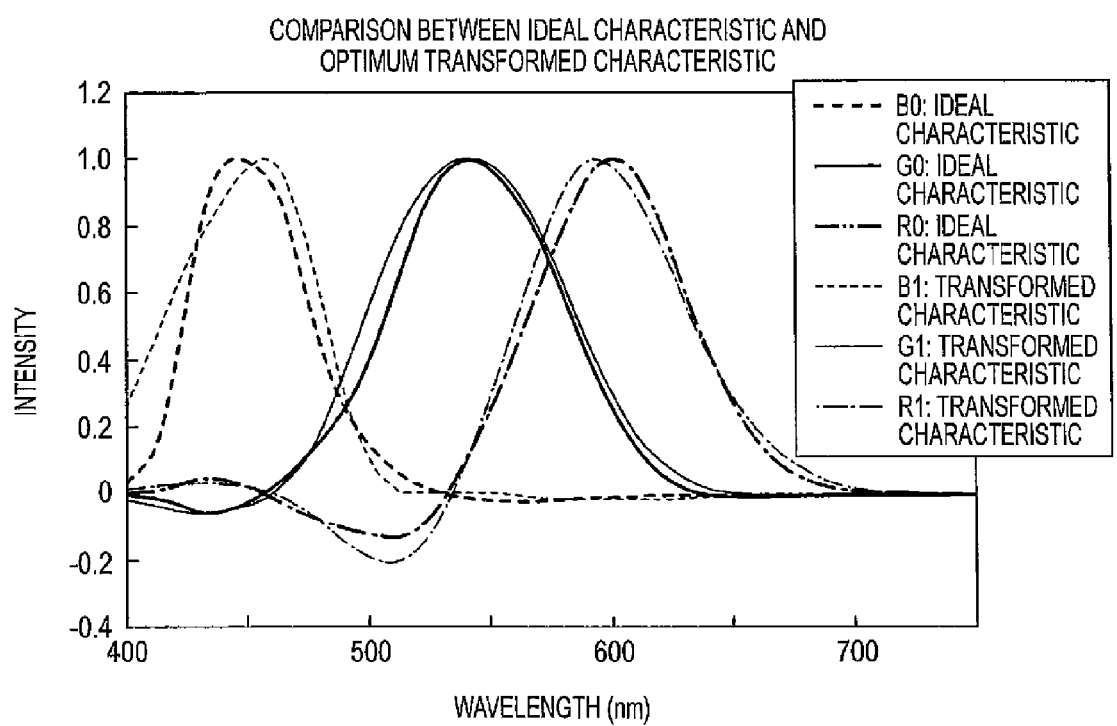
FIG. 36 is a diagram illustrating one obtained by performing an inverse transformation for the normalized total spectral characteristic according to the fifth embodiment shown in FIG. 35 with the one being compared to the ideal characteristic.

FIG. 36 shows the transformed characteristics (B1, R1, and G1) obtained by optimizing the characteristics in the design example shown in FIG. 35 by the use of the inverse calculation. For the purpose of comparison, the ideal characteristics (B0, R0, and G0) are also shown in FIG. 36. Here, the ideal characteristics are one (general ideal characteristics before the linear transformation) that is known in the past and shown in FIG. 54. According to this embodiment, without performing the four-color separation described in the fourth embodiment, it is possible to virtually reproduce the portion having the negative sensitivity and thus to obtain characteristics approximated to the general ideal characteristics.

Figure 37:
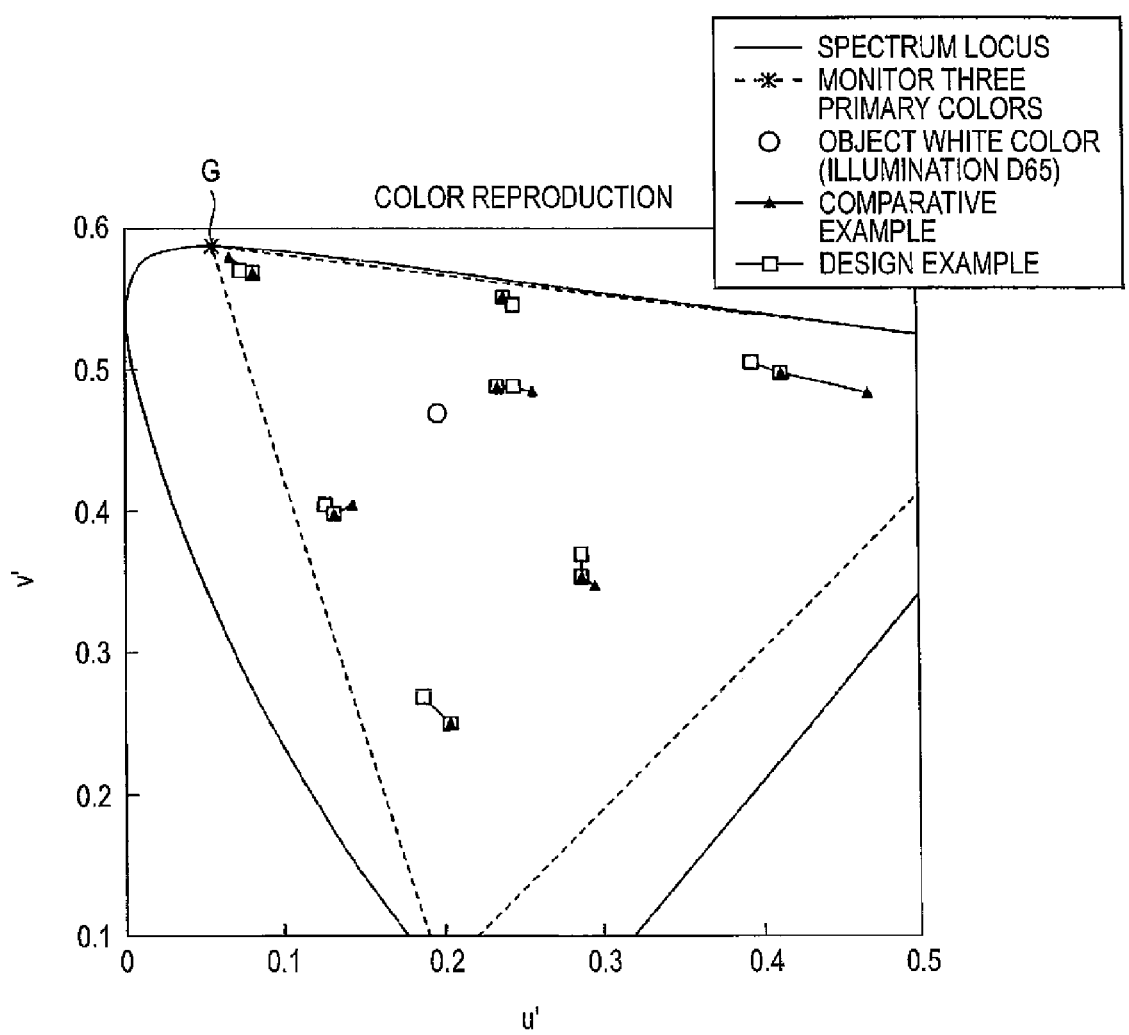
FIG. 37 is an u'v' chromaticity diagram illustrating color reproduction in the fifth embodiment of the invention with the color reproduction being compared to the related art.

FIG. 37 is an u'v' chromaticity diagram illustrating the color reproduction of the design examples according to this embodiment with compared to the related art, as in FIG. 8. In the drawing, the coordinate points of filled triangles "▲" represent coordinate points of arbitrary colors in the related-art configuration. The coordinate points of outlined squares "□" represent coordinate points of arbitrary colors in the design example according to this embodiment. In the related-art configuration and the design example according to this embodiment, a deviated amount from an ideal point (deviated amount of a reproduced color) is indicated by a solid line connecting the coordinate points. In the design example according to this embodiment, it is possible to further improve the color reproduction in comparison with the film design based on the general ideal characteristic shown in the first embodiment. Particularly, the color reproduction of cyan and green is stabilized. An average color difference of seven colors of B (blue), G (green), R (red), C (cyan), Y (yellow), M (magenta), and skin (skin color) is improved from 8.84 to 2.95. The average color difference in the first embodiment shown in FIG. 8 is 7.37. That is, this embodiment can further decrease the average color difference.

Figure 38:
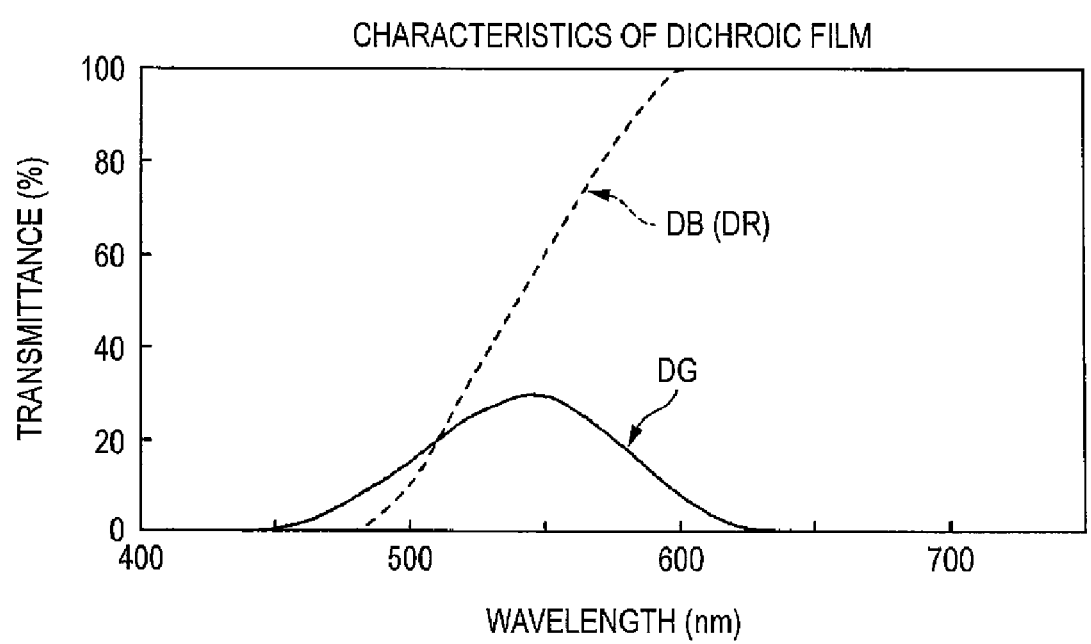
FIG. 38 is a characteristic diagram illustrating another example of a dichroic film used in the color-separation optical system according to the fifth embodiment of the invention.

This embodiment can be applied to the modified examples of the first embodiment. In addition, this embodiment can be applied to the configurations according to the second and third embodiments. FIG. 38 shows the film configuration of a dichroic film when this embodiment is applied to the configuration according to the second embodiment. It is The film configuration having the characteristics shown in FIG. 38 may be used instead of the film configuration shown in FIG. 19.

Sixth Embodiment

Next, a sixth embodiment of the invention will be described. Elements that are substantially same as the first to fifth embodiments are denoted by the same reference numerals and description thereof will be omitted.

Figure 39:
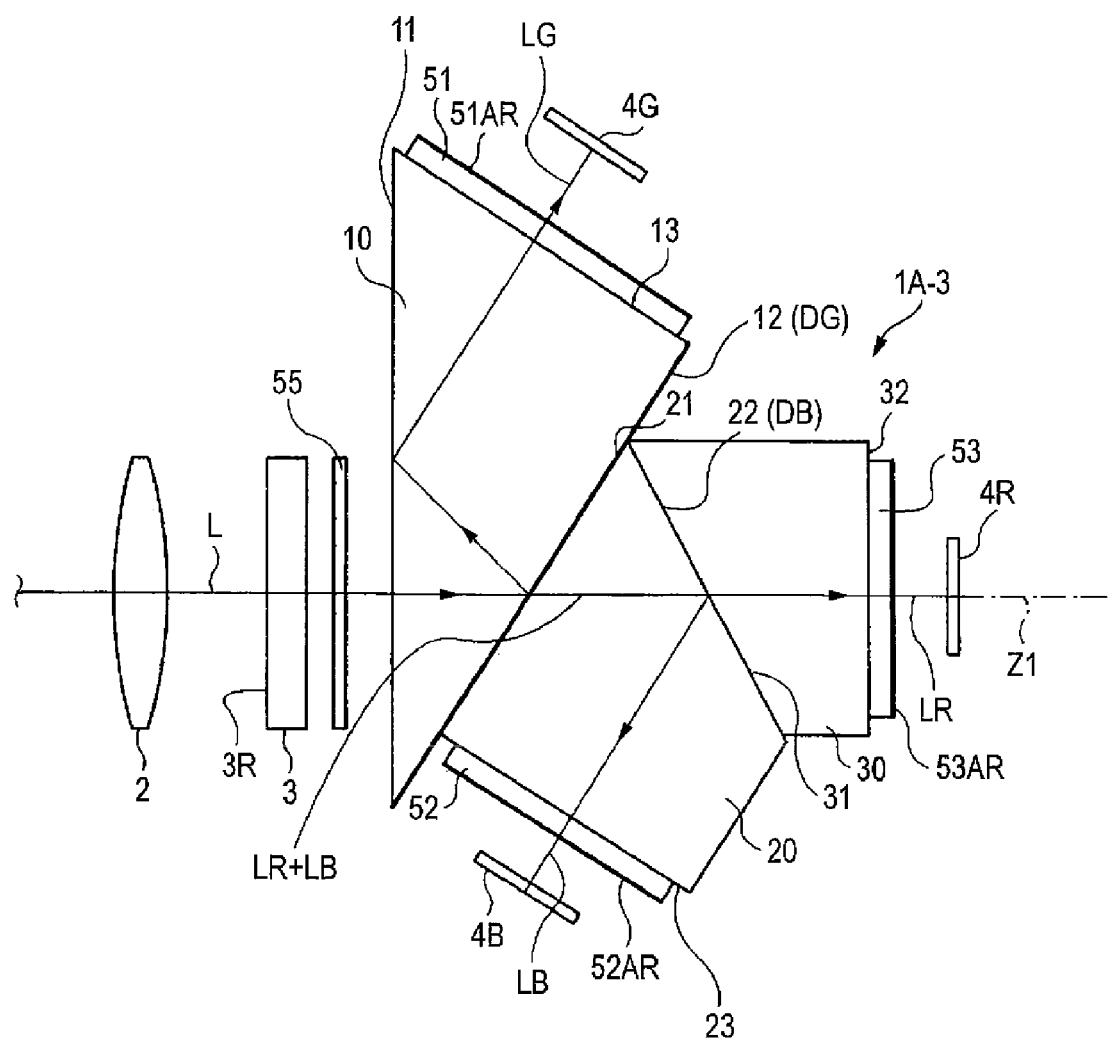
FIG. 39 is a sectional view illustrating an example of an imaging apparatus having a color-separation optical system according to a sixth embodiment of the invention.

FIG. 39 shows the configuration of a color-separation optical system 1A-3 according to the sixth embodiment of the invention. In the color-separation optical system 1A-3, a depolarizing plate 55 disposed on a front side of the first prism 10 is added to the color-separation optical system 1A-2 shown in FIG. 21. The other configurations are similar to those of the color-separation optical system 1A-2 shown in FIG. 21. The depolarizing plate 55 serves to depolarize the polarization of the incident light in a specific direction.

Figure 40:
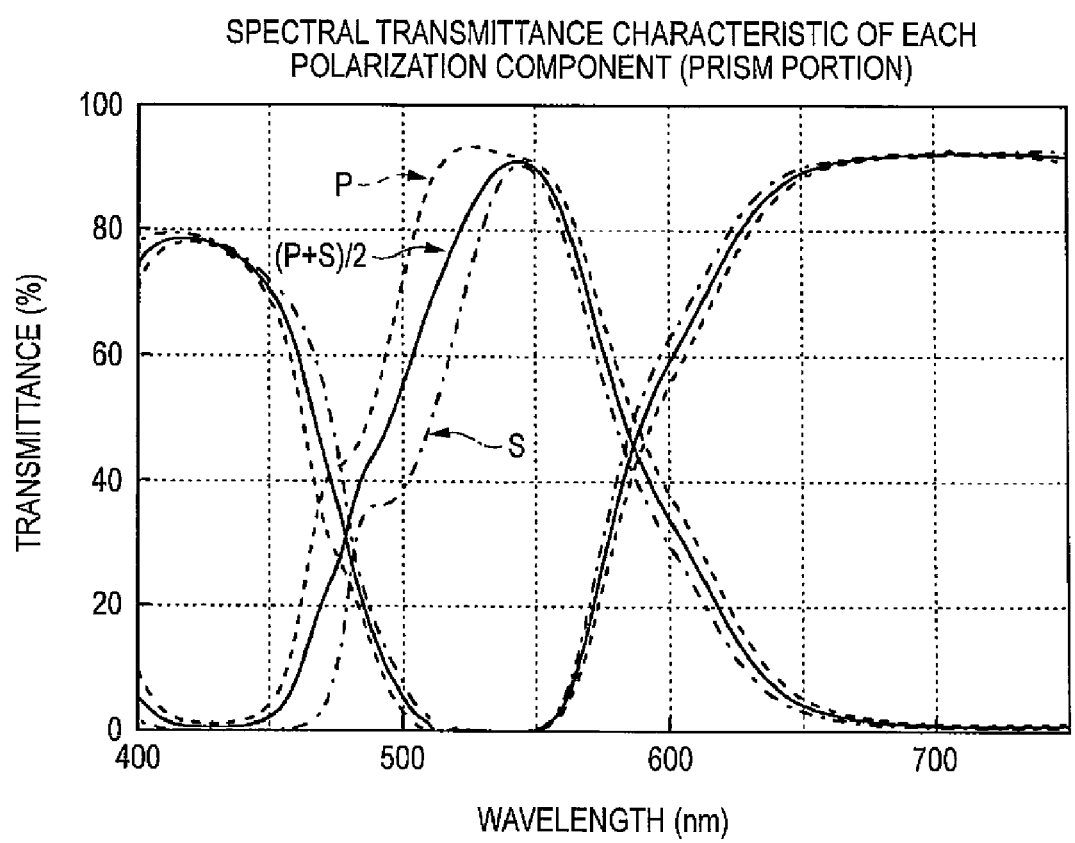
FIG. 40 is a diagram illustrating a spectral characteristic of a prism portion in the imaging apparatus according to the sixth embodiment of the invention.

FIG. 40 shows an example of the spectral transmission characteristic of each polarized component in the entire prism portion (first, second, and third prisms 10, 20, and 30) in the case where the depolarizing plate 55 is not provided. For example, when the components of the incident light are biased to a specific linearly polarized component, the spectral characteristic would be changed in comparison with the case where the incident light is not polarized. FIG. 40 shows the characteristics when linearly polarized components (P polarized component and S polarized component) perpendicular to each other are independently incident as the incident light. The characteristic when the incident light is not polarized is represented by (P+S)/2. In this embodiment, since the depolarizing plate 55 is disposed on the front side of the first prism 10, it is possible to depolarize the polarization of the incident light in the specific direction and thus to obtain a stable spectral characteristic represented by (P+S)/2 in FIG. 40.

In the configurations according to the other embodiments, the depolarizing plate 55 may be also disposed in the front of the first prism 10.

Seventh Embodiment

Next, a seventh embodiment of the invention will be described. Elements that are substantially same as those in the first to sixth embodiments are denoted by the same reference numerals and description thereof will be omitted.

Figure 41:
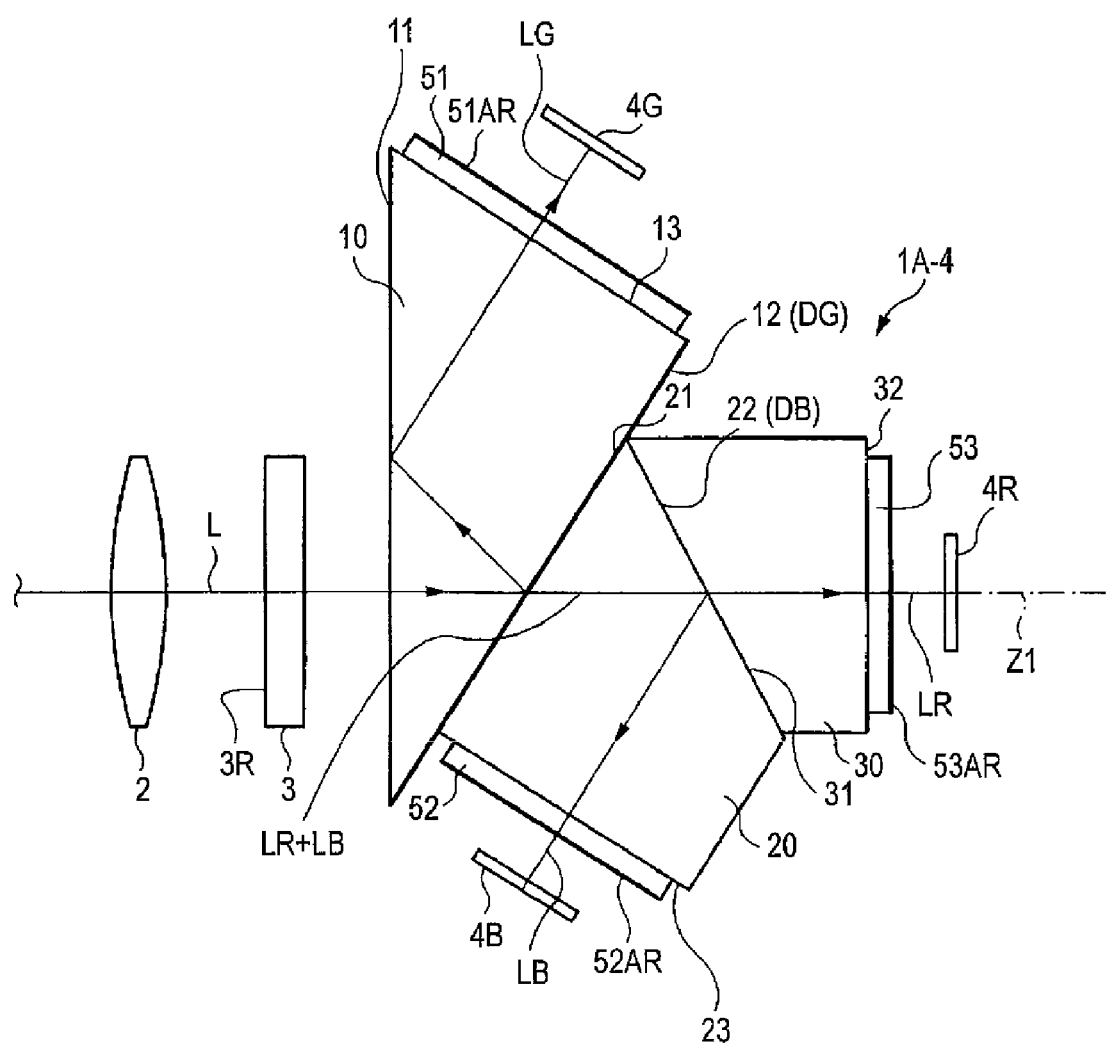
FIG. 41 is a sectional view illustrating an example of an imaging apparatus having a color-separation optical system according to a seventh embodiment of the invention.

FIG. 41 shows the configuration of a color-separation optical system 1A-4 according to the seventh embodiment of the invention. In the color-separation optical system 1A-4, characteristics of a trimming filter 53 that is disposed on an exiting-surface side of the prism (third prism 30) for extracting the red light in the color-separation optical system 1A-2 shown in FIG. 21 are changed to such characteristics of an absorbing filter that blocks the blue light and the green light while transmitting the red light. The other configurations are similar to those of the color-separation optical system 1A-2 shown in FIG. 21.

Figure 42:
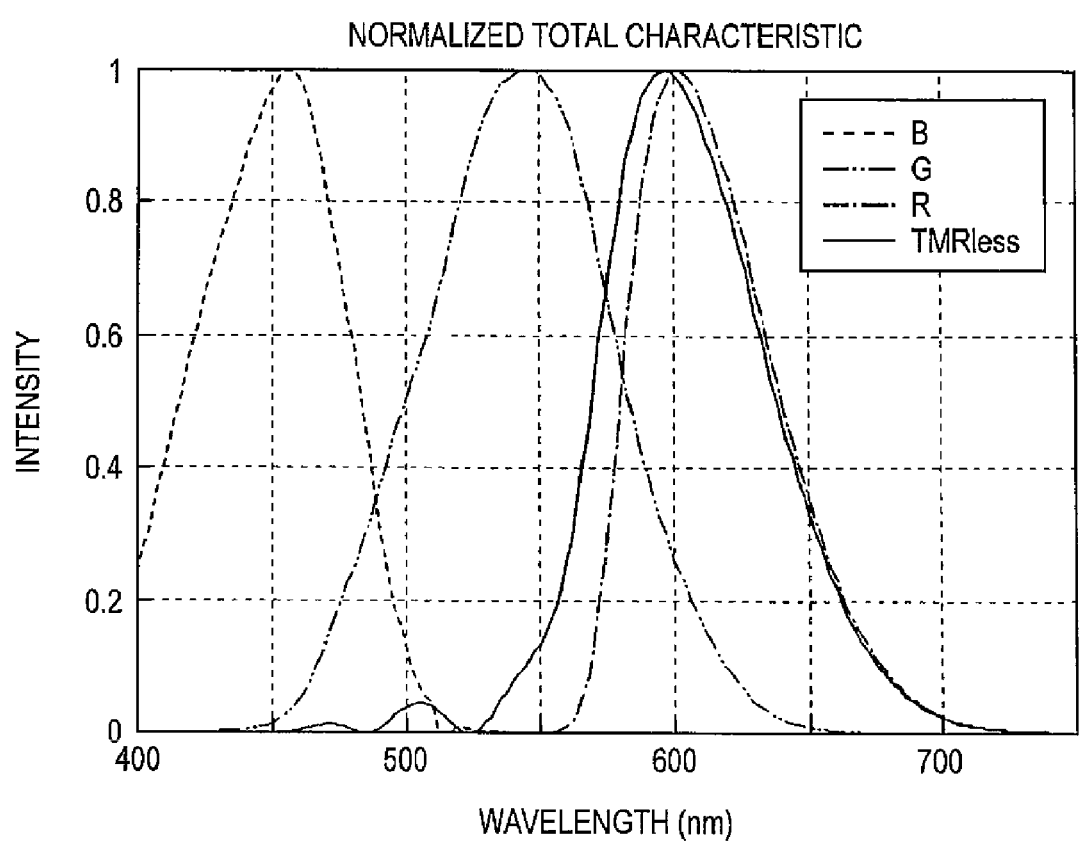
FIG. 42 is a diagram illustrating a normalized total spectral characteristic of the imaging apparatus according to the seventh embodiment of the invention.

FIG. 42 shows total spectral transmission characteristics (characteristics denoted by R, G, and B in the drawing) of the entire optical system when the color-separation optical system according to this embodiment is applied to the imaging apparatus. For the purpose of comparison, FIG. 42 also shows a characteristic curve (denoted by a solid line (TMRless) in the drawing) when the characteristics of the trimming filter 53 are not changed to the characteristics of the absorbing filter that blocks the blue light and the green light while transmitting the red light. When the characteristics of the trimming filter 53 are not changed to those of the absorbing filter; the blue light and the green light leaks into the red imaging device 4R and unnecessary components are mixed, thereby deteriorating the color reproduction. In this embodiment, since the trimming filter 53 having the characteristics to block the blue light and the green light on the exiting-surface side of the prism for extracting the red light, the unnecessary components can be prevented from leaking, thereby improving the color reproduction.

In the configurations of the other embodiments, the trimming filter having the characteristics to block the blue light and the green light may be also provided on the exiting-surface side of the prism for extracting the red light.

Eighth Embodiment

Next, an eighth embodiment of the invention will be described. Elements that are substantially same as those in the first embodiment are denoted by the same reference numerals.

Figure 43:
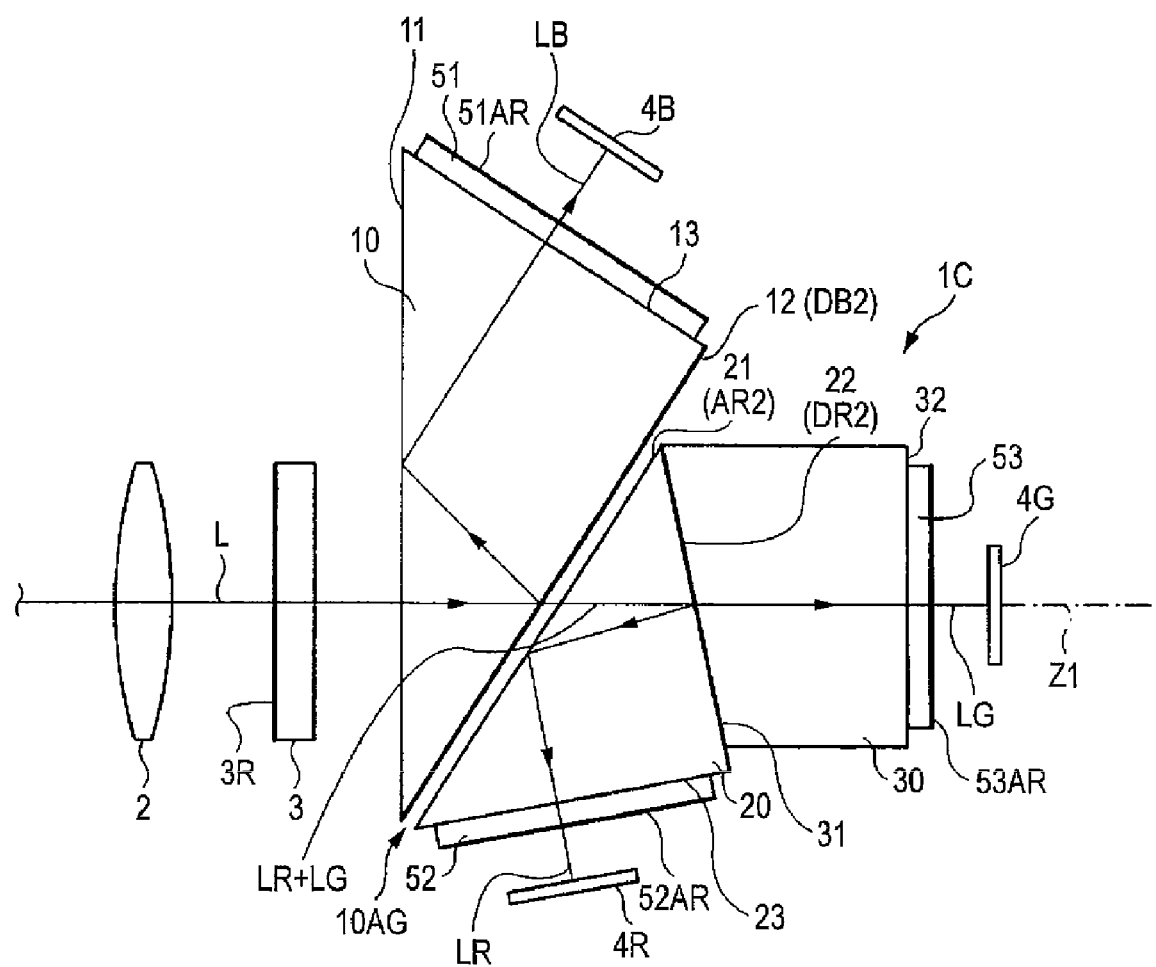
FIG. 43 is a sectional view illustrating an example of an imaging apparatus having a color-separation optical system according to an eighth embodiment of the invention.

FIG. 43 shows the partial configuration of an imaging apparatus having a color-separation optical system 1C according to an eighth embodiment of the invention. The imaging apparatus is used as an imaging unit of, for example, a television camera. The color-separation optical system 1C serves to separate incident light L input through the taking lens 2 into the three light components of the blue light LB, the red light LR, and the green light LG. The imaging devices 4B, 4R, and 4G for respective color light, such as CCD, are disposed to correspond to the light components separated by the color-separation optical system 1C. The color-separation optical system 1C includes the IR (infrared) cut filter 3, the first prism 10, the second prism 20, and the third prism 30 in order from the light-incident side along the optical axis Z1. The color-separation optical system 1C according to this embodiment has the configuration that the blue light LB is extracted by the use of the first prism 10, the red light LR is extracted by the use of the second prism 20, and the green light LG is extracted by the use of the third prism 30.

The first prism 10 has the first surface 11, the second surface 12, and the third surface 13. The first surface 13 of the first prism 10 is the light exiting surface. The trimming filter 51 is formed on the exiting surface. The characteristic-adjusting dichroic film which was used in the past is not provided in the trimming filter 51, but instead, the ghost-flare preventing antireflection film 51AR is formed on the light exiting surface of the trimming filter 51. The antireflection film 51AR may be formed directly on the third surface 13 of the first prism 10, without the trimming filter 51 being provided.

A blue-light reflecting dichroic film DB2 as the first dichroic film is formed on the second surface 12 of the first prism 10. The blue-light reflecting dichroic film DB2 has the film configuration for reflecting the blue light LB as the first color light component and transmitting the red light LR and the green light LG. In the blue-light reflecting dichroic film DB2, a transmission characteristic curve of wavelength versus transmissivity has a shape that tracks a short-wavelength side of the ideal spectral characteristic of green, which is obtained by conversion from chromaticity coordinates of three primary colors of a color reproducing medium and which is determined based on the color-matching function in the XYZ color coordinate system. Here, the "ideal characteristic" is a characteristic known in the past, for example, as shown in FIG. 54. The "ideal characteristic" is converted from the chromaticity coordinates of three primary colors of the color reproducing medium and can be obtained by the linear transformation of the color-matching function in the XYZ color coordinate system. An ideal characteristic itself represented by the color-matching function in the RGB color coordinate system may be used as the "ideal characteristic."

Figure 44A:
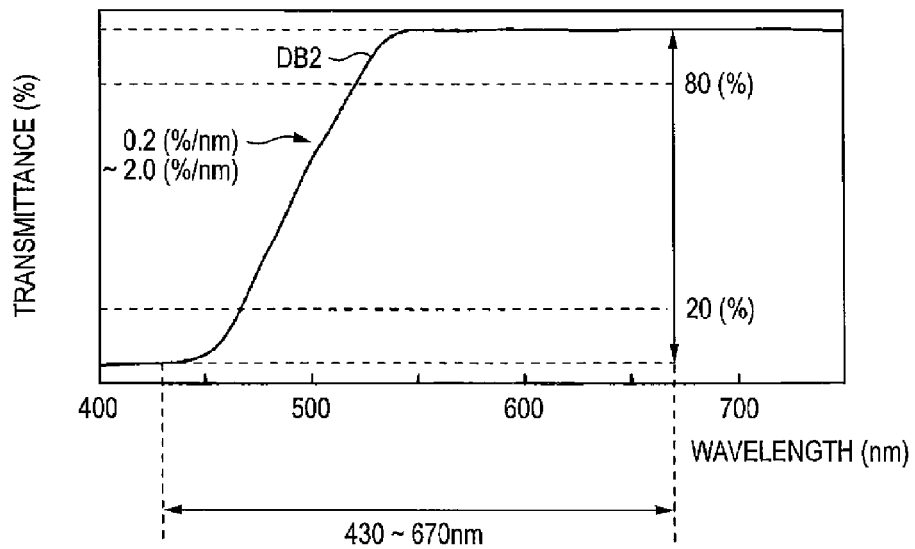
FIG. 44A is a diagram illustrating a characteristic of a blue-light reflecting dichroic film DB2, which is used in the color-separation optical system according to the eighth embodiment of the invention.

FIG. 44A shows an example of the transmission characteristic curve of the blue-light reflecting dichroic film DB2 in the configuration shown in FIG. 43. The blue-light reflecting dichroic film DB2 is configured so that the transmission characteristic curve has a shape that goes up from a low transmissivity to a high transmissivity in a wavelength range of 430 nm to 670 nm while tracking the short-wavelength side of the ideal spectral characteristic of green. More specifically, it is preferable that the transmission characteristic curve has such a shape that an average slope value is equal to or larger than 0.2 (%/nm) and equal or less than 2.0 (%/nm) in a portion where the transmission characteristic curve changes from 20% to 80% of a range that is defined between the lowest transmissivity and the highest transmissivity in the wavelength range of 430 nm to 670 nm.

Figures 48A, 48B:
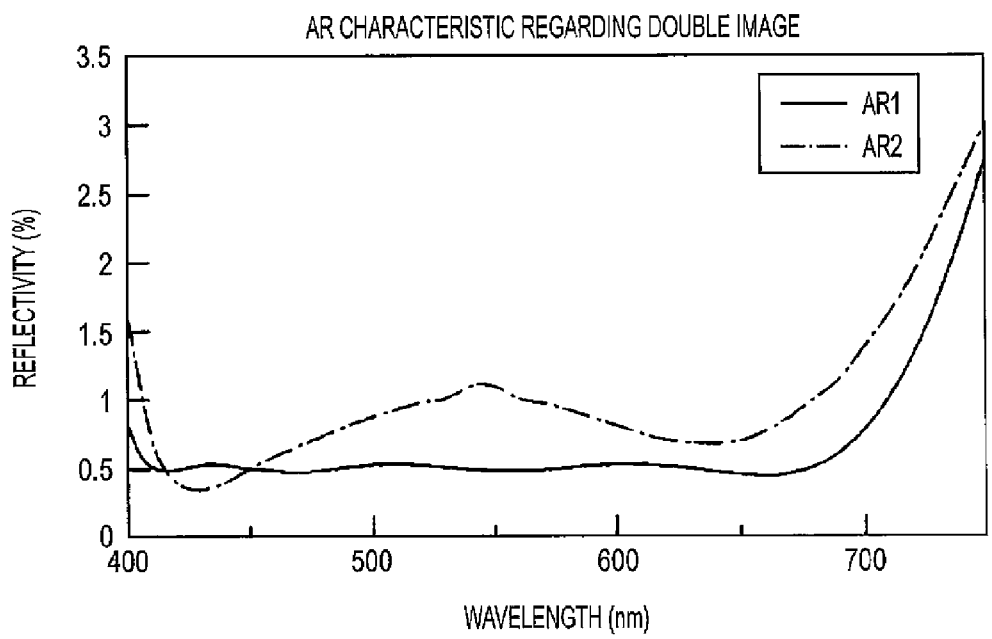
FIG. 48 is a diagram illustrating a characteristic of an antireflection film AR2 according to the eighth embodiment of the invention with the characteristic of the antireflection film AR2 being compared to a characteristic of an antireflection film AR1 of a related art, and is a diagram illustrating examples of film data of the antireflection film AR2.

The second prism 20 has the first surface 21, the second surface 22, and the third surface 23. The first surface 21 of the second prism 20 is the light incidence surface. The second prism 20 is disposed with the predetermined air gap 10AG from the first prism 10. More specifically, the surface 12 of the first prism 10 on which the blue-light reflecting dichroic film DB2 is formed and the light incidence surface 21 of the second prism 20 are disposed to face each other with the air gap 10AG interposed therebetween. An interface-reflection preventing antireflection film AR2 for reducing reflection of light that is in a specific wavelength range and that passes through the blue-light reflecting dichroic film DB2 is formed on the incidence surface 21 of the second prism 20. As shown in FIG. 48A, the interface-reflection preventing antireflection film AR2 has a characteristic of further reducing the reflection of light at least in a wavelength range of 500 nm to 550 nm that is the light in the specific wavelength range, in comparison with the antireflection film AR1 of the related art for reproducing the reflectivity of the entire visible range. More specifically, it is preferable that the average reflectivity for light in the wavelength range of 500 nm to 550 nm is 0.7% or less. FIG. 48B shows numerical data of a specific film design example of the antireflection film AR2. In FIG. 48B, "Sub-H4" represents Substance H4 (made by Merck KGaA in Germany) containing $LaTiO_3$ as a major component. However, the film materials, the number of layers, and the thicknesses of the layers are not limited to the examples shown in FIG. 48B.

The third surface 23 of the second prism 20 is the light exiting surface. The trimming filter 52 is disposed on the exiting surface. Similarly to the trimming filter 51 of the first prism 10, a characteristic-adjusting dichroic film is not provided in the trimming filter 52, but the ghost-flare preventing antireflection film 52AR is formed on the light exiting surface of the trimming filter 52. Without the trimming filter 52 being provided, the antireflection film 52AR may be formed directly on the third surface 23 of the second prism 20.

A red-light reflecting dichroic film DR2 as the second dichroic film is formed on the second surface 22 of the second prism 20. The red-light reflecting dichroic film DR2 has the film configuration for reflecting the red light LR as the second color light component and transmitting the green light LG. In the red-light reflecting dichroic film DR2, the transmission characteristic curve of wavelength versus transmissivity has a shape that tracks a long-wavelength side of the ideal spectral characteristic of green.

Figure 44B:
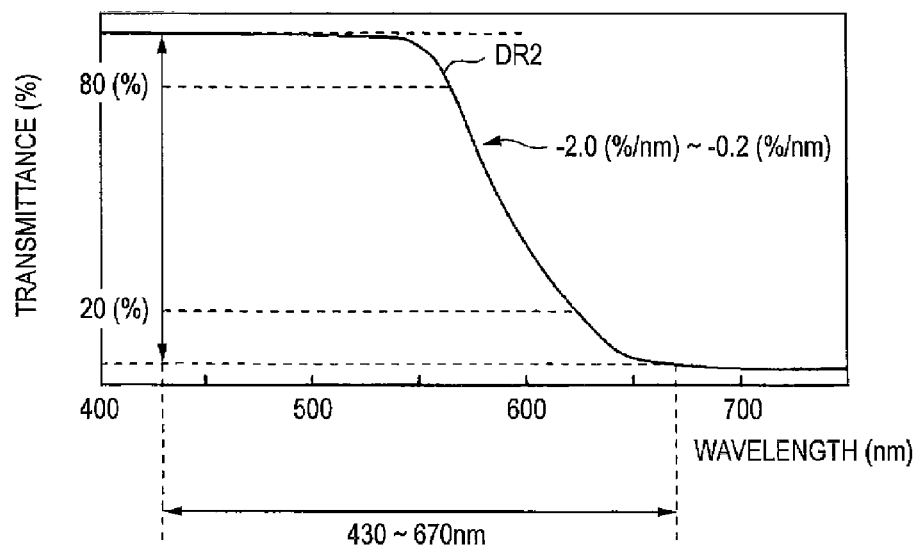
FIG. 44B is a diagram illustrating a characteristic of a red-light reflecting dichroic film DR2 thereof.

FIG. 44B shows an example of the transmission characteristic curve of the red-light reflecting dichroic film DR2 in the configuration shown in FIG. 43. The red-light reflecting dichroic film DR2 is configured so that the transmission characteristic curve has a shape that goes down from a high transmissivity to a low transmissivity in a wavelength range of 430 nm to 670 nm while tracking the long-wavelength side of the ideal spectral characteristic of green. More specifically, it is preferable that the transmission characteristic curve has such a shape that an average slope value is equal to or larger than −2.0 (%/nm) and equal or less than −0.2 (%/nm) in a portion where the transmission characteristic curve changes from 80% to 20% of a range that is defined between the highest transmissivity and the lowest transmissivity in the wavelength range of 430 nm to 670 nm.

Figure 45:
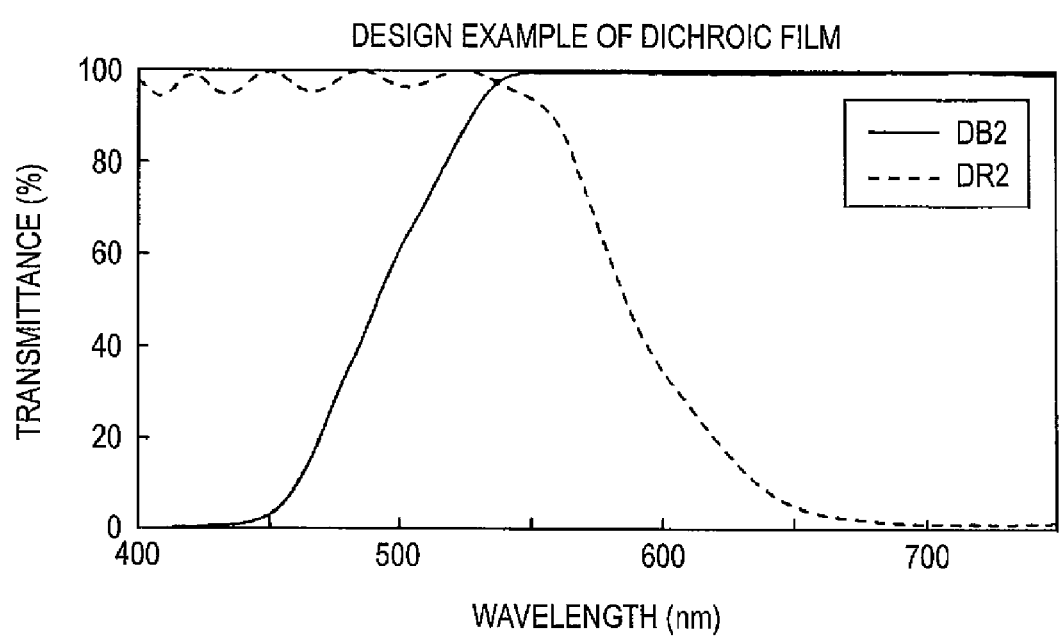
FIG. 45 is a characteristic diagram illustrating a design example of the blue-light reflecting dichroic film DB2 and the red-light reflecting dichroic film DR2, which are used in the color-separation optical system according to the eighth embodiment of the invention.

FIG. 45 shows characteristics of specific design examples of the blue-light reflecting dichroic film DB2 and the red-light reflecting dichroic film DR2, which are used in the color-separation optical system 1C. Of the characteristics shown in FIG. 45, the characteristics of the blue-light reflecting dichroic film DB2 and the red-light reflecting dichroic film DR2 are obtained from the film design represented, for example, by specific numerical data in FIGS. 46 and 47. However, the film materials, the number of layers, and the thicknesses of the layers are not limited to the examples shown in FIGS. 46 and 47.

The third prism 30 has the first surface 31 and the second surface 32. The third prism 30 is bonded to the second prism 20 with the red-light reflecting dichroic film DR2 interposed therebetween. More specifically, the second surface 22 of the second prism 20 and the first surface 31 of the third prism 30 are boned to each other through the red-light reflecting dichroic film DR2. The second surface 32 of the third prism 30 is the light exiting surface. The trimming filter 53 is disposed on the exiting surface. Similarly to the trimming filter 51 of the first prism 10, a characteristic-adjusting dichroic film is not provided in the trimming filter, but the ghost-flare preventing antireflection film 53AR is formed on the light exiting surface of the trimming filter 53 instead. Without the trimming filter 53 being provided, an antireflection film 53AR may be formed directly on the second surface 32 of the third prism 30.

The IR cut filter 3 is disposed on a front side of the first prism 10. In order to more easily obtain a characteristic approximated to the ideal spectral characteristic, the IR cut filter 3 preferably includes an absorbing filter having a characteristic approximated to the luminosity factor. When the infrared ray cannot be removed sufficiently only by the absorbing filter, a coating type infrared cut filter for cutting the infrared ray may be further provided. FIG. 43 shows an example where a panel-shaped absorbing filter is coated with a film 3R for cutting the infrared ray. The IR cut filter 3 may be disposed on the light-exiting-surface side of the prism (the second prism 20 in FIG. 43) for extracting the red light, rather than on the front side of the first prism 10.

Although not shown, the color-separation optical system 1C may further include an absorbing type or coating type ultraviolet lay cut filter disposed on the front side of the first prism 10 so as to cut the ultraviolet ray.

Next, operations of the imaging apparatus according to this embodiment, particularly, operations and advantages of the color-separation optical system 1C will be described.

In the imaging apparatus, light that is emitted from a light source not shown and that is reflected by a subject not shown is input to the color-separation optical system 1C through the taking lens 2. The color-separation optical system 1C separates the incident light L into the three light components of the blue light LB, the red light LR, and the green light LG. More specifically, the blue light LB of the incident light L is reflected by the blue-light reflecting dichroic film DB2 and is extracted as the first color light component by the first prism 10. The red light LR passing through the blue-light reflecting dichroic film DB2 is reflected by the red-light reflecting dichroic film DR2 and is extracted as the second color light component by the second prism 20. The green light LG passing through the blue-light reflecting dichroic film DB2 and the red-light reflecting dichroic film DR2 is extracted as the third color light component by the third prism 30. The light components separated by the color-separation optical system 1C are incident on the imaging devices 4B, 4R, and 4G disposed to correspond to the respective light components. The imaging devices 4B, 4R, and 4G output electrical signals in accordance with the respective light components.

Figure 58:
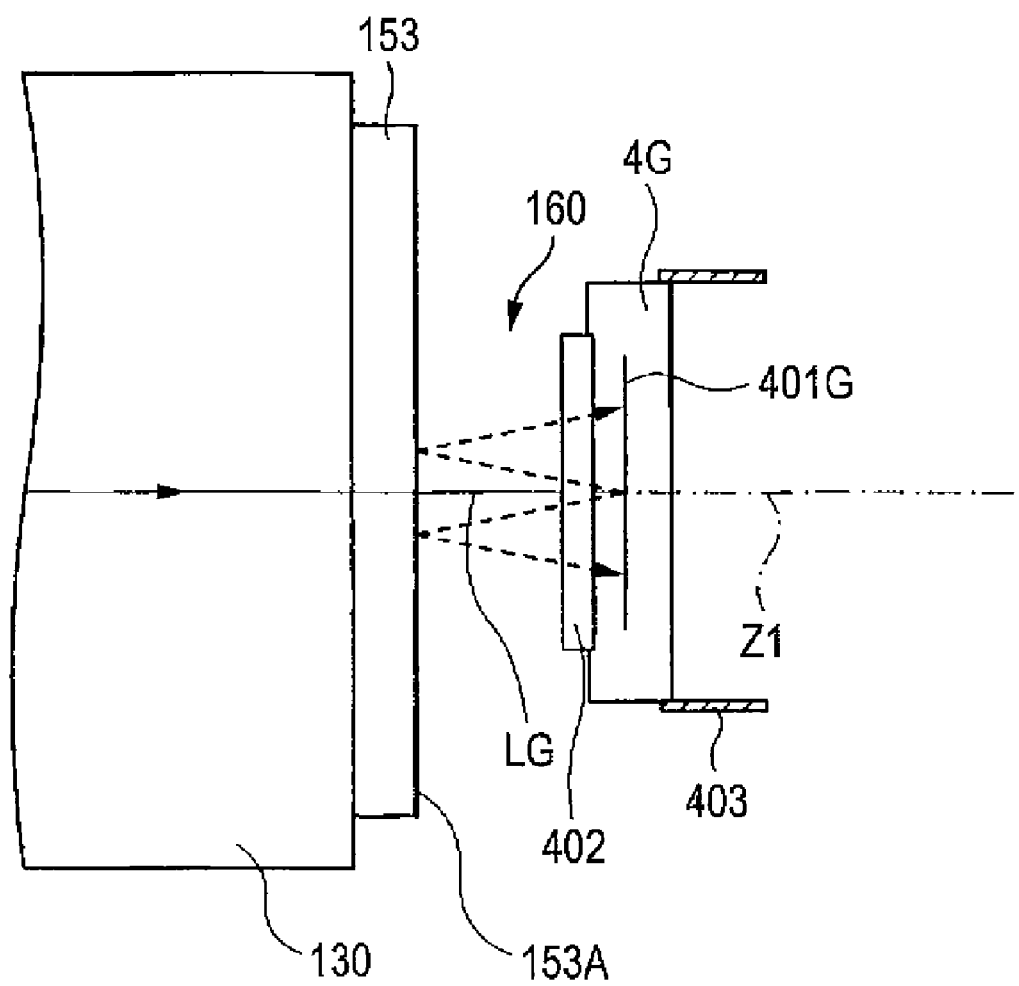
FIG. 58 is a diagram illustrating multiple reflections occurring in the color-separation optical system of the related art.

Here, in the color-separation optical system of the related art (FIG. 59) using the trimming filter having the dichroic film in the exiting surface of the prism, a wavelength range having selectively high reflectivity depending on wavelength exists as a characteristic of the dichroic film. Therefore, multiple reflections occur between the dichroic surface and the imaging surface to cause ghost and flare, thereby deteriorating image quality. FIG. 58 shows the multiple reflections occurring in the exiting surface of the third prism 130 for extracting the green light LG in the color-separation optical system 101 of the related art. As shown in FIG. 58, the imaging device 4G includes an imaging surface 401G, a cover glass 402, and an external electrode 403. For example, a part of the green light LG passing through the green trimming filter 153 is reflected by the imaging surface 401G and the returning beam is reflected depending on the wavelength selection characteristic of the dichroic film 153A of the trimming filter 153. In this way, the multiple reflected light 160 is generated to cause the ghost and flare. Accordingly, it was difficult to embody an imaging apparatus having the ideal spectral characteristic with ghost and flare being reduced.

On the contrary, in this embodiment, since the curve representing the characteristic of the blue-light reflecting dichroic film DB2 and the curve representing the characteristic of the red-light reflecting dichroic film DR2 have shapes that track the ideal spectral characteristic of green, a characteristic approximated to the ideal spectral characteristic is obtained without using the trimming filter having the dichroic film in the exiting surface of the prism. Since it is not necessary to use the trimming filter having the dichroic film, the ghost and flare due to the dichroic film of the trimming filter is suppressed from occurring. Accordingly, it is possible to embody the ideal spectral characteristic with the ghost and flare being reduced.

In this embodiment, the interface-reflection preventing antireflection film AR2 for reducing the reflection of light in the specific wavelength range in the vicinity of 500 nm to 600 nm is formed on the incidence surface 21 of the second prism 20. Therefore, this embodiment can more effectively suppress the reflection by the air interface between the first prism 10 and the second prism 20 in comparison with the antireflection film AR1 of the related art.

Figure 49:
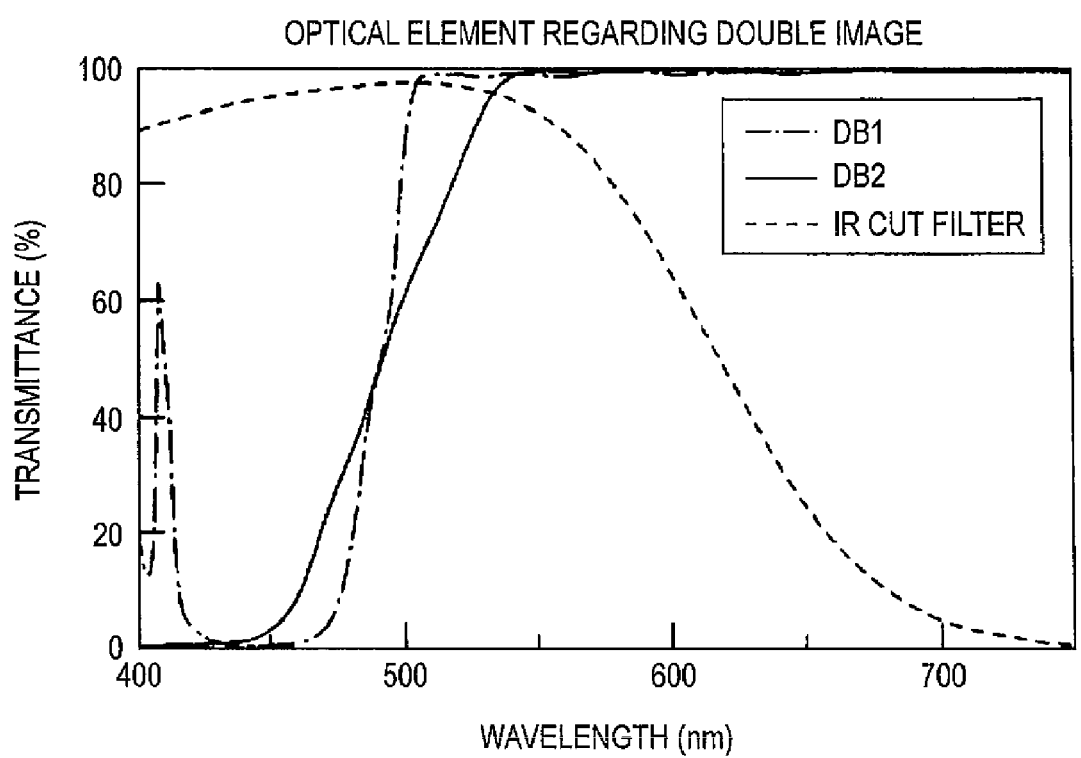
FIG. 49 is a characteristic diagram illustrating optical elements other than the antireflection film, the optical elements which relate to an evaluation of ghost.
Figure 50:
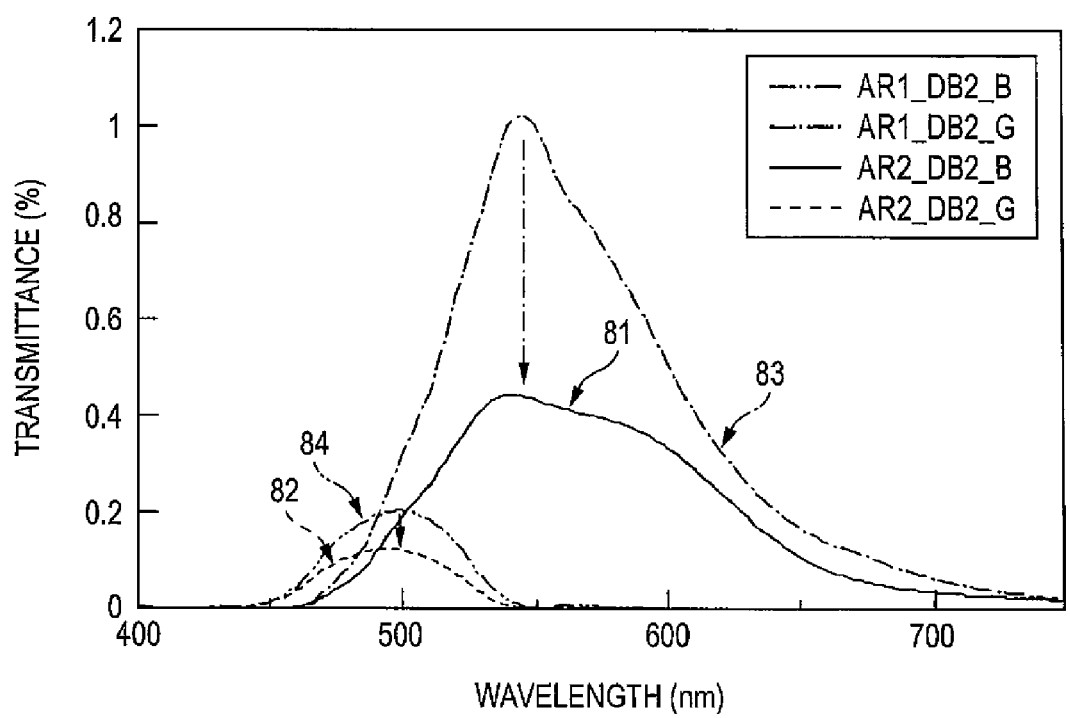
FIG. 50 is a characteristic diagram illustrating a ghost amount occurring in the color-separation optical system according to the eighth embodiment of the invention with the ghost amount being compared to the antireflection film of the related art.

FIG. 50 shows assessment of the ghost (double image) amount in the color-separation optical system 1C according to this embodiment with compared to the case where the antireflection film AR1 of the related art is used. The characteristics shown in FIG. 50 show the assessment result when one having the characteristics shown in FIG. 48A is used as the antireflection films AR1 and AR2 and ones having the characteristics shown in FIG. 49 are used as the IR cut filter 3 and the blue-light reflecting dichroic film DB2.

Figure 60:
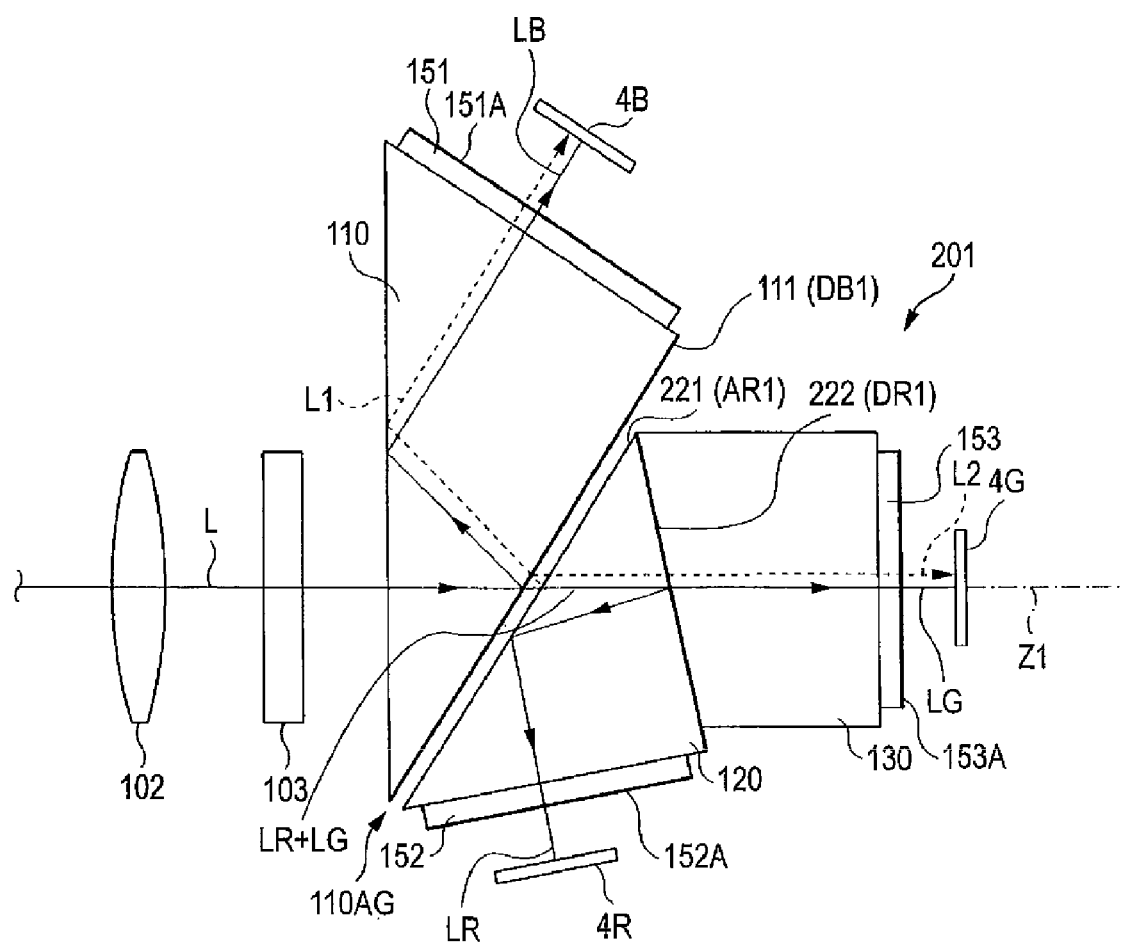
FIG. 60 is a diagram illustrating ghost occurring due to an air interface between two prisms in the other example of the color-separation optical system of the related art.

In FIG. 50, the characteristic curve denoted by reference numeral 81 represents the assessment result of a double image observed by the blue imaging device 4B in the color-separation optical system 1C according to this embodiment. This means a ratio of light components (light corresponding to the light L1 in FIG. 60) that is reflected by the incidence surface 21 of the second prism 20 and reaches the blue imaging device 4B to the light that passes through the blue-light reflecting dichroic film DB2. For the purpose of comparison, the characteristic in the case where the antireflection film AR1 of the related art is formed on the incidence surface 21 of the second prism 20 is represented by the characteristic curve denoted by reference numeral 83. As can be seen from the drawing, when the interface-reflection preventing antireflection film AR2 according to this embodiment is used, it is possible to greatly reduce the occurrence of the double image observed by the blue imaging device 4B.

In FIG. 50, the characteristic curve denoted by reference numeral 82 represents the assessment result of a double image observed by the green imaging device 4G in the color-separation optical system 1C according to this embodiment. This means a ratio of light components (light corresponding to the light L2 in FIG. 60) that is reflected by the incidence surface 21 of the second prism 20, is reflected by the second surface 12 of the first prism 10, passes through the second prism 20 and the third prism 30 and reaches the green imaging device 4G to the light that passes through the blue-light reflecting dichroic film DB2. For the purpose of comparison, the characteristic in the case where the antireflection film AR1 of the related art is formed on the incidence surface 21 of the second prism 20 is represented by the characteristic curve denoted by reference numeral 84. As can be seen from the drawing, when the interface-reflection preventing antireflection film AR2 according to this embodiment is used, it is possible to greatly reduce the occurrence of the double image observed by the green imaging device 4G.

As described above, in the color-separation optical system 1C according to this embodiment, since the antireflection film AR2 for reducing the reflection of light in the specific wavelength range that passes through the first dichroic film (blue-light reflecting dichroic film DB2) is formed on the incidence surface 21 of the second prism 20, it is possible to effectively reduce the ghost due to the reflection from the air interface between two prisms in comparison with the related art. In the imaging apparatus according to this embodiment, since the image signals corresponding to the light components obtained by the color-separation optical system 1C having the high performance according to this embodiment are output, it is possible to obtain high-quality photographed image with the ghost being reduced.

Modified Example of Eighth Embodiment

Hereinafter, a modified example of the color-separation optical system 1C will be described.

The interface-reflection preventing antireflection film AR2 used in the color-separation optical system 1C can be used in a color-separation optical system having a different configuration. For example, it may be used in the color-separation optical system of the related art shown in FIG. 59.

Figure 51:
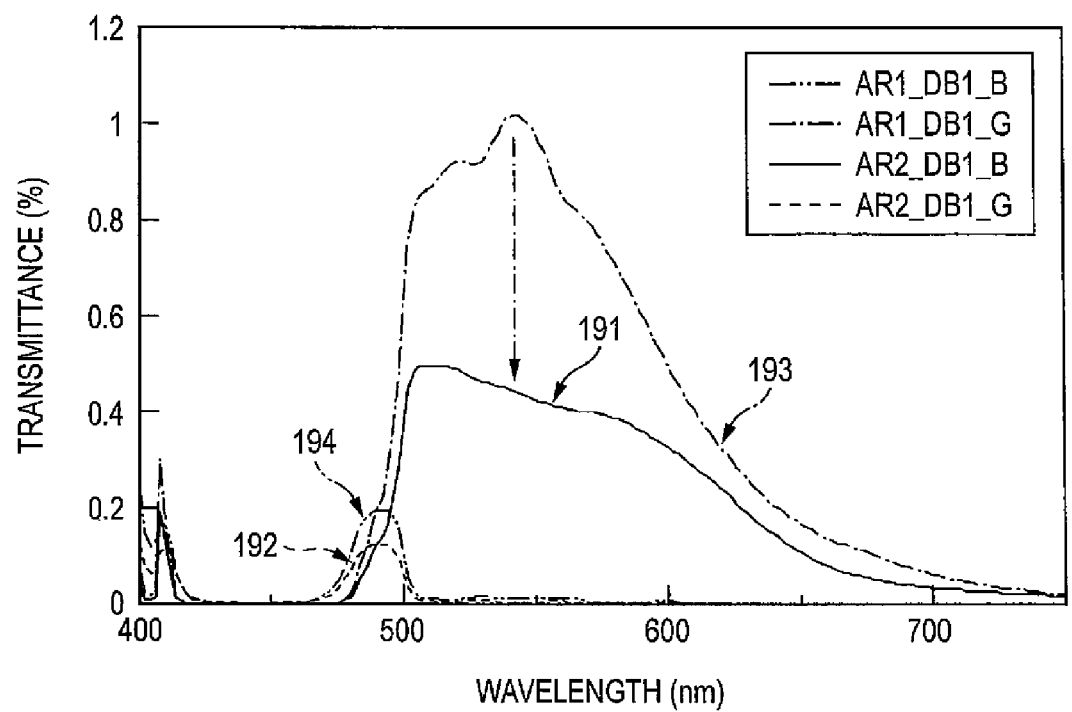
FIG. 51 is a characteristic diagram illustrating characteristics in a case where the antireflection film AR2 according to the eighth embodiment of the invention and the antireflection film AR1 of the related art are applied to a color-separation optical system of the related art with being compared to each other.
Figure 59:
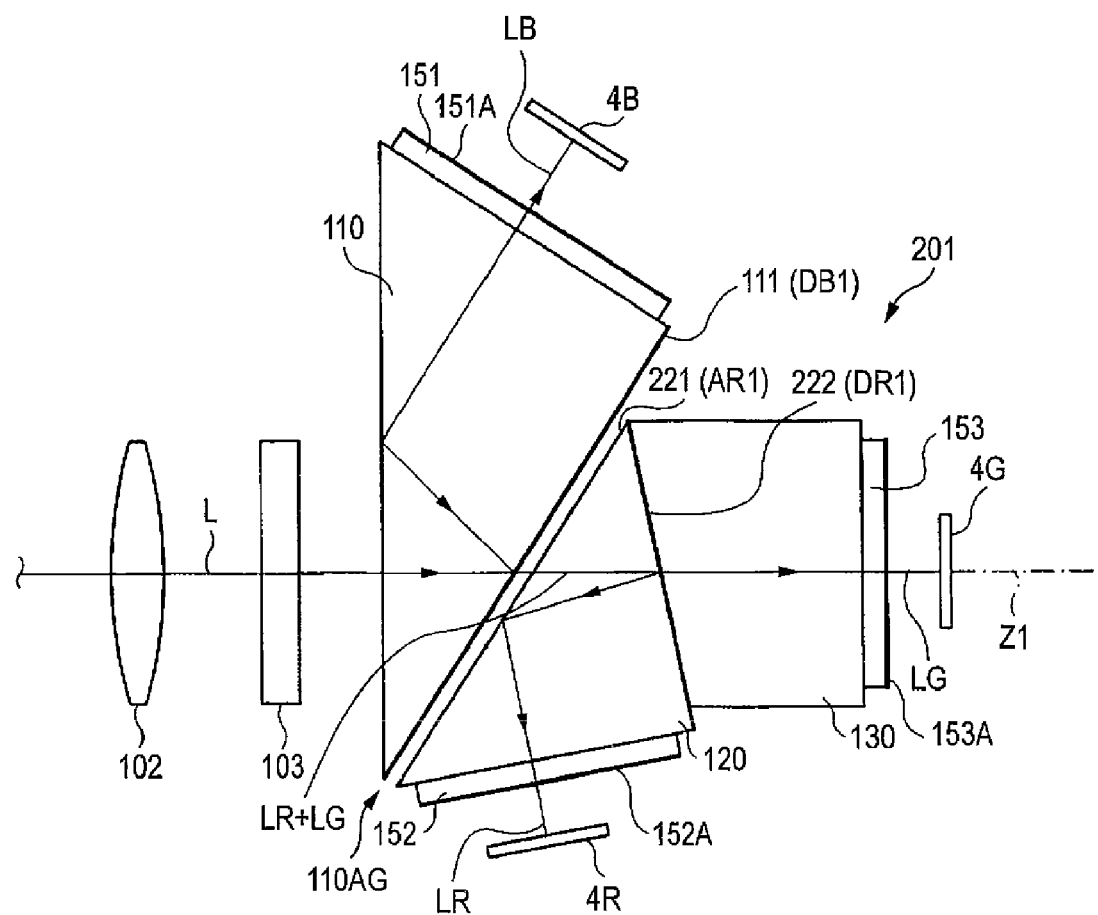
FIG. 59 is a sectional view illustrating another example of the color-separation optical system of the related art.

FIG. 51 shows an assessment result of the ghost (double image) amount in the color-separation optical system of the related art shown in FIG. 59 with compared to the case where the antireflection film AR1 of the related art is used. The characteristics shown in FIG. 51 show the assessment result in the case where one having the characteristics shown in FIG. 48A is used as the antireflection films AR1 and AR2 and ones having the characteristics shown in FIG. 49 are used as the IR cut filter 3 and the blue-light reflecting dichroic film DB1.

In FIG. 51, the characteristic curve denoted by reference numeral 191 represents the assessment result of the double image observed by the blue imaging device 4B when the interface-reflection preventing antireflection film AR2 according to this embodiment is used in the color-separation optical system of the related art shown in FIG. 59. This means a ratio of light components (light corresponding to light L1 in FIG. 60) that is reflected by the incidence surface 121 of the second prism 120 and reaches the blue imaging device 4B to the light that passes through the blue-light reflecting dichroic film DB1. For the purpose of comparison, the characteristic in the case where the antireflection film AR1 of the related art is formed on the incidence surface 121 of the second prism 120 is represented by the characteristic curve denoted by reference numeral 193. As can be seen from the drawing, even when the interface-reflection preventing antireflection film AR2 according to this embodiment is applied to the color-separation optical system of the related art shown in FIG. 60, it is possible to greatly reduce the occurrence of the double image observed by the blue imaging device 4B.

In FIG. 51, the characteristic curve denoted by reference numeral 192 represents the assessment result of a double image observed by the green imaging device 4G when the interface-reflection preventing antireflection film AR2 according to this embodiment is used in the color-separation optical system of the related art shown in FIG. 59. This means a ratio of light components (light corresponding to light L2 in FIG. 60) that is reflected by the incidence surface 121 of the second prism 120, is reflected by the surface 111 of the first prism 110, passes through the second prism 120 and the third prism 130, and reaches the green imaging device 4G to the light that passes through the blue-light reflecting dichroic film DB1. For the purpose of comparison, the characteristic in the case where the antireflection film AR1 of the related art is formed on the incidence surface 121 of the second prism 120 is represented by the characteristic curve denoted by reference numeral 194. As can be seen from the drawing, even when the interface-reflection preventing antireflection film AR2 according to this embodiment is applied to the color-separation optical system of the related art shown in FIG. 59, it is possible to greatly reduce the occurrence of the double image observed by the green imaging device 4G.

The interface-reflection preventing antireflection film AR2 according to this embodiment can be applied to a color-separation system that is different from that shown in FIG. 43 or 59 in color-extraction sequence or in arrangement of prisms.

The features of the color-separation optical system 1C according to this embodiment and the color-separation optical systems according to the other embodiments may be properly combined. For example, the color-separation optical system 1C according to this embodiment may further include the depolarizing plate 55 described in the sixth embodiment.

What is claimed is:

1. A color-separation optical system for separating incident light into at least three color light components of blue light, red light, and green light, the color-separation optical system comprising, in order from a light-incident side:
    a first prism that has a first dichroic film and extracts a first color light component reflected by the first dichroic film;
    a second prism that has a second dichroic film and extracts a second color light component which passes through the first dichroic film and which is reflected by the second dichroic film; and
    a third prism that extracts a third color light component which passes through the first and second dichroic films, wherein
    the first dichroic film has a film configuration for reflecting the blue light as the first color light component,
    the second dichroic film has a film configuration for reflecting the red or green light as the second color light component,
    a transmission characteristic curve of wavelength versus transmissivity of the first dichroic film has a shape that tracks a short-wavelength side of an ideal spectral characteristic of green,
    a transmission characteristic curve of wavelength versus transmissivity of the second dichroic film has a shape that tracks a long-wavelength side of the ideal spectral characteristic of green when the second dichroic film reflects the red light, and
    a reflection characteristic curve of wavelength versus reflectivity of the second dichroic film has a shape that tracks the long-wavelength side of the ideal spectral characteristic of green when the second dichroic film reflects the green light.

2. The color-separation optical system according to claim 1, wherein
    the first prism extracts the blue light,
    the second prism extracts the red light,
    the third prism extracts the green light,
    the first dichroic film reflects the blue light,
    the transmission characteristic curve of the first dichroic film has a shape that goes up from a low transmissivity to a high transmissivity in a wavelength range of 430 nm to 670 nm while tracking the short wavelength side of the ideal spectral characteristic of green,
    the second dichroic film reflects the red light, and
    the transmission characteristic curve of the second dichroic film has a shape that goes down from a high transmissivity to a low transmissivity in the wavelength range of 430 nm to 670 nm while tracking the long-wavelength side of the ideal spectral characteristic of green.

3. The color-separation optical system according to claim 2, wherein
    the transmission characteristic curve of the first dichroic film reflecting the blue light has such a shape that an average slope value is equal to or larger than 0.2%/nm and equal to or less than 2.0%/nm in a portion where the transmission characteristic curve of the first dichroic film changes from 20% to 80% of a range that is defined between the lowest transmissivity and the highest transmissivity of the first dichroic film in the wavelength range of 430 nm to 670 nm, and
    the transmission characteristic curve of the second dichroic film reflecting the red light has such a shape that an average slope value is equal or larger than −2.0%/nm and equal to or less than −0.2%/nm in a portion where the transmission characteristic curve of the second dichroic film changes from 80% to 20% of a range that is defined between the highest transmissivity and the lowest transmissivity of the second dichroic film in the wavelength range of 430 nm to 670 nm.

4. The color-separation optical system according to claim 2, further comprising:
    a fourth prism that has a third dichroic film, is disposed between the second prism and the third prism, and extracts a fourth color light component passing through the first and second dichroic films, wherein
    the third dichroic film reflects a part of light in a wavelength range of 400 nm to 600 nm as the fourth color light component, and
    the third prism extracts the green light, which passes through the first and second dichroic films and passes through the third dichroic film.

5. The color-separation optical system according to claim 1, wherein
    the first prism extracts the blue light,
    the second prism extracts the green light,
    the third prism extracts the red light,
    the first dichroic film reflects the blue light,
    the transmission characteristic curve of the first dichroic film has a shape that goes up from a low transmissivity to a high transmissivity in a wavelength range of 430 nm to 670 nm while tracking on the short-wavelength side of the ideal spectral characteristic of green,
    the second dichroic film reflects the green light, and
    the reflection characteristic curve of the second dichroic film has a shape that goes down from a high reflectivity to a low reflectivity in the wavelength range of 430 nm to 670 nm while tracking the long-wavelength side of the ideal spectral characteristic of green.

6. The color-separation optical system according to claim 5, wherein
    the transmission characteristic curve of the first dichroic film reflecting the blue light has such a shape that an average slope value is equal to or larger than 0.2%/nm and equal to or less than 2.0%/nm in a portion where the transmission characteristic curve of the first dichroic film changes from 20% to 80% of a range that is defined between the lowest transmissivity and the highest transmissivity of the first dichroic film in the wavelength range of 430 nm to 670 nm, and the reflection characteristic curve of the second dichroic film reflecting the green light has such a shape that an average slope value is equal or larger than −2.0%/nm and equal to or less than −0.2%/nm in a portion where the reflection characteristic curve of the second dichroic film changes from 80% to 20% of a range that is defined between the highest reflectivity and the lowest reflectivity of the second dichroic film in the wavelength range of 430 nm to 670 nm.

7. The color-separation optical system according to claim 1, wherein the ideal spectral characteristic is an ideal characteristic represented by a color-matching function in an RGB color coordinate system.

8. The color-separation optical system according to claim 7, wherein the ideal spectral characteristic is one obtained by applying to the ideal characteristic a reversible transformation that further decreases a negative value.

9. An imaging apparatus comprising:
the color-separation optical system according to claim 8;
imaging devices that are disposed to correspond to the respective light components separated by the color-separation optical system, the imaging devices that output electrical signals in accordance with the color components incident thereon; and
a calculation circuit that performs a reverse transformation based on the signals obtained from the imaging devices, so as to reproduce the negative value in the ideal characteristic.

10. The color-separation optical system according to claim 1, wherein the ideal spectral characteristic is an ideal characteristic into which chromaticity coordinates of three primary colors of a color reproducing medium is converted and which is represented by a linear transformation of a color-matching function in an XYZ color coordinate system.

11. The color-separation optical system according to claim 1, further comprising:
an absorbing filter that is disposed on at least one of (i) a front side of the first prism and (ii) an exiting-surface side of the prism, which extracts the red light, the absorbing filter that has a characteristic approximated to a luminosity factor.

12. The color-separation optical system according to claim 1, further comprising:
a coating-type infrared cut filter that is disposed on a front side of the first prism and that cuts an infrared ray.

13. The color-separation optical system according to claim 1, further comprising:
an ultraviolet cut filter that is disposed on a front side of the first prism and that cuts an ultraviolet ray.

14. The color-separation optical system according to claim 1, wherein an antireflection film is formed on an exiting surface of at least one prism.

15. The color-separation optical system according to claim 1, further comprising:
a depolarizing plate that is disposed on a front side of the first prism and that depolarizes polarization of incident light in a specific direction.

16. The color-separation optical system according to claim 1, further comprising:
an absorbing filter that is disposed on an exiting-surface side of the prism for extracting the red light, the absorbing filter that intercepts the blue light and the green light and transmits the red light.

17. An imaging apparatus comprising:
the color-separation optical system according to claim 1; and
imaging devices that are disposed for the respective color components separated by the color-separation optical system, the imaging devices that output electrical signals in accordance with the color components incident thereon.

18. A color-separation optical system for separating incident light into at least three light components of blue light, red light, and green light, the color-separation optical system comprising, in order from a light-incident side:
a first prism that has a first dichroic film and extracts a first color light component reflected by the first dichroic film;
a second prism that has a second dichroic film and extracts a second color light component which passes through the first dichroic film and which is reflected by the second dichroic film; and
a third prism that extracts a third color light component which passes through the first and second dichroic films, wherein
the first dichroic film has a film configuration for reflecting the red light as the first color light component,
the second dichroic film has a film configuration for reflecting the blue or green light as the second color light component,
a transmission characteristic curve of wavelength versus transmissivity of the first dichroic film has a shape that tracks a long-wavelength side of an ideal spectral characteristic of green,
a transmission characteristic curve of wavelength versus transmissivity of the second dichroic film has a shape that tracks a short-wavelength side of the ideal spectral characteristic of green when the second dichroic film reflects the blue light, and
a reflection characteristic curve of wavelength versus reflectivity of the second dichroic film has a shape that tracks the short-wavelength side of the ideal spectral characteristic of green when the second dichroic film reflects the green light.

19. The color-separation optical system according to claim 18, wherein
the first prism extracts the red light,
the second prism extracts the blue light,
the third prism extracts the green light,
the first dichroic film reflects the red light,
the transmission characteristic curve of the first dichroic film has a shape that goes down from a high transmissivity to a low transmissivity in a wavelength range of 430 nm to 670 nm while tracking on the short-wavelength side of the ideal spectral characteristic of green, and
the second dichroic film reflects the blue light, and
the transmission characteristic curve of the second dichroic film has a shape that goes up from a low transmissivity to a high transmissivity in the wavelength range of 430 nm to 670 nm while tracking the long-wavelength side of the ideal spectral characteristic of green.

20. The color-separation optical system according to claim 19, wherein
the transmission characteristic curve of the first dichroic film reflecting the red light has such a shape that an average slope value is equal or larger than −2.0%/nm and equal to or less than −0.2%/nm in a portion where the transmission characteristic curve of the first dichroic film changes from 80% to 20% of a range that is defined between the highest transmissivity and the lowest transmissivity of the first dichroic film in the wavelength range of 430 nm to 670 nm, and the transmission characteristic curve of the second dichroic film reflecting the blue light has such a shape that an average slope value is equal to or larger than 0.2%/nm and equal to or less than 2.0%/nm in a portion where the transmission characteristic curve of the second dichroic film changes from 20% to 80% of a range that is defined between the lowest transmissivity and the highest transmissivity of the second dichroic film in the wavelength range of 430 nm to 670 nm.

21. The color-separation optical system according to claim 18, wherein the first prism extracts the red light,
the second prism extracts the green light,
the third prism extracts the blue light,
the first dichroic film reflects the red light,
the transmission characteristic curve of the first dichroic film has a shape that goes down from a high transmissivity to a low transmissivity in a wavelength range of 430 nm to 670 nm while tracking the long-wavelength side of the ideal spectral characteristic of green, and
the second dichroic film reflects the green light, and
the reflection characteristic curve of the second dichroic film has a shape that goes up from a low reflectivity to a high reflectivity in the wavelength range of 430 nm to 670 nm while tracking the short-wavelength side of the ideal spectral characteristic of green.

22. The color-separation optical system according to claim 21, wherein the transmission characteristic curve of the first dichroic film reflecting the red light has such a shape that an average slope value is equal or larger than −2.0%/nm and equal to or less than −0.2%/nm in a portion where the transmission characteristic curve of the first dichroic film changes from 80% to 20% of a range that is defined between the highest transmissivity and the lowest transmissivity of the first dichroic film in the wavelength range of 430 nm to 670 nm, and
the reflection characteristic curve of the second dichroic film reflecting the green light has such a shape that an average slope value is equal to or larger than 0.2%/nm and equal to or less than 2.0%/nm in a portion where the reflection characteristic curve of the second dichroic film changes from 20% to 80% of a range that is defined between the lowest reflectivity and the highest reflectivity of the second dichroic film in the wavelength range of 430 nm to 670 nm.

23. A color-separation optical system for separating incident light into at least three light components of blue light, red light, and green light, the color-separation optical system comprising, in order from a light-incident side:

a first prism that has a first dichroic film and extracts a first color light component reflected by the first dichroic film;
a second prism that has a second dichroic film and extracts a second color light component which passes through the first dichroic film and which is reflected by the second dichroic film; and
a third prism that extracts a third color light component which passes through the first and second dichroic films, wherein the first dichroic film has a film configuration for reflecting the green light as the first color light component,
the second dichroic film has a film configuration for reflecting the blue or red light as the second color light component,
a reflection characteristic curve of wavelength versus reflectivity of the first dichroic film has a shape that tracks a short-wavelength side and a long-wavelength side of an ideal spectral characteristic of green.

24. The color-separation optical system according to claim 23, wherein in a portion where the reflection characteristic curve of the first dichroic film that goes up in a wavelength range of 430 nm to 670 nm, the reflection characteristic curve of the first dichroic film has a shape that changes from a low reflectivity to a high reflectivity while tracking the short-wavelength side of the ideal spectral characteristic of green, and
in a portion where the reflection characteristic curve of the first dichroic film that goes down in the wavelength range of 430 nm to 670 nm, the reflection characteristic curve of the first dichroic film has a shape that changes from a high reflectivity to a low reflectivity while tracking the long-wavelength side of the ideal spectral characteristic of green.

25. The color-separation optical system according to claim 24, wherein the reflection characteristic curve of the first dichroic film has such a shape that an average slope value is equal to or larger than 0.2%/nm and equal to or less than 2.0%/nm in a portion where the reflection characteristic curve of the first dichroic film that changes from 20% to 80% of a range that is defined between the lowest reflectivity and the highest reflectivity of the first dichroic film in the wavelength range of 430 nm to 670 nm, and
the reflection characteristic curve of the first dichroic film has such a shape that an average slope value is equal or larger than −2.0%/nm and equal to or less than −0.2%/nm in a portion where the reflection characteristic curve of the first dichroic film that changes from 80% to 20% of a range that is defined between the highest reflectivity and the lowest reflectivity of the first dichroic film in the wavelength range of 430 nm to 670 nm.

26. The color-separation optical system according to claim 24, wherein the first prism extracts the green light,
the second prism extracts the blue light,
the third prism extracts the red light,
the second dichroic film has a film configuration for reflecting the blue light, and
a transmission characteristic curve of wavelength versus transmissivity of the second dichroic film has a shape that tracks a short-wavelength side of an ideal spectral characteristic of red.

27. The color-separation optical system according to claim 24, wherein the first prism extracts the green light,
the second prism extracts the red light,
the third prism extracts the blue light,
the second dichroic film has a film configuration for reflecting the red light, and
a reflection characteristic curve of wavelength versus reflectivity of the second dichroic film has a shape that tracks a short-wavelength side of an ideal spectral characteristic of red.

28. A color-separation optical system comprising, in order from a light-incident side:

a first prism that has a first dichroic film and extracts, among incident light, a first color light component reflected by the first dichroic film from;

a second prism that has a second dichroic film and extracts a second color light component which passes through the first dichroic film and which is reflected by the second dichroic film; and a third prism that extracts a third color light component which passes through the first and second dichroic films, wherein a surface of the first prism on which the first dichroic film is formed and a light incidence surface of the second prism face each other with an air gap interposed therebetween, and an antireflection film that reduces reflection of light, which is in a specific wavelength range and which passes through the first dichroic film, is formed on the light incidence surface of the second prism.

29. The color-separation optical system according to claim 28, wherein the first prism extracts blue light as the first color light component, the second prism extracts red light as the second color light component the third prism extracts green light as the third color light component, and the antireflection film formed on the light incidence surface of the second prism has a characteristic of reducing the reflection of light at least in a wavelength range of 500 nm to 550 nm as the light in the specific wavelength range.

30. The color-separation optical system according to claim 8, wherein the antireflection film has an average reflectivity of 0.7% or less in the wavelength range of 500 nm to 550 nm.

* * * * *